(12) United States Patent
Fariss et al.

(10) Patent No.: US 12,587,263 B2
(45) Date of Patent: Mar. 24, 2026

(54) DUAL PATH SWITCHABLE REPEATER

(71) Applicant: Wilson Electronics, LLC, St. George, UT (US)

(72) Inventors: Stephen Todd Fariss, Frisco, TX (US); Dale Robert Anderson, Colleyville, TX (US); Christopher Ken Ashworth, Toquerville, UT (US)

(73) Assignee: Wilson Electronics, LLC, St. George, UT (US)

( * ) Notice: Subject to any disclaimer, the term of this patent is extended or adjusted under 35 U.S.C. 154(b) by 374 days.

(21) Appl. No.: 18/372,079

(22) Filed: Sep. 23, 2023

(65) Prior Publication Data

US 2024/0113771 A1 Apr. 4, 2024

Related U.S. Application Data

(60) Provisional application No. 63/409,577, filed on Sep. 23, 2022.

(51) Int. Cl.
H04B 7/155 (2006.01)
H04L 5/14 (2006.01)

(52) U.S. Cl.
CPC ..... H04B 7/15528 (2013.01); H04B 7/15557 (2013.01); H04L 5/14 (2013.01)

(58) Field of Classification Search
CPC ............ H04B 7/15528; H04B 7/15557; H04B 7/15542; H04L 5/14
See application file for complete search history.

(56) References Cited

U.S. PATENT DOCUMENTS

| | | | | |
|---|---|---|---|---|
| 2010/0157858 A1* | 6/2010 | Lee | | H04B 1/0057 |
| | | | | 343/904 |
| 2014/0321339 A1* | 10/2014 | Pehlke | | H04B 1/525 |
| | | | | 370/281 |
| 2019/0196555 A1* | 6/2019 | Mouser | | H04B 7/15528 |
| 2020/0383075 A1 | 12/2020 | Ashworth et al. | | |
| 2022/0014257 A1* | 1/2022 | Anderson | | H04W 52/52 |
| 2022/0166492 A1* | 5/2022 | Anderson | | H04B 1/0078 |

FOREIGN PATENT DOCUMENTS

WO WO-2015191880 A1 * 12/2015 ........... H04B 1/0057

* cited by examiner

*Primary Examiner* — Afshawn M Towfighi
(74) *Attorney, Agent, or Firm* — Thorpe North & Western, LLP.

(57) ABSTRACT

A technology is described for a dual path repeater configurable for a split mode and a multiple input multiple output (MIMO) mode. The dual path repeater can comprise first and second server ports and first and second donor ports. Four amplification and filtering paths are communicatively coupled between the ports. Each amplification and filtering path include a software defined filter (SDF). The SDFs are configured to filter the same 3GPP bands to provide MIMO communication or the first SDF and the second SDF are configured to filter different bands to enable the dual path switchable repeater to provide split mode communication on multiple TDD/FDD bands.

36 Claims, 26 Drawing Sheets

FDD (Full Duplex)

TDD (Half Duplex)

FDD (Full Duplex)

TDD (Half Duplex)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 3a

UL/DL Repeater Diagram

900

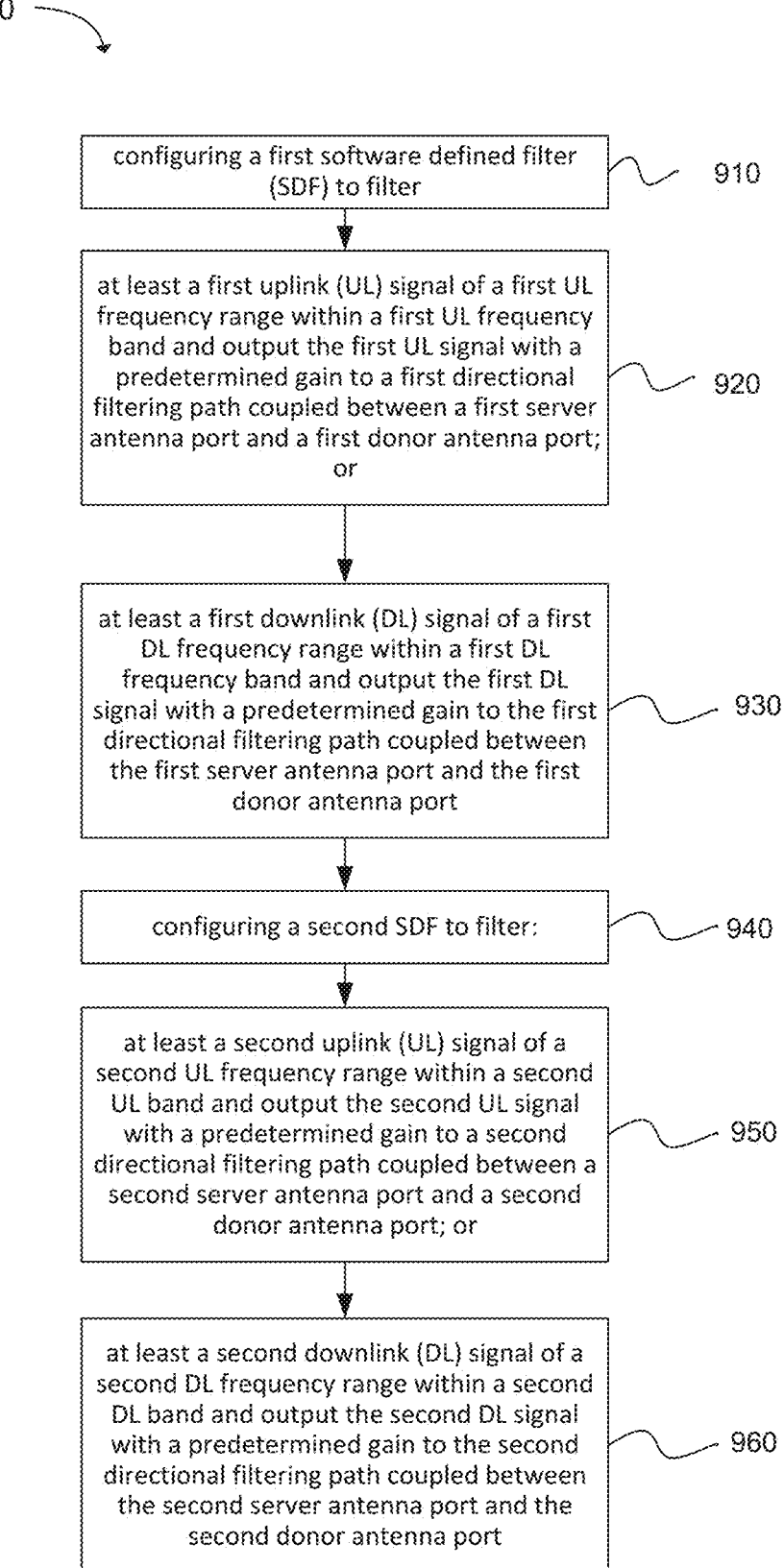

configuring a first software defined filter (SDF) to filter                    910 at least a first uplink (UL) signal of a first UL frequency range within a first UL frequency band and output the first UL signal with a predetermined gain to a first directional filtering path coupled between a first server antenna port and a first donor antenna port; or                    920 at least a first downlink (DL) signal of a first DL frequency range within a first DL frequency band and output the first DL signal with a predetermined gain to the first directional filtering path coupled between the first server antenna port and the first donor antenna port                    930 configuring a second SDF to filter:                    940 at least a second uplink (UL) signal of a second UL frequency range within a second UL band and output the second UL signal with a predetermined gain to a second directional filtering path coupled between a second server antenna port and a second donor antenna port; or                    950 at least a second downlink (DL) signal of a second DL frequency range within a second DL band and output the second DL signal with a predetermined gain to the second directional filtering path coupled between the second server antenna port and the second donor antenna port                    960

FIG. 9a

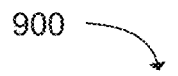

900

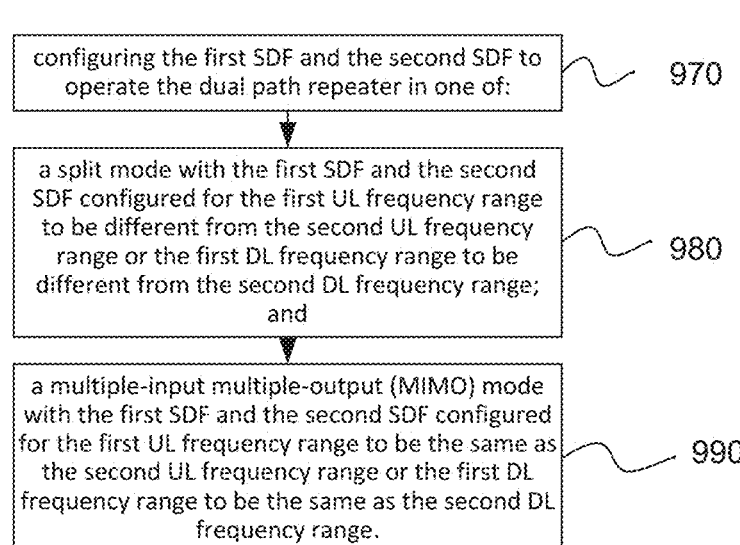

configuring the first SDF and the second SDF to operate the dual path repeater in one of:    970 a split mode with the first SDF and the second SDF configured for the first UL frequency range to be different from the second UL frequency range or the first DL frequency range to be different from the second DL frequency range; and    980 a multiple-input multiple-output (MIMO) mode with the first SDF and the second SDF configured for the first UL frequency range to be the same as the second UL frequency range or the first DL frequency range to be the same as the second DL frequency range.    990

FIG. 9b

DUAL PATH SWITCHABLE REPEATER

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3a illustrates UL/DL configurations for 3GPP E-UTRA in accordance with an example;

FIGS. 9a and 9b illustrate a flow chart depicting functionality for configuring a dual path repeater having a split mode and a multiple input multiple output (MIMO) mode in accordance with an example.

Figure 1A:
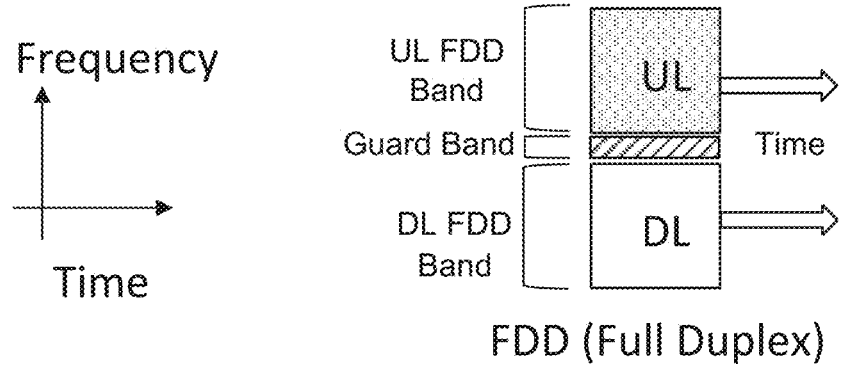
FIG. 1a illustrates a frequency division duplex (FDD) full duplexing scheme in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless communication standards use duplexing schemes to separate the transmission and reception of wireless communication signals. Transmission of a wireless communication signal from a wireless communication access point, such as a base station (BS), to a wireless device, such as a user equipment (UE) is typically referred to as a downlink (DL) transmission. Reception of a wireless communication signal at a BS that was sent from a UE is typically referred to as an uplink (UL) transmission. Typical duplexing schemes include Frequency Division Duplex (FDD) and Time Division Duplex (TDD).

Figure 1B:
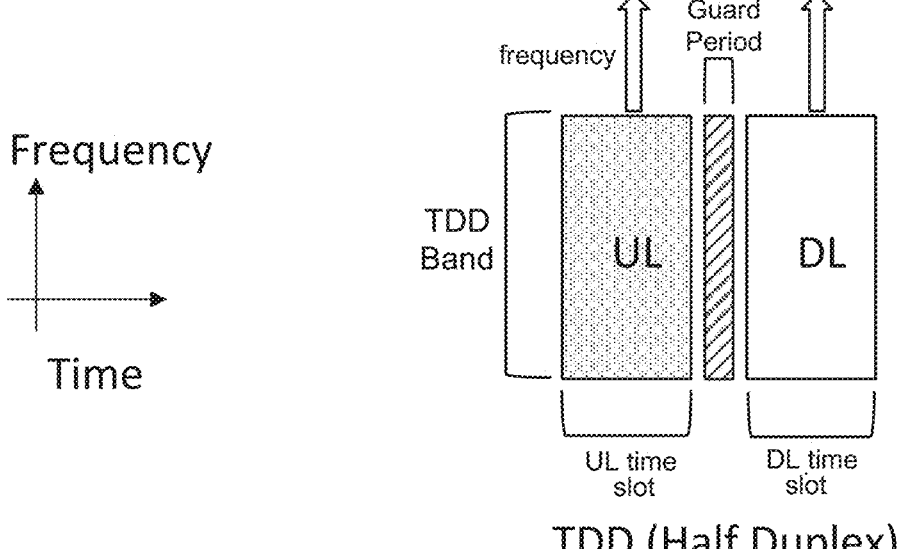
FIG. 1b illustrates a time division duplex (TDD) half duplexing scheme in accordance with an example.

FIGS. 1a and 1b provide graphical examples of different types of duplexing schemes. FIG. 1a illustrates a typical FDD duplexing scheme. In this example, an UL FDD band is allocated and is used to continuously transmit an uplink signal over the UL FDD band. Similarly, a DL FDD band is allocated to continuously transmit a downlink signal over the DL FDD band. Because the UL and DL signals can be transmitted continuously and simultaneously, the FDD duplexing scheme is referred to as full duplex.

The UL FDD band and DL FDD band in FIG. 1a are separated by a guard band. The guard band is used to enable a receiver to receive the UL and DL signals without interference from the adjacent signal.

FIG. 1b illustrates a typical TDD duplexing scheme. In this example, a TDD band is used to transmit an UL signal for the duration of an UL time slot. In contrast with the FDD scheme, the bandwidth for the UL signal does not have to be shared with a bandwidth for a DL signal. Rather, the TDD band can comprise the full frequency allocation for the selected TDD band. A DL signal can be transmitted over the full TDD band for the duration of the DL time slot. Because transmission of the UL signal and DL signal is not simultaneous, and is shared in time, the TDD duplexing scheme is referred to as half duplex.

A guard period is designated in FIG. 1b between the UL time slot and the DL time slot. The guard period is used to allow a transceiver time to switch between transmission and reception modes. In addition, the guard period is selected based on the time of flight for the UL or DL signal between the BS and the UE.

Repeaters can increase the quality of wireless communication between a wireless device, such as a UE and a wireless communication access point, such as a BS, by amplifying, filtering, or applying other processing techniques to uplink and downlink signals communicated between the wireless device and the wireless communication access point.

Figure 2:
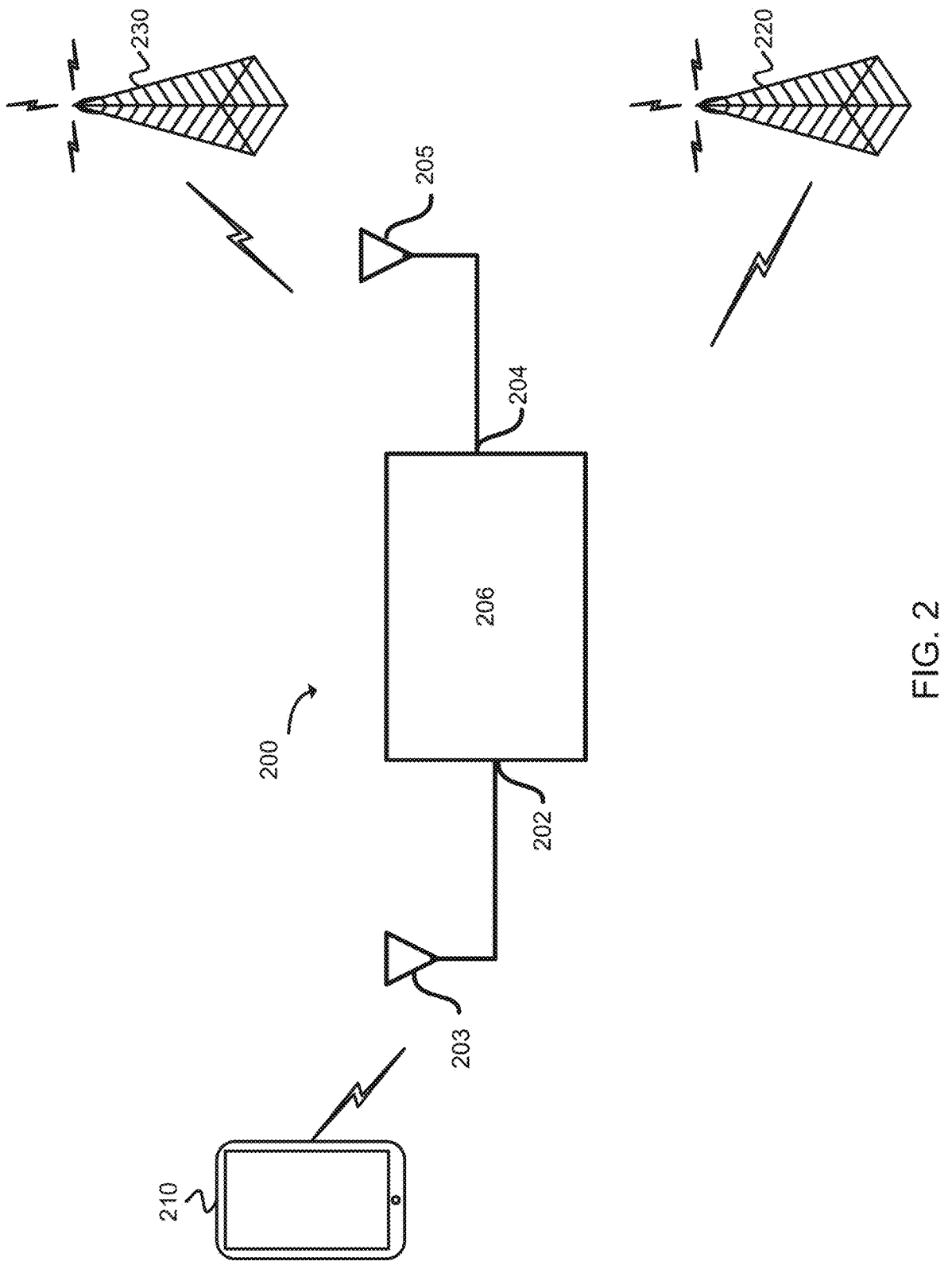
FIG. 2 illustrates a TDD repeater in a wireless communication system in accordance with an example.

In one example, as illustrated in FIG. 2, a time division duplex (TDD) repeater 200 can include a first port 202 (e.g., a server port), a second port 204 (e.g., a donor port), and one or more amplification paths (not shown) coupled between the first port 202 and the second port 204. The TDD repeater is configured to be connected to a donor antenna 205 and a server antenna 203 via the second port 204 and the first port 202, respectively. The TDD repeater 200 can be configured to receive a TDD UL signal from a UE 210 and send the TDD UL signal to a node 220 and/or a node 230. The TDD repeater 200 can be configured to receive a TDD DL signal from the node 220 and/or node 230 at the second port 204 and send the TDD DL signal to the UE 210.

The repeater 200 can boost signals configured based on selected wireless standards, such as the Third Generation Partnership Project (3GPP) Evolved Universal Terrestrial Radio Access (E-UTRA) Release 8, 9, 10, 11, 12, 13, 14, 15, 16, or 17 standards or Institute of Electronics and Electrical Engineers (IEEE) 802.16. The E-UTRA standards were previously referred to as fourth generation (4G) standards, with Releases 10-17 also referred to as 4G Long Term Evolution (LTE) standards. The terms E-UTRA, 4G, and LTE are used synonymously in this document, unless otherwise noted. In one configuration, the repeater 200 can boost signals for 3GPP LTE Release 17.4.0 (January 2022) or other desired releases.

The repeater 200 can boost signals from the 3GPP Technical Specification (TS) 36.101 (Release 17 Jan. 2021) Evolved Universal Terrestrial Radio Access (E-UTRA) TDD frequency bands. The repeater 200 may also be configured to boost E-UTRA FDD frequency bands. In addition, the repeater 200 can boost selected frequency bands based on the country or region in which the repeater is used, including any of TDD bands 33-53, or other bands, as disclosed in 3GPP TS 36.104 V17.4.0 (January 2022), and depicted in Table 1.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24[9] | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

(NOTE[1]):

Band 6, 23 are not applicable.

(NOTE 2):

Restricted to E-UTRA operation when carrier aggregation is configured. The downlink operating band is paired with the uplink operating band (external) of the carrier aggregation configuration that is supporting the configured Pcell.

(NOTE 3):

This band is an unlicensed band restricted to licensed-assisted operation using Frame Structure Type 3.

(NOTE 4):

Band 46 is divided into four sub-bands as in Table 5.5-1A.

(NOTE 5):

The range 2180-2200 MHz of the DL operating band is restricted to E-UTRA operation when carrier aggregation is configured.

NOTE[6]:

The range is 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.

(NOTE 7): Void (NOTE 8): This band is restricted to licensed-assisted operation using Frame Structure Type 3.

NOTE[9]: DL operation is restricted to 1526-1536 MHz frequency range. UL operation is restricted to 1627.5-1637.5 MHz and 1646.5-1656.5 MHz per FCC Order DA 20-48.

In another configuration, the repeater 200 can boost TDD signals from the 3GPP Technical Specification (TS) 38.104 (Release 17 Jan. 2021) bands or 5G frequency bands, referred to as new radio operating bands. These bands typically begin with the prefix "n". In addition, the repeater 200 can boost selected frequency bands based on the country or region in which the repeater is used, including any of TDD bands n34-n53, n77-n79, n90, or n96 in frequency range 1 (FR1), n257-n262 in frequency range 2 (FR2), or other bands, as disclosed in 3GPP TS 38.104 V17.4.0 (January 2022), and depicted in Table 2 and Table 3:

TABLE 2

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24[7] | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD[3] |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n67 | N/A | 738 MHz-758 MHz | SDL |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |
| n96[4] | 5925 MHz-7125 MHz | 5925 MHz-7125 MHz | TDD[3] |
| n97[5] | 2300 MHz-2400 MHz | N/A | SUL |

TABLE 2-continued

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex mode |
|---|---|---|---|
| n98[5] | 1880 MHz-1920 MHz | N/A | SUL |
| n99[6] | 1626.5 MHz-1660.5 MHz | N/A | SUL |

NOTE[1]:

This band is applicable in China only.

NOTE[2]:

Variable duplex operation does not enable dynamic variable duplex configuration by the network, and is used such that DL and UL frequency ranges are supported independently in any valid frequency range for the band.

NOTE[3]:

This band is restricted to operation with shared spectrum channel access as defined in [20].

NOTE[4]:

This band is applicable in the USA only subject to FCC Report and Order [FCC 20-51].

NOTE[5]:

The requirements for this band are applicable only where no other NR or E-UTRA TDD operating band(s) are used within the frequency range of this band in the same geographical area. For scenarios where other NR or E-UTRA TDD operating band(s) are used within the frequency range of this band in the same geographical area, special co-existence requirements may apply that are not covered by the 3GPP specifications.

NOTE[6]:

UL operation is restricted to 1627.5-1637.5 MHz and 1646.5-1656.5 MHz per FCC Order DA 20-48.

NOTE[7]:

DL operation is restricted to 1526-1536 MHz frequency range. UL operation is restricted to 1627.5-1637.5 MHz and 1646.5-1656.5 MHz per FCC Order DA 20-48.

TABLE 3

| NR operating band | Uplink (UL) and Downlink (DL) operating band BS transmit/receive UE transmit/receive $F_{UL, low}$-$F_{UL, high}$ $F_{DL, low}$-$F_{DL, high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |
| n261 | 27500 MHz-28350 MHz | TDD |
| n262 | 47200 MHz-48200 MHz | TDD |

For E-UTRA, each operating band can be divided into different channel bandwidths, depending on the size of the operating band. The channel bandwidths are disclosed in 3GPP TS 36.104 V17.4.0 (January 2022), and depicted in Table 4. The table shows the number of physical resource blocks (NRB) in each channel. The definition of a physical resource block (PRB) for EUTRA, also called a resource block (RB) is well known and is defined in 3GPP TS 36.211 V 17.4.0 (January 2022).

TABLE 4

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

For 5G, the New Radio (NR) operating bands can also be divided into different channel bandwidths. 5G was designed to have more flexibility, allowing for a number of different modalities than previous generations of cellular communication. Each NR operating band has different channel bandwidths that can be used. Each channel can include different subcarrier spacing (SCS). Table 5, shown below, provides an example of channel bandwidths for the NR operating bands in FR 1 and the available SCS for each NR operating band. The channel bandwidths are disclosed in 3GPP TS 36.101-1 V17.4.0 (January 2022). Table 6 shows the NR operating bands in FR 2, as disclosed in 3GPP TS 36.101-2 V17.4.0 (January 2022)

TABLE 5

| NR Band | SCS (kHz) | 5 | 10 | 15 | 20 | 25 | 30 | 35 | 40 | 45 | 50 | 60 | 70 | 80 | 90 | 100 |
|---|---|---|---|---|---|---|---|---|---|---|---|---|---|---|---|---|
| n1 | 15 | 5 | 10 | 15 | 20 | 25 | 30 | | 40 | 45[4] | 50 | | | | | |
| | 30 | | 10 | 15 | 20 | 25 | 30 | | 40 | 45[4] | 50 | | | | | |
| | 60 | | 10 | 15 | 20 | 25 | 30 | | 40 | 45[4] | 50 | | | | | |
| n2 | 15 | 5 | 10 | 15 | 20 | 25 | 30 | 35[4] | 40 | | | | | | | |
| | 30 | | 10 | 15 | 20 | 25 | 30 | 35[4] | 40 | | | | | | | |
| | 60 | | 10 | 15 | 20 | 25 | 30 | 35[4] | 40 | | | | | | | |
| n3 | 15 | 5 | 10 | 15 | 20 | 25 | 30 | 35[4] | 40 | 45[4] | 50 | | | | | |
| | 30 | | 10 | 15 | 20 | 25 | 30 | 35[4] | 40 | 45[4] | 50 | | | | | |
| | 60 | | 10 | 15 | 20 | 25 | 30 | 35[4] | 40 | 45[4] | 50 | | | | | |
| n5 | 15 | 5 | 10 | 15 | 20 | 25[3] | | | | | | | | | | |
| | 30 | | 10 | 15 | 20 | 25[3] | | | | | | | | | | |
| | 60 | | | | | | | | | | | | | | | |
| n7 | 15 | 5 | 10 | 15 | 20 | 25 | 30 | 35[4] | 40 | | 50 | | | | | |
| | 30 | | 10 | 15 | 20 | 25 | 30 | 35[4] | 40 | | 50 | | | | | |
| | 60 | | 10 | 15 | 20 | 25 | 30 | 35[4] | 40 | | 50 | | | | | |

TABLE 5-continued

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n8 | 15 | 5 | 10 | 15 | 20 | | | $35^{3,4}$ | | | | | | | | |
| | 30 | | 10 | 15 | 20 | | | $35^{3,4}$ | | | | | | | | |
| | 60 | | | | | | | | | | | | | | | |
| n12 | 15 | 5 | 10 | 15 | | | | | | | | | | | | |
| | 30 | | 10 | 15 | | | | | | | | | | | | |
| | 60 | | | | | | | | | | | | | | | |
| n13 | 15 | 5 | 10 | | | | | | | | | | | | | |
| | 30 | | 10 | | | | | | | | | | | | | |
| | 60 | | | | | | | | | | | | | | | |
| n14 | 15 | 5 | 10 | | | | | | | | | | | | | |
| | 30 | | 10 | | | | | | | | | | | | | |
| | 60 | | | | | | | | | | | | | | | |
| n18 | 15 | 5 | 10 | 15 | | | | | | | | | | | | |
| | 30 | | 10 | 15 | | | | | | | | | | | | |
| | 60 | | | | | | | | | | | | | | | |
| n20 | 15 | 5 | 10 | 15 | 20 | | | | | | | | | | | |
| | 30 | | 10 | 15 | 20 | | | | | | | | | | | |
| | 60 | | | | | | | | | | | | | | | |
| n24 | 15 | 5 | 10 | | | | | | | | | | | | | |
| | 30 | | 10 | | | | | | | | | | | | | |
| | 60 | | 10 | | | | | | | | | | | | | |
| n25 | 15 | 5 | 10 | 15 | 20 | 25 | 30 | $35^4$ | 40 | $45^{3,4}$ | | | | | | |
| | 30 | | 10 | 15 | 20 | 25 | 30 | $35^4$ | 40 | $45^{3,4}$ | | | | | | |
| | 60 | | 10 | 15 | 20 | 25 | 30 | $35^4$ | 40 | $45^{3,4}$ | | | | | | |
| n26 | 15 | 5 | 10 | 15 | 20 | | | | | | | | | | | |
| | 30 | | 10 | 15 | 20 | | | | | | | | | | | |
| n28 | 15 | 5 | 10 | 15 | $20^7$ | | $30^7$ | | | | | | | | | |
| | 30 | | 10 | 15 | $20^7$ | | $30^7$ | | | | | | | | | |
| | 60 | | | | | | | | | | | | | | | |
| n29 | 15 | 5 | 10 | | | | | | | | | | | | | |
| | 30 | | 10 | | | | | | | | | | | | | |
| | 60 | | | | | | | | | | | | | | | |
| n30 | 15 | 5 | 10 | | | | | | | | | | | | | |
| | 30 | | 10 | | | | | | | | | | | | | |
| | 60 | | | | | | | | | | | | | | | |
| n34 | 15 | 5 | 10 | 15 | | | | | | | | | | | | |
| | 30 | | 10 | 15 | | | | | | | | | | | | |
| | 60 | | 10 | 15 | | | | | | | | | | | | |
| n38 | 15 | 5 | $10^{10}$ | 15 | $20^{10}$ | 25 | $30^{10}$ | | $40^{10}$ | | | | | | | |
| | 30 | | $10^{10}$ | 15 | $20^{10}$ | 25 | $30^{10}$ | | $40^{10}$ | | | | | | | |
| | 60 | | $10^{10}$ | 15 | $20^{10}$ | 25 | $30^{10}$ | | $40^{10}$ | | | | | | | |
| n39 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n40 | 15 | $5^5$ | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |
| n41 | 15 | | 10 | 15 | 20 | | 30 | | 40 | | 50 | | | | | |
| | 30 | | 10 | 15 | 20 | | 30 | | 40 | | 50 | 60 | 70 | 80 | 90 | 100 |
| | 60 | | 10 | 15 | 20 | | 30 | | 40 | | 50 | 60 | 70 | 80 | 90 | 100 |
| n46 | 15 | | 10 | | 20 | | | | 40 | | | | | | | |
| | 30 | | $10^5$ | | 20 | | | | 40 | | | 60 | | 80 | | |
| | 60 | | $10^5$ | | 20 | | | | 40 | | | 60 | | 80 | | |
| n47 | 15 | | $10^{10}$ | | $20^{10}$ | | $30^{10}$ | | $40^{10}$ | | | | | | | |
| | 30 | | $10^{10}$ | | $20^{10}$ | | $30^{10}$ | | $40^{10}$ | | | | | | | |
| | 60 | | $10^{10}$ | | $20^{10}$ | | $30^{10}$ | | $40^{10}$ | | | | | | | |
| n48 | 15 | $5^5$ | 10 | 15 | 20 | | 30 | | 40 | | $50^6$ | | | | | |
| | 30 | | 10 | 15 | 20 | | 30 | | 40 | | $50^6$ | $60^6$ | $70^6$ | $80^6$ | $90^{6,4}$ | $100^6$ |
| | 60 | | 10 | 15 | 20 | | 30 | | 40 | | $50^6$ | $60^6$ | $70^6$ | $80^6$ | $90^{6,4}$ | $100^6$ |
| n50 | 15 | $5^5$ | 10 | 15 | 20 | | 30 | | 40 | | 50 | | | | | |
| | 30 | | 10 | 15 | 20 | | 30 | | 40 | | 50 | 60 | | $80^3$ | | |
| | 60 | | 10 | 15 | 20 | | 30 | | 40 | | 50 | 60 | | $80^3$ | | |
| n51 | 15 | 5 | | | | | | | | | | | | | | |
| | 30 | | | | | | | | | | | | | | | |
| | 60 | | | | | | | | | | | | | | | |
| n53 | 15 | 5 | 10 | | | | | | | | | | | | | |
| | 30 | | 10 | | | | | | | | | | | | | |
| | 60 | | 10 | | | | | | | | | | | | | |
| n65 | 15 | 5 | 10 | 15 | 20 | | | | | | 50 | | | | | |
| | 30 | | 10 | 15 | 20 | | | | | | 50 | | | | | |
| | 60 | | 10 | 15 | 20 | | | | | | 50 | | | | | |
| n66 | 15 | 5 | 10 | 15 | 20 | 25 | 30 | $35^4$ | 40 | $45^4$ | | | | | | |
| | 30 | | 10 | 15 | 20 | 25 | 30 | $35^4$ | 40 | $45^4$ | | | | | | |
| | 60 | | 10 | 15 | 20 | 25 | 30 | $35^4$ | 40 | $45^4$ | | | | | | |

TABLE 5-continued

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n67 | 15 | 5 | 10 | 15 | 20 | | | | | | | | | | | |
| | 30 | | 10 | 15 | 20 | | | | | | | | | | | |
| | 60 | | | | | | | | | | | | | | | |
| n70 | 15 | 5 | 10 | 15 | $20^3$ | $25^3$ | | | | | | | | | | |
| | 30 | | 10 | 15 | $20^3$ | $25^3$ | | | | | | | | | | |
| | 60 | | 10 | 15 | $20^3$ | $25^3$ | | | | | | | | | | |
| n71 | 15 | 5 | 10 | 15 | 20 | $25^3$ | $30^3$ | $35^{3,\,4}$ | | | | | | | | |
| | 30 | | 10 | 15 | 20 | $25^3$ | $30^3$ | $35^{3,\,4}$ | | | | | | | | |
| | 60 | | | | | | | | | | | | | | | |
| n74 | 15 | 5 | 10 | 15 | 20 | | | | | | | | | | | |
| | 30 | | 10 | 15 | 20 | | | | | | | | | | | |
| | 60 | | 10 | 15 | 20 | | | | | | | | | | | |
| n75 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n76 | 15 | 5 | | | | | | | | | | | | | | |
| | 30 | | | | | | | | | | | | | | | |
| | 60 | | | | | | | | | | | | | | | |
| n77 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | $90^4$ | 100 |
| | 60 | | 10 | 15 | 20 | 25 | 30 | | 40 | | 50 | 60 | $70^4$ | 80 | $90^4$ | 100 |
| n78 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | 90 | 100 |
| | 60 | | 10 | 15 | 20 | 25 | 30 | | 40 | | 50 | 60 | $70^4$ | 80 | 90 | 100 |
| n79 | 15 | | 10 | | 20 | | 30 | | 40 | | 50 | | | | | |
| | 30 | | 10 | | 20 | | 30 | | 40 | | 50 | 60 | $70^4$ | 80 | 90 | 100 |
| | 60 | | 10 | | 20 | | 30 | | 40 | | 50 | 60 | $70^4$ | 80 | 90 | 100 |
| n80 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n81 | 15 | 5 | 10 | 15 | 20 | | | | | | | | | | | |
| | 30 | | 10 | 15 | 20 | | | | | | | | | | | |
| | 60 | | | | | | | | | | | | | | | |
| 82 | 15 | 5 | 10 | 15 | 20 | | | | | | | | | | | |
| | 30 | | 10 | 15 | 20 | | | | | | | | | | | |
| | 60 | | | | | | | | | | | | | | | |
| n83 | 15 | 5 | 10 | 15 | 20 | | $30^7$ | | | | | | | | | |
| | 30 | | 10 | 15 | 20 | | $30^7$ | | | | | | | | | |
| | 60 | | | | | | | | | | | | | | | |
| n84 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n85 | 15 | 5 | 10 | 15 | | | | | | | | | | | | |
| | 30 | | 10 | 15 | | | | | | | | | | | | |
| | 60 | | | | | | | | | | | | | | | |
| n86 | 15 | 5 | 10 | 15 | 20 | | | | 40 | | | | | | | |
| | 30 | | 10 | 15 | 20 | | | | 40 | | | | | | | |
| | 60 | | 10 | 15 | 20 | | | | 40 | | | | | | | |
| n89 | 15 | 5 | 10 | 15 | 20 | | | | | | | | | | | |
| | 30 | | 10 | 15 | 20 | | | | | | | | | | | |
| | 60 | | | | | | | | | | 50 | | | | | |
| n90 | 15 | | 10 | 15 | 20 | | 30 | | 40 | | 50 | | | | | |
| | 30 | | 10 | 15 | 20 | | 30 | | 40 | | 50 | 60 | | 80 | 90 | 100 |
| | 60 | | 10 | 15 | 20 | | 30 | | 40 | | 50 | 60 | | 80 | 90 | 100 |
| n91 | 15 | 5 | $10^8$ | | | | | | | | | | | | | |
| | 30 | | | | | | | | | | | | | | | |
| | 60 | | | | | | | | | | | | | | | |
| n92 | 15 | 5 | 10 | 15 | 20 | | | | | | | | | | | |
| | 30 | | 10 | 15 | 20 | | | | | | | | | | | |
| | 60 | | | | | | | | | | | | | | | |
| n93 | 15 | 5 | $10^8$ | | | | | | | | | | | | | |
| | 30 | | | | | | | | | | | | | | | |
| | 60 | | | | | | | | | | | | | | | |
| n94 | 15 | 5 | 10 | 15 | 20 | | | | | | | | | | | |
| | 30 | | 10 | 15 | 20 | | | | | | | | | | | |
| | 60 | | | | | | | | | | | | | | | |
| n95 | 15 | 5 | 10 | 15 | | | | | | | | | | | | |
| | 30 | | 10 | 15 | | | | | | | | | | | | |
| | 60 | | 10 | 15 | | | | | | | | | | | | |
| n96 | 15 | | | | 20 | | | | 40 | | | | | | | |
| | 30 | | | | 20 | | | | 40 | | | 60 | | 80 | | |
| | 60 | | | | 20 | | | | 40 | | | 60 | | 80 | | |
| n97 | 15 | 5 | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |

TABLE 5-continued

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n98 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| | 15 | 5 | 10 | | | | | | | | | | | | | |
| n99 | 30 | | 10 | | | | | | | | | | | | | |
| | 60 | | 10 | | | | | | | | | | | | | |

NOTE 1:
Void.
NOTE 2:
Void.
NOTE 3:
This UE channel bandwidth is applicable only to downlink.
NOTE 4:
This UE channel bandwidth is optional in this release of the specification.
NOTE 5:
For this bandwidth, the minimum requirements are restricted to operation when carrier is configured as an SCell part of DC or Carrier Aggregation (CA) configuration.
NOTE 6:
For this bandwidth, the minimum requirements are restricted to operation when carrier is configured as a downlink Secondary Cell (SCell) part of CA configuration.
NOTE 7:
For the 20 MHz bandwidth, the minimum requirements are specified for NR UL carrier frequencies confined to either 713-723 MHz or 728-738 MHz. For the 30 MHz bandwidth, the minimum requirements are specified for NR UL transmission bandwidth configuration confined to either 703-733 or 718-748 MHz.
NOTE 8:
This UE channel bandwidth is applicable only to uplink.
NOTE 9:
Void.
NOTE 10:
These UE channel bandwidths are applicable to sidelink operation

TABLE 6

| Operating band | SCS (kHz) | UE channel bandwidth (MHz) | | | |
|---|---|---|---|---|---|
| | | 50 | 100 | 200 | 400[1] |
| n257 | 60 | 50 | 100 | 200 | |
| | 120 | 50 | 100 | 200 | 400 |
| n258 | 60 | 50 | 100 | 200 | |
| | 120 | 50 | 100 | 200 | 400 |
| n259 | 60 | 50 | 100 | 200 | |
| | 120 | 50 | 100 | 200 | 400 |
| n260 | 60 | 50 | 100 | 200 | |
| | 120 | 50 | 100 | 200 | 400 |
| n261 | 60 | 50 | 100 | 200 | |
| | 120 | 50 | 100 | 200 | 400 |
| n262 | 60 | 50 | 100 | 200 | |
| | 120 | 50 | 100 | 200 | 400 |

NOTE[1]:
This UE channel bandwidth is optional in this release of the specification.

The 3GPP E-UTRA standard (Rel. 8-17) is configured to transmit and receive TDD signals based on a subframe granularity. A predetermined uplink-downlink configuration (UL/DL Config) can be used to determine which subframes are used for uplink and which subframes are used for downlink. In an example, the 3GPP E-UTRA frame structure is configured with a radio frame of length 10 milliseconds (ms) that can include two half-frames of length 5 ms each. Each half-frame can include 5 subframes of length 1 ms. Each subframe can include two slots of length 0.5 ms each. The uplink-downlink configuration in a cell can vary between frames and controls in which a subframes uplink or downlink transmission can take place in the current frame. The supported uplink-downlink configurations can be configured as listed in FIG. 3a where, for each subframe in a radio frame, "D" can denote a downlink subframe reserved for downlink transmissions, "U" can denote an uplink sub-frame reserved for uplink transmissions, and "S" can denote a special subframe. The special subframes are used to communicate control information. Uplink-downlink configurations with both 5 ms and 10 ms downlink-to-uplink switch-point periodicity can be supported. In the case of 5 ms downlink-to-uplink switch-point periodicity, the special subframe can exist in both half-frames (slots). In the case of 10 ms downlink-to-uplink switch-point periodicity, the special subframe can exist in the first half-frame only. In the 3GPP E-UTRA Version 8 standard, there are seven different preconfigured uplink-downlink configurations, numbered between 0 and 6, as illustrated in FIG. 3a.

A 3GPP E-UTRA base station can be configured to transmit which of the seven UL/DL configurations will be used. In another example, a repeater can be configured to receive the UL/DL configuration indication from the base station. The configuration information is typically transmitted from the base station via higher layer signaling, such as radio resource control (RRC) signaling. In another example, for each radio frame, the repeater can demodulate and/or decode control information in a physical downlink control channel (PDCCH) or physical downlink shared channel (PDSCH) using a downlink control information (DCI) format type to receive UL/DL configuration. In one example, a repeater can be coupled to a TDD switch controller, such as a TDD sync detection module (SDM) or a modem that can be used to receive the 3GPP LTE UL/DL configuration information from a base station for a cellular signal associated with the base station. Alternatively, a UE can receive and decode the UL/DL configuration information from the base station (i.e. evolved Node B or eNB or next generation Node B or gNB) and communicate the UL/DL configuration information to the repeater via a wireless transmission using a predetermined wireless standard, such as Bluetooth or Wi-Fi (IEEE 802.11).

Figure 3B:
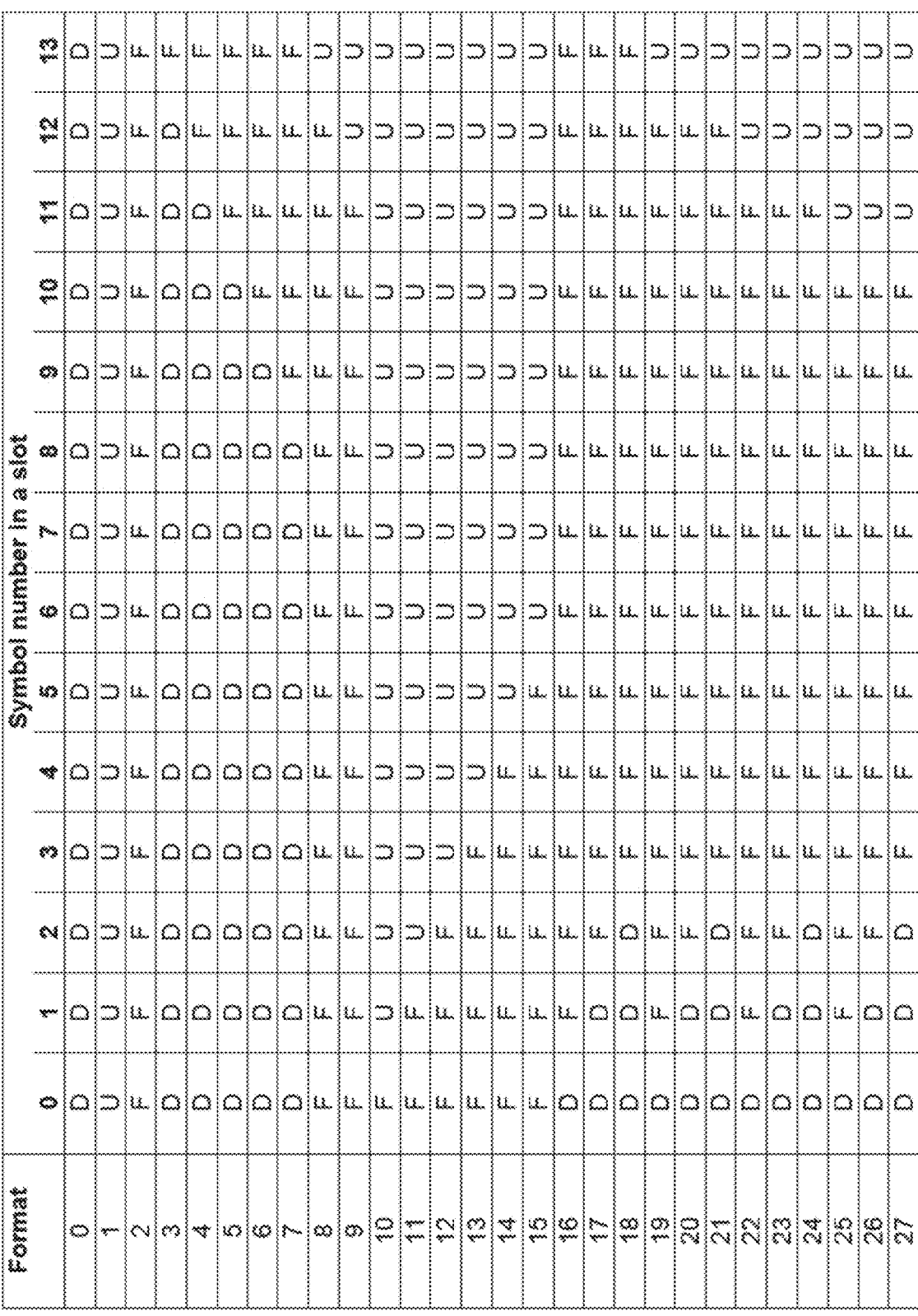
FIG. 3b-3c illustrates UL/DL configurations for 3GPP 5G NR in accordance with an example.
Figure 3C:
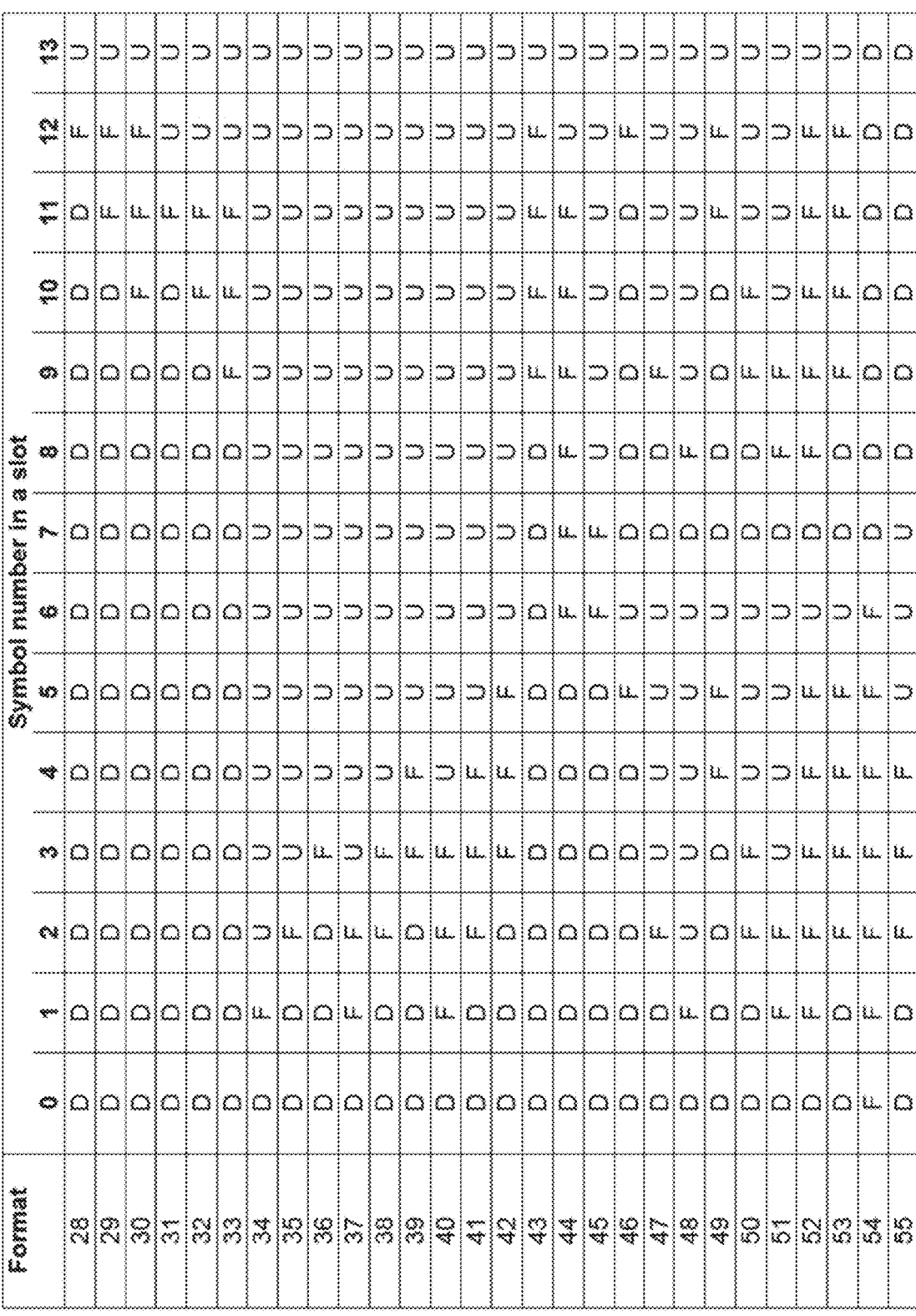

FIGS. 3b and 3c provide example UL/DL configurations for 3GPP 5G communication, as described in 3GPP 38.213 V 17.0.0 (December 2021). In 5G NR communication systems, a frame of 10 ms duration can include ten sub-frames of 1 ms duration, as in the E-UTRA standard. However, in the NR standard, each frame can comprise $2^U$ slots, where U is 1, 2, 3 or 4 and is a multiple of the SCS of 15 kilohertz (kHz). Each slot can include 14 orthogonal frequency division multiplexing (OFDM) symbols. The OFDM symbols in each slot can be classified as downlink 'D', flexible 'F', or uplink 'U'. In a slot in a downlink frame, downlink transmissions can only occur in 'downlink' or 'flexible' symbols. In a slot in an uplink frame, the uplink transmission can only occur in 'uplink' or 'flexible' symbols.

The UL/DL slot configurations for 5G NR are illustrated in FIGS. 3b and 3c. A slot format can be identified by a corresponding format index ranging from 0 to 55 where 'D' can denote a symbol for downlink transmission, 'U' can a symbol for uplink transmission, and 'F' can denote a flexible symbol. In another example, a slot format index 255 can have a slot format as disclosed in 3GPP TS 38.213 V17.0.0 (2021-12). Slot index formats 56-254 are currently reserved.

In another example, a repeater can be configured to receive the UL/DL configuration for the slot format per slot in one or more higher layer parameters via higher layer signaling (such as RRC signaling). The higher layer parameters can provide a reference subcarrier spacing, a slot configuration period, a number of downlink symbols, or a number of uplink symbols. In another example, the repeater can be configured to receive a higher layer parameter that can override only the flexible symbols per slot over a number of slots as provided by another higher layer parameter.

In another example, a repeater can be configured to receive a higher layer parameter that includes a set of slot format combinations, in which each slot format combination can include one or more slot formats as illustrated in FIGS. 3b and 3c. In another example, a repeater can be configured to demodulate and/or decode control information on a physical control channel or physical shared channel that includes a slot format. In one example, async detection module (SDM) or modem can be used to receive the 3GPP 5G UL/DL configuration information from a base station for a cellular signal associated with the base station. The SDM/modem is discussed near the end of the specification.

A repeater, can be configured to amplify and filter a time division duplex (TDD) frequency band in a wireless communications system for transmission from a wireless device, such as a UE, to a base station, such as a gNode B (gNB) and for transmission from a base station to the wireless device. The repeater can be coupled to a TDD sync detection module (SDM) or a modem that is configured to receive an UL/DL configuration and timing information for a TDD signal received at the repeater. A TDD repeater can use a TDD SDM to control switching and filtering of the TDD signals between transmission from a wireless device to a base station (e.g., an uplink (UL) transmission) and transmission from a base station to a wireless device (e.g., a downlink (DL) transmission). An SDM may be configured to identify the UL/DL configuration for multiple signals. Alternatively, a repeater can include multiple SDMs, with each SDM configured to determine the UL/DL configuration for a single TDD signal in a single TDD operating band.

Figure 4:
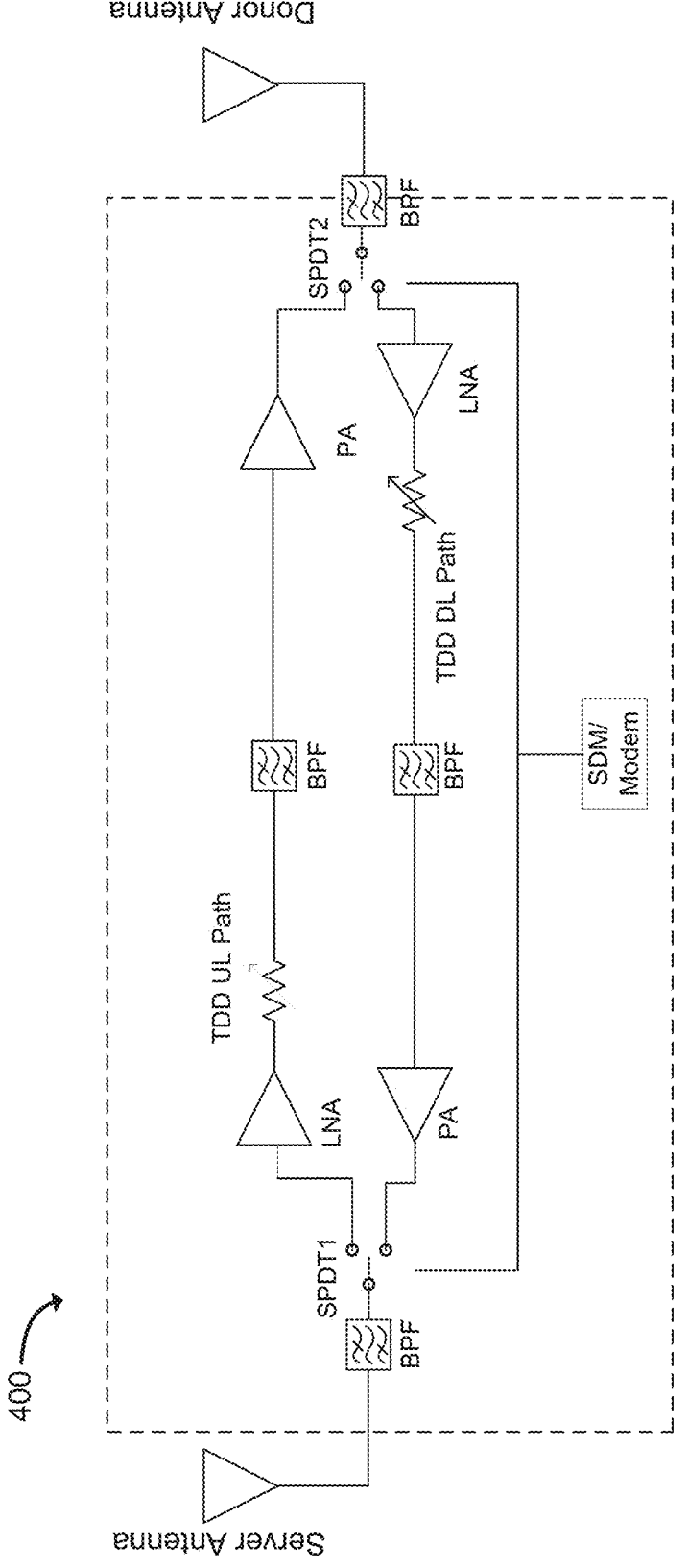
FIG. 4 illustrates a TDD repeater in accordance with an example.

FIG. 4 provides an example of a TDD repeater 400 that can use an SDM or modem to switch a first switch, such as a single pull double throw (SPDT1) between a TDD UL path and a TDD DL path. The SDM or modem can also switch a second switch, such as SPDT2 between the TDD UL path and the TDD DL path. Each path can include a low noise amplifier (LNA), a variable attenuator, a TDD bandpass filter (BPF) configured for the TDD operating band, and a power amplifier (PA). In one example, a TDD UL signal can be received from the UE at the server antenna, filtered by the BPF, and switched to the TDD UL path for amplification and filtering, then switched for additional bandpass filtering and transmitted from the donor antenna to a base station. Similarly, a TDD DL signal transmitted from a base station, such as an eNB for E-UTRA or a gNB for 5G, and received at the donor antenna, filtered in the bandpass filter, switched at SPDT2 to the TDD DL path for amplification and filtering, then switched using SPDT 1 for additional bandpass filtering and directed to the server antenna for transmission to a UE.

Figure 5A:
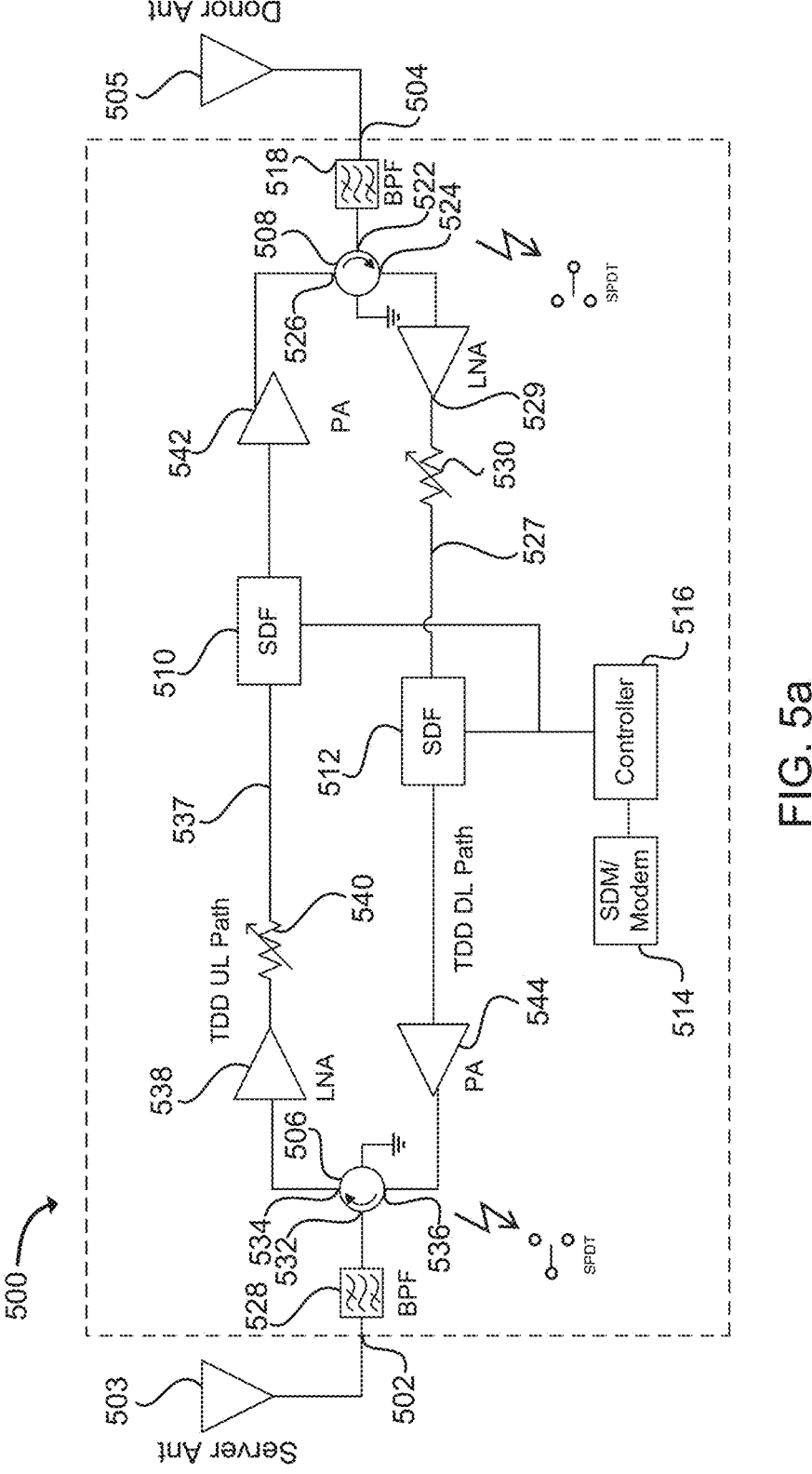
FIG. 5a illustrates a TDD repeater with circulators in accordance with an example.

FIG. 5a provides an example of an alternative embodiment of a TDD repeater 500. In this example, the repeater 500 includes circulators 506, 508 instead of using switches, such as the SPDT1 and SPDT2 of the repeater of FIG. 4. In addition, software defined filters (SDF) 510, 512 are configured to filter the TDD signals received at the donor port 504 from the donor antenna 505 and at the server port 502 from the server antenna 503. The SDFs 510, 512 can be communicatively coupled to an SDM/modem 514 via a controller 516. The SDFs 510, 512 can be separate processors or a single processor used for both of a first amplification and filtering path 537a and a second amplification and filtering path 527a. The SDM/modem can provide an UL/DL configuration and timing information to the SDF 510, 512. In one embodiment, a single SDM/modem 514 can provide the UL/DL configuration and timing to both SDFs 510, 512. Alternatively, separate SDMs or modems (i.e. two SDMs, two modems, or one SDM and one modem) can provide the UL/DL configuration and timing to the SDFs 510, 512.

In the example illustrated in FIG. 4, the switches SPDT1 and SPDT2 are configured with the SDM so that the TDD UL signals are routed along the TDD UL path, and the TDD DL signals are routed along the TDD DL path. In contrast, in the example of FIG. 5a, the circulators 506, 508 operate differently than the switches. A circulator is a radio frequency device with 3 or 4 ports. A signal entering a port in the circulator will exit at the next port. In this example, the fourth port is set to ground. A circulator provides about 16 to 25 dB of isolation between each port in the circulator. A repeater typically requires a greater level of total loop isolation/attenuation than the total amount of loop gain of the repeater. If the loop gain (as measured in decibels) is greater than the loop isolation/attenuation (as measured in decibels), then the repeater can destructively resonate or oscillate and cause problems in the communication network.

A switched TDD repeater 400, as illustrated in FIG. 4, has the advantage of being able to disable components in the 'off' path. This allows the repeater to operate without the need for the switches to provide all of the necessary isolation. Disabling components reduces the overall loop gain and increases the attenuation.

In contrast, a bi-directional TDD repeater, such as the TDD repeater 500 illustrated in the example of FIG. 5a, is designed to obtain substantially all of the isolation/attenuation from the circulators 506, 508 and SDF(s) 510, 512. The SDF(s) 510, 512 can provide filters with a sufficiently sharp roll-off to effectively create a guard band between the UL and DL channels of TDD signals with different frequencies.

The use of circulators 506 and 508 in FIG. 5a typically provide about 16 to dB of isolation and 0.2 to 1.0 dB of insertion loss (IL) as the signal passes through the circulator. The passband filters 528 and 518 can also provide some isolation, such as 0.5 dB to 3 dB for a typical passband filter.

The variable attenuators 540 and 530 can be used to reduce the amplitude of the signals in the TDD UL path and TDD DL path.

In one example, a gain of 20 dB can be assumed per LNA (528, 538) and PA (542, 544). An additional loss of approximately 2 dB per passive component (i.e. 518, 528, 530, 540) provides for 8 dB of loss, for a total loop gain of 72 dB.

Each SDF 510, 512 can provide 30 to 50 dB of isolation. Each circulator 506, 508 can provide 16 dB of isolation. With 30 dB of isolation at each SDF, the total loop crossover isolation is 16+16+30+30=92 dB of isolation. Accordingly, in this example, the total loop crossover isolation is 20 dB greater than the total loop gain, which enables the repeater to operate without going into oscillation.

The actual isolation provided by each SDF 510, 512 can depend on the frequency bands that are filtered. When two cellular signals with relatively low bandgaps are filtered, the isolation of the SDF can be reduced. However, the overall system can be designed with a total loop gain that is less than a total loop crossover isolation. This will be discussed more fully in the proceeding paragraphs.

In one example embodiment, a TDD signal can be received at the donor port 504 of the repeater 500 in FIG. 5*a*. The TDD signal received at the donor port can include both DL signals received from one or more base stations, and UL signals received from one or more UEs. The received TDD signals will be half-duplexed (HD) such that the UL signals and DL signals will be separated into UL time slots and DL time slots, as shown in FIG. 1*b*. The TDD signal can be filtered using a bandpass filter (BPF) 518 that is configured to allow the TDD signal of a selected operating band, such as a 3GPP E-UTRA TDD band or a 3GPP NR TDD band, to pass to a first port 522 of the circulator 508 and exit at the second port 524 of the circulator 508 along the TDD DL path 527. At this point, the TDD signal will include both UL signals in UL time slots, and DL signals in DL time slots, as shown in FIG. 1*b*. The received TDD signal can be amplified with an amplifier, such as a low noise amplifier (LNA) 529 or another desired type of amplifier, and attenuated a selected amount, if desired, using a variable attenuator 530. The TDD signal is then directed from the variable attenuator 530 to the SDF 512, where the TDD signal can be digitized and filtered. The TDD signal output from the SDF 512 can be amplified with a power amplifier (PA) 544 and directed to the fourth port 536 of the circulator 506, where the TDD signal will exit the first port 532, pass through the BPF 528, and be directed to the server port 502 for transmission at the server antenna 503.

Similarly, a TDD signal received at the server port 502 of the repeater 500 can be filtered using the BPF 528 that is configured to allow the TDD signal of the selected TDD operating band to pass to a first port 532 of a second circulator 506 and exit at the circulator's 506 second port 534 along a TDD UL path 537 for amplification with an LNA 538 or another type of amplifier and attenuation, if needed, using an attenuator, such as a variable attenuator 540. The TDD signal is then directed from the variable attenuator 540 to the SDF 510, where the TDD signal can be digitized, filtered, and output with a predetermined gain. The predetermined gain can be a positive gain, a negative gain, or a unitary gain. The TDD signal output from the SDF 510 can be amplified with a power amplifier (PA) 542 and directed to the fourth port 526 of the circulator 508, where the TDD signal will exit the first port 522, pass through the BPF 518, and be directed to the donor port 504 for transmission at the donor antenna 505.

In one alternative, a switch, such as an SPDT switch can be used in place of each circulator 506, 508 as shown in FIG. 4. The SPDT can be switched by the controller 516 that is in communication with the SDM/modem 514 based on the UL/DL configuration and signal timing of the TDD signal that is received by the SDM/modem 514 for the TDD signals communicated to the donor port 504 or server port 502.

While port numbering for the circulators 506, 508 has been provided for clarity, the numbering is not intended to be limiting. A TDD signal may enter any port of the circulator and exit at the next port, as can be appreciated.

Figure 5B:
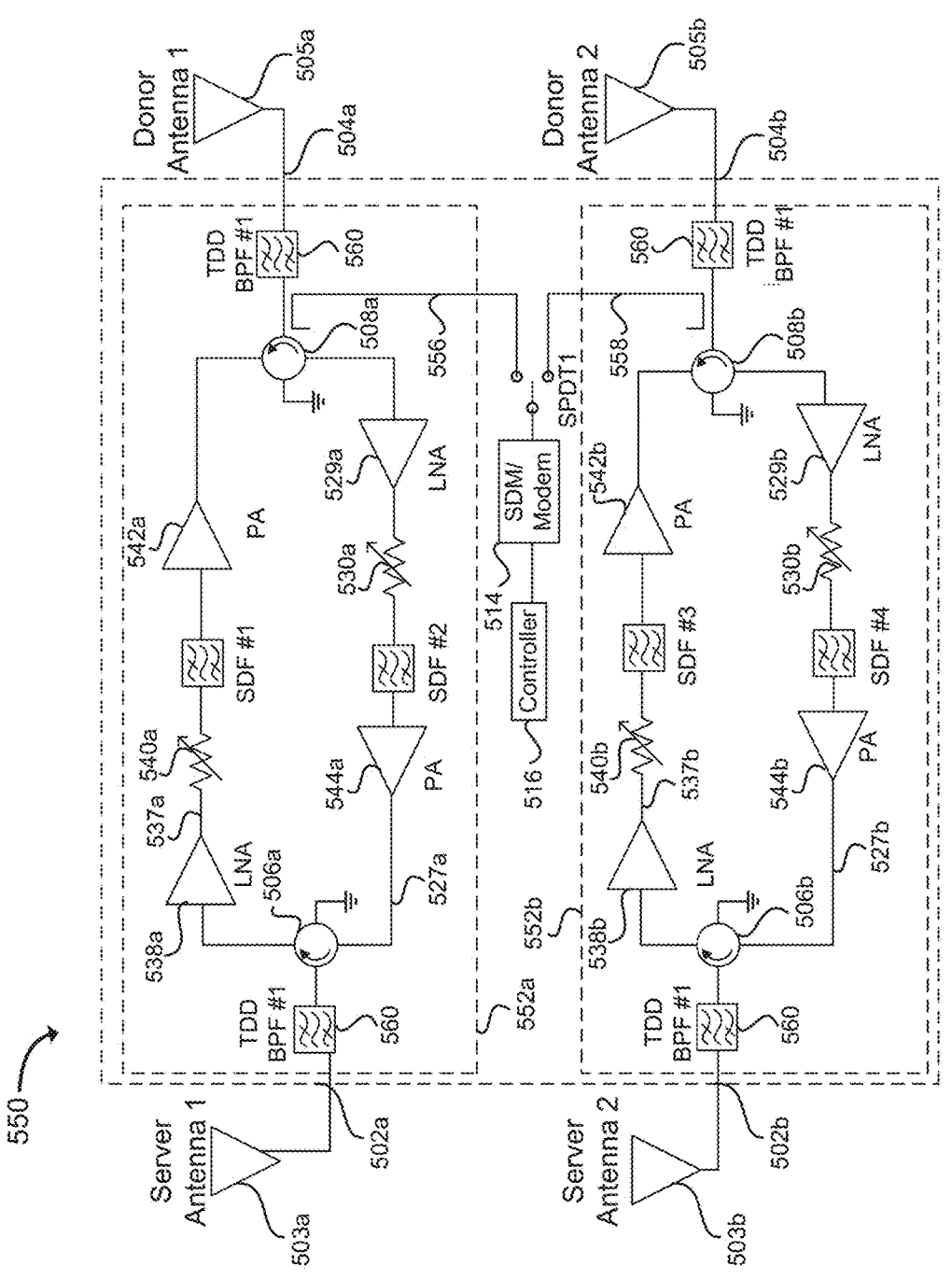
FIG. 5b illustrates a TDD switchable repeater with circulators in accordance with an example.

FIG. 5*b* provides another example embodiment of a TDD repeater. In this example, a TDD switchable repeater 550 is configured with two separate TDD sections 552*a* and 552*b*. In this embodiment, each section 552*a* and 552*b* is coupled to a separate donor port 504*a* and 504*b*, and server port 502*a* and 502*b*, respectively. The donor port 504*a* is configured to be coupled to a first donor antenna 505*a*. The donor port 504*b* is configured to be coupled to a second donor antenna 505*b*. Similarly, server port 502*a* is configured to be coupled to a first server antenna 503*a* and server port 502*b* is configured to be coupled to a second server antenna 503*b*.

The first TDD section 552*a* can include a first amplification and filtering path 537*a* and a second amplification and filtering path 527*a*. The first amplification and filtering path 537*a* can be communicatively coupled between the first server port 502*a* and the first donor port 504*a*. The first amplification and filtering path 537*a* can include a first SDF configured to filter a first first-direction signal in a first TDD band.

The second amplification and filtering path 527*a* can be communicatively coupled between the first server port 502*a* and the first donor port 504*a*. The second amplification and filtering path 527*a* can include a second SDF configured to filter a first second-direction signal in the first TDD band.

The first SDF and the second SDF can be separate processors or a single processor used for both of the first amplification and filtering path 537*a* and the second amplification and filtering path 527*a*.

The second TDD section 552*b* can include a third amplification and filtering path 537*b* and a fourth amplification and filtering path 527*b*. The third amplification and filtering path 537*b* can be communicatively coupled between the second server port 502*b* and the second donor port 504*b*. The third amplification and filtering path 537*b* can include a third SDF configured to filter a second first-direction signal or the first first-direction signal in a second TDD band or the first TDD band, respectively.

A fourth amplification and filtering path 527*b* can be communicatively coupled between the second server port 502*b* and the second donor port 504*b*. The fourth amplification and filtering path can include a fourth SDF configured to filter a second second-direction signal or the first second-direction signal in a second TDD band or the first TDD band, respectively.

The third SDF and the fourth SDF can be separate processors or a single processor used for both of the third amplification and filtering path 537*b* and the fourth amplification and filtering path 527*a*.

The TDD switchable repeater 550 can further comprise a TDD SDM 514 configured to determine one or more of: UL/DL configuration information and signal timing for the first first-direction signal in the first TDD band and the first second-direction signal in the first TDD band; or UL/DL configuration information and signal timing for the second first-direction signal in the second TDD band and the second second-direction signal in the second TDD band. The TDD SDM 514 can operate in a similar manner as previously described in FIGS. 4 and 5a. A controller 516 can be coupled to the TDD SDM 514. The TDD SDM 514 can be coupled to the first TDD section 552a via a first sync detection path 556 and coupled to the second TDD section 552b via a second sync detection path 558, as shown in FIG. 5b. A switch can be used to enable the TDD SDM/modem 514 to switch between the first sync detection path 556 and the second sync detection path 558. Alternatively, the TDD SDM/modem 514 can be coupled to both of the first TDD section 552a and the second TDD section 552b to continuously receive UL/DL configuration information and signal timing for the TDD UL/DL signals received at both of the first TDD section 552a and the second TDD section 552b. In another embodiment, a separate TDD SDM 514 can be coupled to each of the first TDD section 552a and the second TDD section 552b. Each SDM can be coupled to the controller 516.

In another example, the TDD switchable repeater 550 can be configured to provide multiple input multiple output (MIMO) communication with the first SDF, the second SDF, the third, SDF and the fourth SDF all configured to filter a TDD UL/DL signal in the first TDD band. In this example, a TDD UL/DL signal in the same E-UTRA or 5G TDD band can be received at each server port 502a, 502b and donor port 504a, 504b for filtering and amplification in the respective sections 552a and 552b to provide the repeater with MIMO repeating capability.

The first, second, third and fourth SDFs in the TDD switchable repeater 550 can be rapidly configured (i.e. typically in less than one microsecond) to filter either the same TDD band or different TDD bands to switch the TDD switchable repeater 550 into a MIMO TDD repeater or a multi-band TDD repeater.

In one example, the controller 516 in the TDD switchable repeater 550 is configured to provide the UL/DL configuration information and signal timing for the first first-direction signal in the first TDD band and the first second-direction signal in the first TDD band to the first SDF, the second SDF, the third SDF and the fourth SDF to enable the TDD switchable repeater 550 to provide MIMO communication.

In another embodiment, the controller 516 can provide the UL/DL configuration information and signal timing for the first first-direction signal in the first TDD band and the first second-direction signal in the first TDD band to the first SDF and the second SDF, and the UL/DL configuration information and signal timing for the second first-direction signal in the second TDD band and the second second-direction signal in the second TDD band to the third SDF and the fourth SDF to enable the TDD switchable repeater 550 to provide TDD communication on multiple TDD bands.

In one embodiment, the TDD switchable repeater 550 can further comprise a first TDD server signal directing component 506a communicatively coupled to the first server port 502a, the first amplification and filtering path 537a, and the second amplification and filtering path 527a. A first TDD donor signal directing component 508a can be communicatively coupled to the first donor port 504a, the first amplification and filtering path 537a, and the second amplification and filtering path 527a. A second TDD server signal directing component 506b can be communicatively coupled to the second server port 502b, the third amplification and filtering path 537b, and the fourth amplification and filtering path 527b. A second TDD donor signal directing component 508b can be communicatively coupled to the second donor port 504b, the third amplification and filtering path 537b, and the fourth amplification and filtering path 527b. In the example of FIG. 5a, each signal directing component is a circulator. In an alternative embodiment, each signal directing component can be a duplexer. In another embodiment, one or more circulators and one or more duplexers may be used.

The first amplification and filtering path 537a can include an amplifier, such as a first server low noise amplifier 538a communicatively coupled between the first server circulator 506a and the first SDF. A first server variable attenuator 540a can be communicatively coupled between an output of the first server LNA 538a and the first SDF. A first server power amplifier 542a can be coupled between the first SDF and the first donor circulator 508a.

The second amplification and filtering path 527a can include an amplifier, such as a first donor low noise amplifier 529a communicatively coupled between the first donor circulator 508a and the second SDF. A first donor variable attenuator 530a can be communicatively coupled between an output of the first donor LNA 529a and the second SDF. A first donor power amplifier 544a can be coupled between the second SDF and the first server circulator 506a.

The third amplification and filtering path 537b can include an amplifier, such as a second server low noise amplifier 538b communicatively coupled between the second server circulator 506b and the third SDF. A second server variable attenuator 540b can be communicatively coupled between an output of the second server LNA 538b and the third SDF. A second server power amplifier 542b can be coupled between the third SDF and the second donor circulator 508b.

The fourth amplification and filtering path 527b can include an amplifier, such as a second donor low noise amplifier 529b communicatively coupled between the second donor circulator 508b and the fourth SDF. A second donor variable attenuator 530b can be communicatively coupled between an output of the second donor LNA 529b and the fourth SDF. A second donor power amplifier 544b can be coupled between the fourth SDF and the second server circulator 506b.

TDD bandpass filters (BPF) 560 can be coupled between the first server port 502a and the first server circulator 506a, the first donor circulator 508a and the first donor antenna port 504a, the second server port 502b and the second server circulator 506b, and the second donor port 504b and the second donor circulator 508b, as shown in FIG. 5b. In the example of FIG. 5b, each of the TDD bandpass filters can be configured to filter the same E-UTRA or 5G TDD band when the TDD switchable repeater 550 is configured to provide MIMO communication (i.e. the same TDD band).

The use of circulators illustrated in the example of FIG. 5b is not intended to be limiting to the TDD switchable repeater 550. For instance, a number of different types of signal directing components could be used in place of a circulator. In one embodiment, illustrated in FIG. 5c, the TDD switchable repeater 550 can further comprise a first TDD server signal directing component 566a communicatively coupled to the first server port 502a, the first amplification and filtering path 537a, and the second amplification and filtering path 527a. A first TDD donor signal directing component 568a can be communicatively coupled to the first donor port 504a, the first amplification and filtering path 537a, and the second amplification and filtering path 527a. A second TDD server signal directing component 566b can be communicatively coupled to the second server port 502b, the third amplification and filtering path 537b, and the fourth amplification and filtering path 527b. A second TDD donor signal directing component 568b can be communicatively coupled to the second donor port 504*b*, the third amplification and filtering path 537*b*, and the fourth amplification and filtering path 527*b*.

Figure 5C:
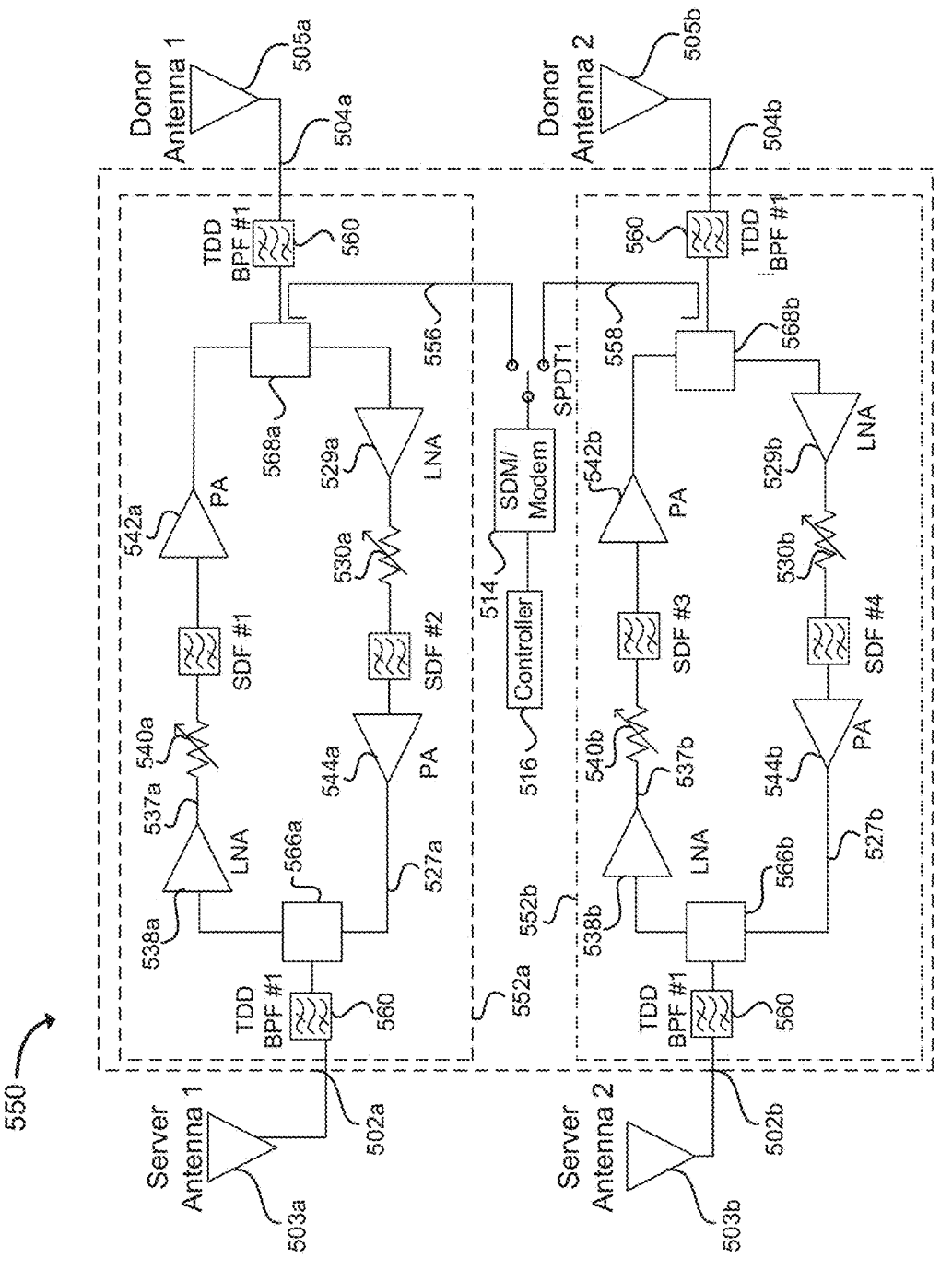
FIG. 5c illustrates a TDD switchable repeater with signal directing components in accordance with an example.
Figure 5D:
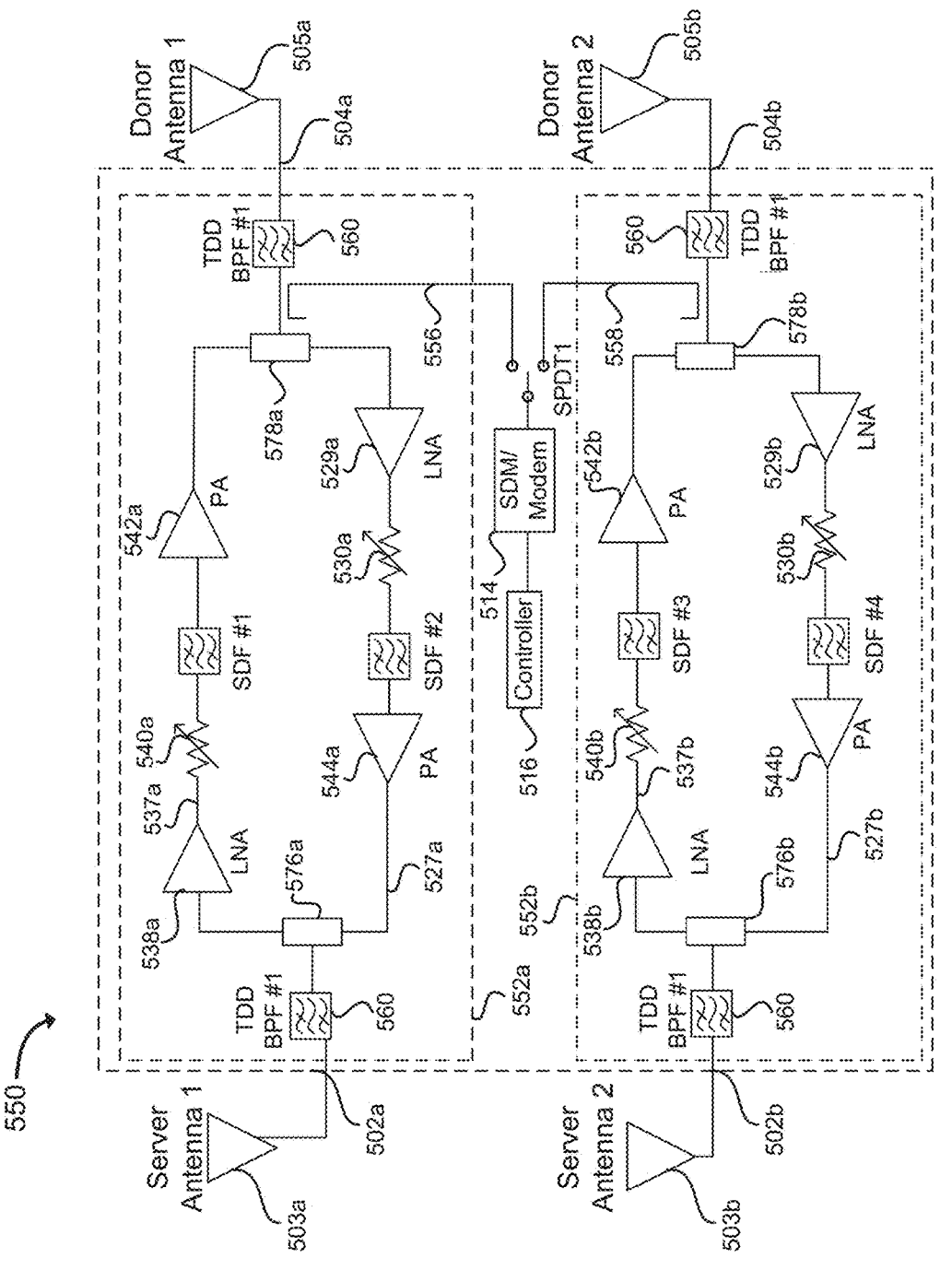
FIG. 5d illustrates a TDD switchable repeater with duplexers in accordance with an example.

In another embodiment, illustrated in FIG. 5*d*, the TDD switchable repeater 550 can further comprise a first TDD server duplexer 576*a* communicatively coupled to the first server port 502*a*, the first amplification and filtering path 537*a*, and the second amplification and filtering path 527*a*. A first TDD donor duplexer 578*a* can be communicatively coupled to the first donor port 504*a*, the first amplification and filtering path 537*a*, and the second amplification and filtering path 527*a*. A second TDD server duplexer 576*b* can be communicatively coupled to the second server port 502*b*, the third amplification and filtering path 537*b*, and the fourth amplification and filtering path 527*b*. A second TDD donor duplexer 578*b* can be communicatively coupled to the second donor port 504*b*, the third amplification and filtering path 537*b*, and the fourth amplification and filtering path 527*b*.

Figure 6A:
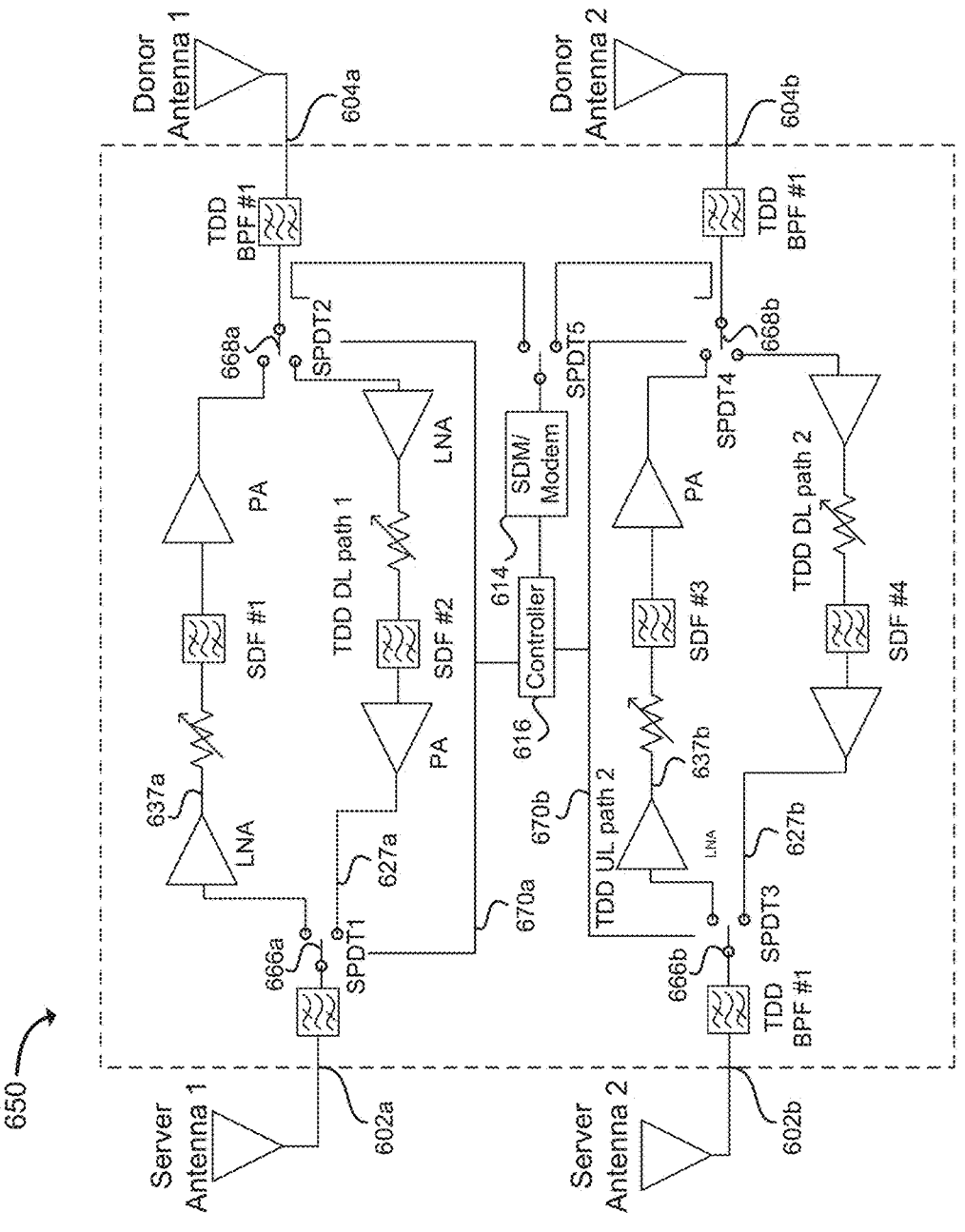
FIG. 6a illustrates a TDD switchable repeater with switches in accordance with an example.

In the example of FIG. 5*b*, each signal directing component is a circulator. In an alternative embodiment, each signal directing component can be a duplexer (FIG. 5*d*) or a switch (FIG. 6*a*). In another embodiment, one or more circulators, switches and/or duplexers may be used in the TDD switchable repeater 550.

In another embodiment, FIG. 5*c* illustrates an example off a dual path time division duplex (TDD) repeater 550 comprising a first server antenna port 502*a* and a first donor antenna port 504*a*. A first bidirectional TDD amplification and filtering path 552*a* can be coupled between the first server antenna port 502*a* and the first donor antenna port 504*a*. The first bidirectional TDD amplification and filtering path 552*a* can comprise a first software defined filter SDF (SDF #1/2) configured to filter: at least a first TDD uplink (UL) signal of a first TDD frequency range within a first TDD band and output the first TDD UL signal with a predetermined gain; or at least a first TDD downlink (DL) signal of the first TDD frequency range within the first TDD band and output the first TDD DL signal with a predetermined gain. While SDF #1 and SDF #2 are illustrated as two separate SDFs in FIGS. 5*b* and 5*c*, this is not intended to be limiting. The SDF #1 and SDF #2 can be implemented as in a single processor, as previously discussed.

The dual path TDD repeater 550 can further comprise a second server antenna port 502*b* and a second donor antenna port 504*b*. A second bidirectional TDD amplification and filtering path 552*b* can be coupled between the second server antenna port 502*b* and the second donor antenna port 504*b*. The second bidirectional TDD amplification and filtering path 552*b* can comprise a second SDF (SDF #3/4) configured to filter: at least a second TDD uplink (UL) signal of a second TDD frequency range within a second TDD band and output the second TDD UL signal with a predetermined gain; or at least a second TDD downlink (DL) signal of the second TDD frequency range within the second TDD band and output the second TDD DL signal with a predetermined gain. While SDF #3 and SDF #4 are illustrated as two separate SDFs in FIGS. 5*b* and 5*c*, this is not intended to be limiting. The SDF #3 and SDF #4 can be implemented as in a single processor, as previously discussed.

The dual path TDD repeater 550 can further comprise a controller 516 configured to be coupled to provide a timing signal and an UL/DL configuration for one or more of the first TDD UL signal, the first TDD DL signal, the second TDD UL signal, and the second TDD DL signal. At least one TDD sync detection module (SDM) 514 can be coupled to the controller. The at least one SDM is configured to receive the timing signal and the UL/DL configuration and send it to the controller for the one or more of the first TDD UL signal and the first TDD DL signal and the second TDD UL signal and the second TDD DL signal. The SDM 514 can be coupled to one or more of the first bidirectional amplification and filtering path 552*a* or the second bidirectional amplification and filtering path 552*b*. The SDM 514 can be coupled to the paths 552*a* and/or 552*b* directly, or via a switch.

In another embodiment, the dual path TDD repeater 550 can further comprise at least one modem 514 configured to receive the timing signal and the UL/DL configuration and send it to the controller 516 for the one or more of the first TDD UL signal and the first TDD DL signal and the second TDD UL signal and the second TDD DL signal.

The first bidirectional TDD amplification and filtering path 552*a* of the dual path TDD repeater 550 can further comprise a first first-direction amplification and filtering path 537*a* configured to carry the at least the first TDD UL signal of the first TDD frequency range within the first TDD band, and a first second-direction amplification and filtering path 527*a* configured to carry the at least the first TDD DL signal of the first TDD frequency range within the first TDD band. A first signal directing component 566*a* is configured to communicatively couple the first server antenna port 502*a* to the first first-direction amplification and filtering path 537*a* and the first-second-direction amplification and filtering path 527*a*. A second signal directing component 568*a* is configured to communicatively couple the first donor antenna port 504*a* to the first first-direction amplification and filtering path 537*a* and the first-second-direction amplification and filtering path 527*a*.

The first first-direction amplification and filtering path 537*a* can further comprise a low noise amplifier (LNA) 538 coupled between the first signal directing component 566*a* and an input of the first SDF (SDF #1/2). A variable attenuator 540*a* can be coupled between the LNA 538*a* and the input of the first SDF (SDF #1/2). A power amplifier (PA) 542*a* can be coupled between an output of the first SDF (SDF #1/2) and the second signal directing component 568*a*.

The first second-direction amplification and filtering path 527*a* can further comprise a low noise amplifier (LNA) 529*a* coupled between the second signal directing component 568*a* and an input of the first SDF (SDF #1/2). A variable attenuator 530*a* can be coupled between the LNA 529*a* and the input of the first SDF (SDF #1/2). A power amplifier (PA) 544*a* can be coupled between an output of the first SDF (SDF #1/2) and the first signal directing component 566*a*.

In one embodiment, the first signal directing component 566*a* and the second signal directing component 568*a* are one or more of a circulator (i.e. 506*a*, 508*a* in FIG. 5*b*) or a switch (666*a*, 668*a* in FIG. 6*a*) or a duplexer.

The first bidirectional TDD amplification and filtering path 552*a* can further comprise a first TDD bandpass filter 560 coupled between the first server antenna port 502*a* and the first signal directing component 566*a*. A second TDD bandpass filter 560 can be coupled between the first donor antenna port 504*a* and the second signal directing component 568*a*. The first TDD bandpass filter 560 and the second TDD bandpass filter can each be comprised of a switchable bank of bandpass filters 680, 682 (FIG. 6*b*), respectively, to enable multiple different TDD bands to be directed through the first bidirectional TDD amplification and filtering path 552*a*.

The second bidirectional TDD amplification and filtering path 552*b* of the dual path TDD repeater can further comprise a second first-direction amplification and filtering path 537b configured to carry the at least the second TDD UL signal of the second TDD frequency range within the second TDD band, and a second second-direction amplification and filtering path 527b configured to carry the at least the second TDD DL signal of the second TDD frequency range within the second TDD band. A third signal directing component 566b is configured to communicatively couple the second server antenna port 502b to the second first-direction amplification and filtering path 537b and the second second-direction amplification and filtering path 527b. A fourth signal directing component 568b is configured to communicatively couple the second donor antenna port 504b to the second first-direction amplification and filtering path 537b and the second second-direction amplification and filtering path 527b.

The second first-direction amplification and filtering path 537b can further comprise a low noise amplifier (LNA) 538b coupled between the third signal directing component 566b and an input of the second SDF (SDF #3/4). A variable attenuator 540b can be coupled between the LNA 538b and the input of the second SDF (SDF #3/4). A power amplifier (PA) 542b can be coupled between an output of the second SDF (SDF #3/4) and the fourth signal directing component 568b.

The second second-direction amplification and filtering path 527b can further comprise a low noise amplifier (LNA) 529b coupled between the fourth signal directing component 568b and an input of the second SDF (SDF #3/4). A variable attenuator 530b can be coupled between the LNA 529b and the input of the second SDF (SDF #3/4). A power amplifier (PA) 544b can be coupled between an output of the second SDF (SDF #3/4) and the third signal directing component 566b.

The third signal directing component 566b and the fourth signal directing component 56b can be one or more of a circulator (506b, 508b in FIG. 5b) or a switch (666b, 668b in FIG. 6a) or a duplexer.

The second bidirectional TDD amplification and filtering path 552b can further comprise a first TDD bandpass filter 560 coupled between the second server antenna port 502b and the third signal directing component 566b. A second TDD bandpass filter 560 can be coupled between the second donor antenna port 504b and the fourth signal directing component 568b.

The first TDD bandpass filter 560 can be comprised of a first switchable bank of bandpass filters 680 and the second TDD bandpass filter 560 can be comprised of a second switchable bank of bandpass filters 682 to enable different TDD bands to be directed through the second bidirectional TDD amplification and filtering path 552b.

Figure 5E:
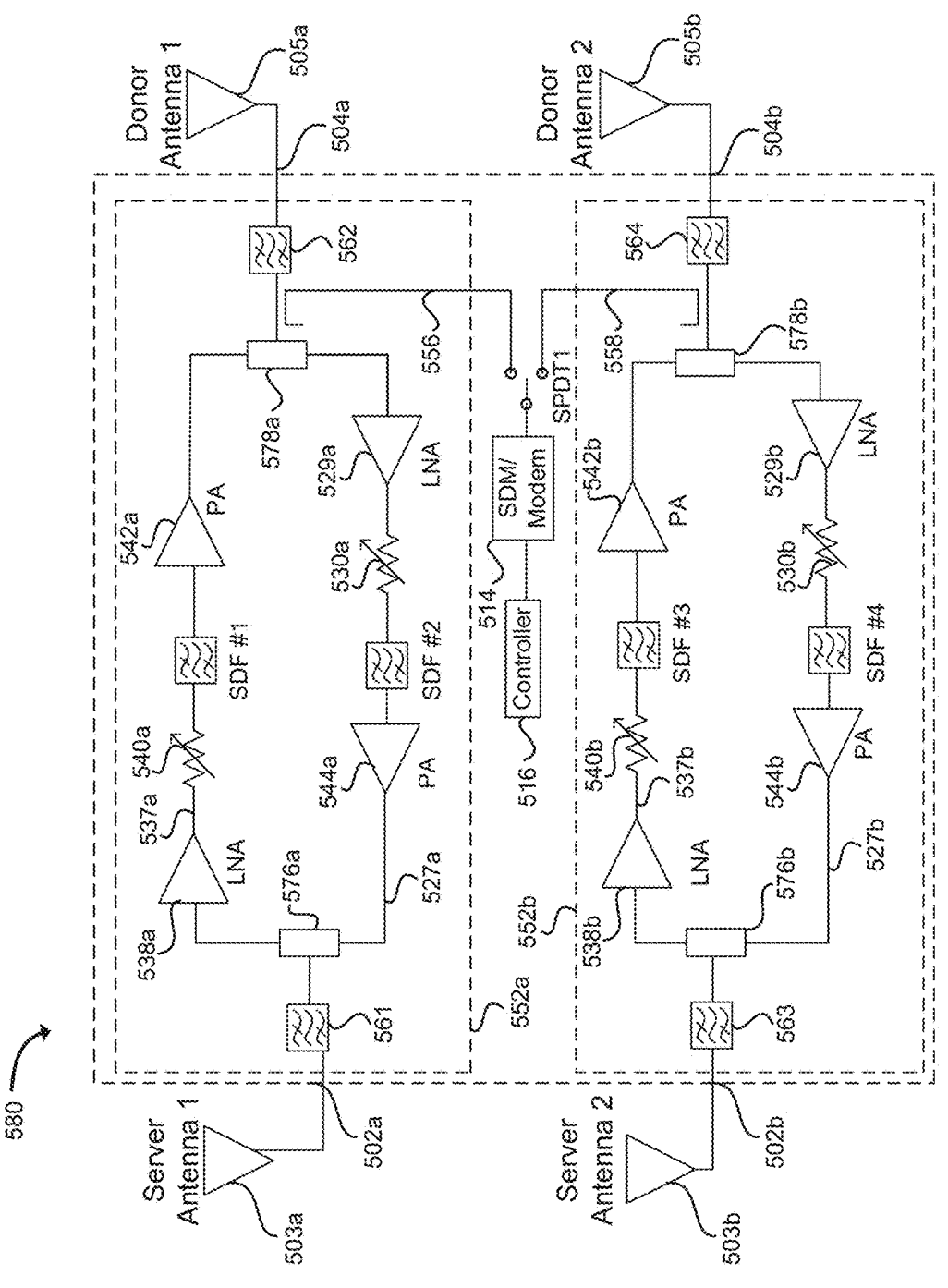
FIG. 5e illustrates an FDD/TDD dual path repeater having a split mode and a multiple input multiple output (MIMO) mode in accordance with an example.

In another embodiment, as illustrated in the example of FIG. 5e, a dual path repeater 580 having a split mode and a multiple input multiple output (MIMO) mode is disclosed. In this example, the dual path repeater 580 can be configured for TDD signals or FDD signals. The TDD/FDD repeater 580 can be configured to operate in a split mode, in which separate TDD or FDD bands are filtered and amplified on each path. Alternatively, the TDD/FDD repeater 580 can be configured to operate in a MIMO mode, in which the same TDD or FDD bands are filtered and amplified on each path.

The dual path repeater 580 can be configured to provide a dual band repeater or a single band 2×2 MIMO repeater for TDD or FDD signals. This is not intended to be limiting. The repeater 580 can be an N path repeater for TDD or FDD signals, where N is a whole number equal to or greater than 2, to provide an N band repeater or a single band N×N MIMO repeater with N server antenna ports and N donor antenna ports. The server antenna ports are configured to be coupled to server antennas, and the donor antenna ports are configured to be coupled to donor antennas.

In one example, the dual path repeater 580 having a split mode and a MIMO mode can comprise a first server antenna port 502a and a first donor antenna port 504a. A first bidirectional amplification and filtering path 552a can be coupled between the first server antenna port 502a and the first donor antenna port 504a or between the first donor antenna port 504a and the first server antenna port 502a is disclosed. The first bidirectional amplification and filtering path 552a can comprise a first software defined filter (SDF) (i.e. SDF #1/2) configured to filter at least a first uplink (UL) signal of a first UL frequency range within a first UL frequency band and output the first UL signal with a predetermined gain; or at least a first downlink (DL) signal of the first DL frequency range within a first DL frequency band and output the first DL signal with a predetermined gain. The SDF #1 and SDF #2 can be a single SDF (i.e. a first SDF).

The dual path repeater 580 having a split mode and a MIMO mode can further comprise a second server antenna port 502b and a second donor antenna port 504b. A second bidirectional amplification and filtering path 552b can be coupled between the second server antenna port 502b and the second donor antenna port 504b or between the second donor antenna port 504b and the second server antenna port 502b. The second bidirectional amplification and filtering path 552b can comprise a second SDF (i.e. SDF #3/4) configured to filter: at least a second uplink (UL) signal of a second UL frequency range within a second UL band and output the second UL signal with a predetermined gain; or at least a second downlink (DL) signal of the second DL frequency range within a second DL band and output the second DL signal with a predetermined gain. The SDF #3 and SDF #4 can be a single SDF (i.e. a second SDF).

The dual path repeater 580 having a split mode and a MIMO mode can further comprise a controller 516 operable to configure one or more of the first SDF and the second SDF to operate the dual path repeater in one of: a split mode with the first SDF and the second SDF configured for the first UL frequency range to be different from the second UL frequency range and the first DL frequency range to be different from the second DL frequency range; and a multiple-input multiple-output (MIMO) mode with the first SDF and the second SDF configured for the first UL frequency range to be the same as the second UL frequency range and the first DL frequency range to be the same as the second DL frequency range.

In one embodiment, the controller 516 can be operable to configure the first SDF and the second SDF to filter frequency division duplex (FDD) signals within one or more of the first UL frequency band, the first DL frequency band, the second UL frequency band, or the second DL frequency band, wherein the first UL frequency band is a first FDD UL frequency band and the first DL frequency band is a first FDD DL frequency band; and the second UL frequency band is a second FDD UL frequency band and the second DL frequency band is a second FDD DL frequency band. The FDD signals can be allocated as channels within the FDD UL and DL frequency bands.

In another embodiment, the controller 516 is operable to configure the first SDF and the second SDF to filter time division duplex (TDD) signals, wherein the first UL frequency band and the first DL frequency band are a same first frequency band that is a first TDD frequency band; and the second UL frequency band and the second DL frequency band are a same second frequency band that is a second TDD frequency band.

In another embodiment, the dual path repeater 580 having a split mode and a MIMO mode can further comprise at least one TDD sync detection module 514 (SDM) configured to receive a timing signal and an UL/DL configuration and send it to the controller 516 for the one or more of the first UL signal and the first DL signal in the first TDD frequency band and the second UL signal and the second DL signal in the second TDD frequency band. The SDM can be coupled to one or more of the first bidirectional amplification and filtering path 552a or the second bidirectional amplification and filtering path 552b.

In another embodiment, the dual path repeater 580 having a split mode and a MIMO mode can further comprise at least one modem 514 configured to receive a timing signal and an UL/DL configuration and send it to the controller for the one or more of the first UL signal and the first DL signal and the second UL signal and the second DL signal.

In one embodiment, the first frequency band and the second frequency band can be within a single third generation partnership project (3GPP) TDD band. Alternatively, the first frequency band and the second frequency band are within separate third generation partnership project (3GPP) TDD bands.

In one embodiment, the controller 516 is further configured to be coupled to provide a timing signal and an UL/DL configuration for one or more of the first TDD UL signal, the first TDD DL signal, the second TDD UL signal, and the second TDD DL signal.

In another embodiment the first bidirectional amplification and filtering path 552a can further comprise: a first first-direction amplification and filtering path 537a configured to carry the at least the first UL signal of the first UL frequency range within the first UL frequency band; a first second-direction amplification and filtering path 527a configured to carry the at least the first DL signal of the first DL frequency range within the first DL frequency band; a first signal directing component 576a configured to communicatively couple the first server antenna port 502a to the first first-direction amplification and filtering path 537a and the first-second-direction amplification and filtering path 527a; and a second signal directing component 578a configured to communicatively couple the first donor antenna port 504a to the first first-direction amplification and filtering path 537a and the first-second-direction amplification and filtering path 527a.

In one embodiment, the first first-direction amplification and filtering path 537a further comprises: a low noise amplifier (LNA) 538a coupled between the first signal directing component 576a and an input of the first SDF (SDF #1); a variable attenuator 540a coupled between the LNA 538a and the input of the first SDF (SDF #1); and a power amplifier (PA) 542a coupled between an output of the first SDF (SDF #1) and the second signal directing component 578a.

In one embodiment, the first second-direction amplification and filtering path 527a further comprises an LNA 529a coupled between the second signal directing component 578a and an input of the first SDF (SDF #2); a variable attenuator 530a coupled between the LNA 529a and the input of the first SDF (SDF #2); and a power amplifier (PA) 544a coupled between an output of the first SDF (SDF #2) and the first signal directing component 576a.

In one embodiment, the first signal directing component 576a and the second signal directing component 578a are one or more of a circulator or a switch or a duplexer.

In another embodiment, the first bidirectional amplification and filtering path 527a further comprises a first time division duplex (TDD) bandpass filter 561 coupled between the first server antenna port 502a and the first signal directing component 576a. The first TDD bandpass filter 561 can be configured to filter a first TDD signal in a first UL frequency band and a first DL frequency band that are a same first frequency band that is a TDD frequency band. A second TDD bandpass filter 562 can be coupled between the first donor antenna port 504a and the second signal directing component 578a. The second TDD bandpass filter 562 can be configured to filter the first TDD signal in the first UL frequency band and the first DL frequency band that are the same first frequency band that is a TDD frequency band.

In one embodiment, the first TDD bandpass filter 561 is comprised of a first switchable bank of bandpass filters (i.e. 680 (FIG. 6b)) coupled to the controller 516 and the second TDD bandpass filter 562 is comprised of a second switchable bank of bandpass filters (i.e. 682 (FIG. 6b)) coupled to the controller 516 to enable the controller 516 to select different TDD bandpass filters to enable different TDD bands to be directed through the first bidirectional amplification and filtering path 552a.

In one embodiment, the first bidirectional amplification and filtering path 552a further comprises a first frequency division duplex (FDD) bandpass filter 561 coupled between the first server antenna port 502a and the first signal directing component 576a. The first FDD bandpass filter 561 is configured to filter a first FDD UL signal in a first FDD UL frequency band and a first FDD DL signal in a first FDD DL frequency band. A second FDD bandpass filter 562 is coupled between the first donor antenna port 504a and the second signal directing component 576a, wherein the second FDD bandpass filter 562 is configured to filter the first FDD UL signal in the FDD first UL frequency band and the first FDD DL signal in the first FDD DL frequency band. The first FDD bandpass filter 561 can be comprised of a first switchable bank of bandpass filters (i.e. 680 (FIG. 6b)) coupled to the controller 516 and the second FDD bandpass filter 562 is comprised of a second switchable bank of bandpass filters (i.e. 682 (FIG. 6b)) coupled to the controller 516 to enable the controller 516 to select different FDD bandpass filters so that different FDD bands can be directed through the first bidirectional amplification and filtering path 552a.

In one embodiment, the second bidirectional amplification and filtering path 552b further comprises a second first-direction amplification and filtering path 537b configured to carry the at least the second UL signal of the second frequency range within the second UL frequency band; a second second-direction amplification and filtering path 527b configured to carry the at least the second DL signal of the second frequency range within the second DL frequency band; a third signal directing component 576b configured to communicatively couple the second server antenna port 502b to the second first-direction amplification and filtering path 537b and the second second-direction amplification and filtering path 527b; and a fourth signal directing component 578b configured to communicatively couple the second donor antenna port 504b to the second first-direction amplification and filtering path 537b and the second second-direction amplification and filtering path 527b.

In one embodiment, the second first-direction amplification and filtering path 537b further comprises: a low noise amplifier (LNA) 538*b* coupled between the third signal directing component 576*b* and an input of the second SDF (SDF #3); a variable attenuator 540*b* coupled between the LNA 538*b* and the input of the second SDF (SDF #3); and a power amplifier (PA) 542*b* coupled between an output of the second SDF (SDF #3) and the fourth signal directing component 578*b*.

In one embodiment, the second second-direction amplification and filtering path 527*b* further comprises: a low noise amplifier (LNA) 529*b* coupled between the fourth signal directing component 578*b* and an input of the second SDF (SDF #4); a variable attenuator 530*b* coupled between the LNA 529*b* and the input of the second SDF (SDF #4); and a power amplifier (PA) 544*b* coupled between an output of the second SDF (SDF #4) and the third signal directing component (576*b*).

In one embodiment, the third signal directing component 576*b* and the fourth signal directing component 578*b* are one or more of a circulator or a switch or a duplexer.

In one embodiment, the second bidirectional amplification and filtering path 552*b* further comprises a third time division duplex (TDD) bandpass filter 563 coupled between the second server antenna port 502*b* and the third signal directing component 576*b*. The third TDD bandpass filter 563 is configured to filter a second TDD signal in a second UL frequency band and a second DL frequency band that are a same second frequency band that is a TDD frequency band. A fourth TDD bandpass filter 564 is coupled between the second donor antenna port 504*b* and the fourth signal directing component 578*b*. The fourth TDD bandpass filter 564 is configured to filter the second TDD signal in the second UL frequency band and the second DL frequency band that are the same frequency band that is a TDD frequency band.

In one embodiment, the third TDD bandpass filter 563 is comprised of a first switchable bank of bandpass filters (i.e. 680 (FIG. 6*b*)) coupled to the controller 516 and the fourth TDD bandpass filter 564 is comprised of a second switchable bank of bandpass filters (i.e. 682 (FIG. 6*b*)) coupled to the controller 516 to enable the controller 516 to select different TDD bandpass filters to enable different TDD bands to be directed through the second bidirectional amplification and filtering path 552*b*.

In one embodiment, the second bidirectional amplification and filtering path further comprises a third frequency division duplex (FDD) bandpass filter 563 coupled between the second server antenna port 502*b* and the third signal directing component 576*b*, wherein the third FDD bandpass filter 563 is configured to filter a second FDD UL signal in a second FDD UL frequency band and a second FDD DL signal in a second FDD DL frequency band. A fourth FDD bandpass filter 564 can be coupled between the second donor antenna port 504*b* and the fourth signal directing component 578*b*, wherein the fourth FDD bandpass filter 564 is configured to filter the second FDD UL signal in the second FDD UL frequency band and the second FDD DL signal in the second FDD DL frequency band.

In one embodiment, the third FDD bandpass filter 563 is comprised of a first switchable bank of bandpass filters (i.e. 680 (FIG. 6*b*)) coupled to the controller 516 and the fourth FDD bandpass filter 564 is comprised of a second switchable bank of bandpass filters (i.e. 682 (FIG. 6*b*)) coupled to the controller 516 to select different FDD bandpass filters so that different FDD bands can be directed through the second bidirectional amplification and filtering path 552*b*.

In one embodiment, the first bidirectional amplification and filtering path 552*a* can be a single direction amplification and filtering path that includes one of paths 537*a* or 527*a*. In addition, the second bidirectional amplification and filtering path 552*b* can be a single direction amplification and filtering path that includes one or paths 537*b* or 527*b*. When single direction amplification and filtering paths are used then the signal directing components 576*a*, 578*a* and 576*b*, 578*b* are not necessary. The single direction amplification and filtering path 537*a* or 527*a* can be coupled directly between BPF 561 and BPF 562, and the single direction amplification and filtering path 537*b* or 527*b* can be directly coupled between BPF 563 and BPF 564.

In one example embodiment, a dual path repeater 580 having a split mode and a multiple input multiple output (MIMO) mode is disclosed, as illustrated in FIG. 5*e*. The dual path repeater comprises a first server antenna port 502*a* and a first donor antenna port 504*a*. A first amplification and filtering path 537*a* is coupled between the first server antenna port 502*a* and the first donor antenna port 504*a* or the amplification and filtering path 527*a* is coupled between the first donor antenna port 504*a* and the first server antenna port 502*a*. Accordingly, in this embodiment, the amplification and filtering path 527*a* or 537*a* can be a single direction (UL or DL) amplification and filtering path. The amplification and filtering path 527*a* or 537*a* comprises a first software defined filter (SDF #1 or #2) configured to filter at least a first uplink (UL) signal of a first UL frequency range within a first UL frequency band and output the first UL signal with a predetermined gain; or at least a first downlink (DL) signal of a first DL frequency range within a first DL frequency band and output the first DL signal with a predetermined gain.

The dual path repeater 580 further comprises a second server antenna port 502*b* and a second donor antenna port 504*b*. A second amplification and filtering path 537*b* can be coupled between the second server antenna port 502*b* and the second donor antenna port 504*b* or the second amplification and filtering path 537 can be coupled between the second donor antenna port 504*b* and the second server antenna port 502*b*. Accordingly, the second amplification and filtering path can be a single direction (UL or DL) amplification and filtering path. The second amplification and filtering path 527*b* or 537*b* comprises a second SDF (SDF #3 or #4) configured to filter at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain.

The dual path repeater 580 further comprises a controller 516 that is operable to configure one or more of the first SDF (i.e. SDF #1 or #2) and the second SDF (i.e. SDF #3 or #4) to operate the dual path repeater in one of: a split mode with the first SDF and the second SDF configured for the first UL frequency range to be different from the second UL frequency range or the first DL frequency range to be different from the second DL frequency range; and a multiple-input multiple-output (MIMO) mode with the first SDF and the second SDF configured for the first UL frequency range to be the same as the second UL frequency range or the first DL frequency range to be the same as the second DL frequency range.

In one embodiment, the controller 516 is operable to configure the first SDF (SDF #1 or #2) and the second SDF (SDF #3 or #4) to filter frequency division duplex (FDD) signals. In the case of filtering FDD signals, the first UL frequency band is a first FDD UL frequency band or the first DL frequency band is a first FDD DL frequency band. Similarly, the second UL frequency band is a second FDD UL frequency band or the second DL frequency band is a second FDD DL frequency band.

In another embodiment, the controller 516 is operable to configure the first SDF (SDF #1 or #2) and the second SDF (SDF #3 or #4) to filter time division duplex (TDD) signals. In the case of filtering TDD signals, the first UL frequency band or the first DL frequency band are a same first frequency band that is a first TDD frequency band. Similarly, the second UL frequency band or the second DL frequency band are a same second frequency band that is a second TDD frequency band.

The dual path repeater 580 can further comprise at least one TDD sync detection module (SDM) 514 that can be configured to receive a timing signal and an UL/DL configuration for the TDD signals in one or more of the first TDD frequency band and the second TDD frequency band; and send the timing signal and the UL/DL configuration to the controller 516 for the first SDF (SDF #1 or SDF #2) to provide timing at the first SDF to filter one or more of the first UL signal or the first DL signal; and send the timing signal and the UL/DL configuration information to the controller 516 for the second SDF (SDF #3 or #4) to provide timing at the second SDF to filter one or more of the second UL signal or the second DL signal.

FIG. 6*a* provides another example embodiment of a TDD switchable repeater 650 in which the signal directing components are switches. In this example, single pull double throw switches are used, but other types of switches may also be used. In this example, the switches can be controlled via a first path switch control line 670*a* and a second path switch control line 670*b*. As discussed with respect to FIG. 4, the switches can be controlled by the controller 616 via UL/DL configuration information and signal timing for the TDD signals from the SDM/modem 614 so that the TDD UL signals are routed along the TDD UL path, and the TDD DL signals are routed along the TDD DL path.

The filters in the SDF1, SDF2, SDF3, and SDF 4 can be selected to filter a single E-UTRA or 5g TDD band to provide MIMO communication. The TDD switchable repeater can be configured to operate in the same manner previously described in FIG. 5*b*.

In the embodiment of FIG. 6*a*, the TDD switchable repeater 650 can further comprise a first TDD server switch 666*a* communicatively coupled to a first server port 602*a*, the first amplification and filtering path 637*a*, and the second amplification and filtering path 627*a*. A first TDD donor switch 668*a* can be communicatively coupled to the first donor port 604*a*, the first amplification and filtering path 637*a*, and the second amplification and filtering path 627*a*. A second TDD server switch 666*b* can be communicatively coupled to the second server port 602*b*, the third amplification and filtering path 637*b*, and the fourth amplification and filtering path 627*b*. A second TDD donor signal directing component 668*b* can be communicatively coupled to the second donor port 604*b*, the third amplification and filtering path 637*b*, and the fourth amplification and filtering path 627*b*.

In one example, the controller 616 is configured to switch the first TDD server switch 666*a*, the first TDD donor switch 668*a*, the second TDD server switch 666*b*, and the second TDD donor switch 668*b* based on the UL/DL configuration information for the first first-direction signal in the first TDD band and the first second-direction signal in the first TDD band to provide the MIMO communication.

In another example, the controller 616 is configured to switch the first TDD server switch 666*a* and the first TDD donor switch 668*a* based on the UL/DL configuration information for the first first-direction signal in the first TDD band and the first second-direction signal in the first TDD band, and the second TDD server switch 666*b*, and the second TDD donor switch 668*b* based on the UL/DL configuration information for the second first-direction signal in the second TDD band and the second second-direction signal in the second TDD band to provide TDD communication on the first and the second TDD bands.

Figure 6B:
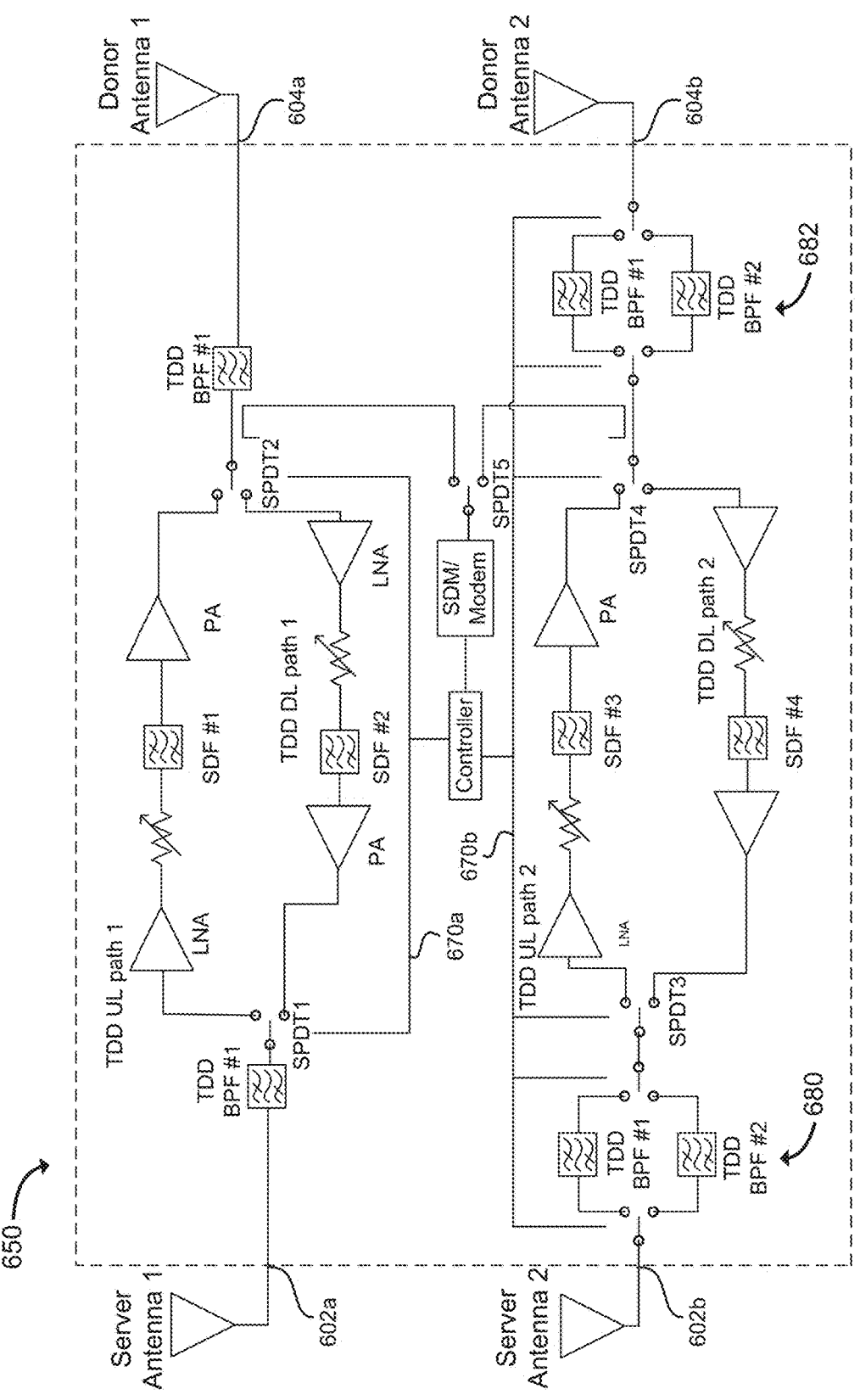
FIG. 6b illustrates a TDD switchable repeater for TDD multiband communication in accordance with an example.

FIG. 6*b* provides an example illustration of an embodiment of the TDD switchable repeater 650 that includes switchable bandpass filters are used. In this example, switchable bandpass filters are implemented on path 2 of the TDD switchable repeater 650. The server switchable bandpass filters 680 at the server port 602*b* and the donor switchable bandpass filters 682 at the donor port 604*b* enables the path 2 to operate on two or more separate E-UTRA or 5g TDD bands. A BPF in the server switchable bandpass filters 680 at the server port 602*b* and the donor switchable bandpass filters 682 at the donor port 604*b* can be selected to enable a TDD signal to pass through the TDD UL path 2 and TDD DL path 2. The server switchable bandpass filters 680 can also be used at the first server port 602*a* and the first donor port 604*a* to enable multiple TDD bands to pass through TDD UL path 1 and TDD DL path 1.

As previously described, the filters in the SDF1, SDF2, SDF3, and SDF 4 can be selected to filter a single E-UTRA or 5g TDD band to provide MIMO communication. In the embodiment of FIG. 6*b*, the filters in the SDF1, SDF2, SDF3, and SDF 4 can be selected to filter multiple different TDD bands to provide multi-band TDD communication. The TDD switchable repeater 650 can be configured to operate in the same manner previously described in FIGS. 5*b* and 6*a*.

Figure 7A:
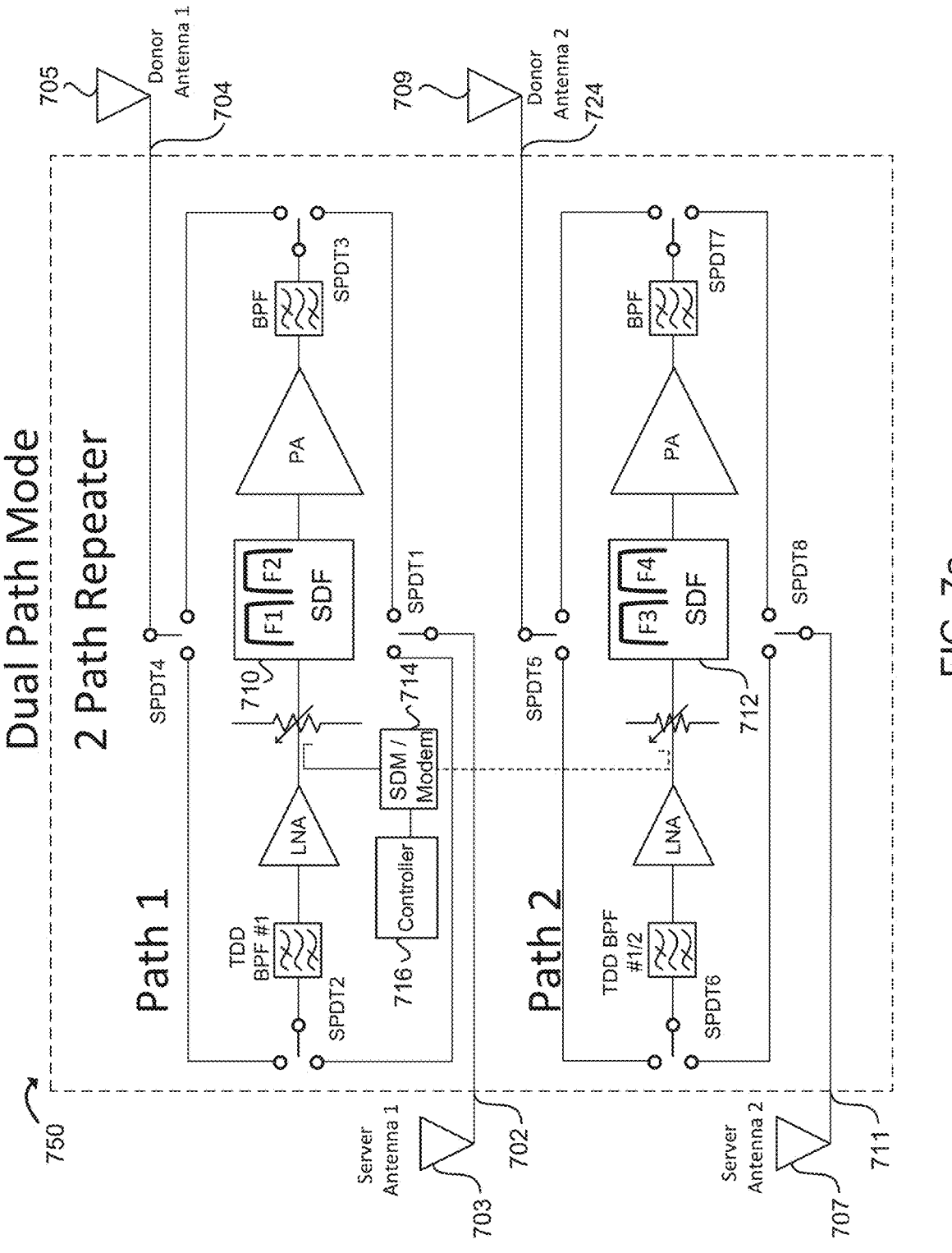
FIG. 7a illustrates a two path multiple input multiple output (MIMO)/multi-path mode switchable TDD repeater configured to operate in an SBHD mode in accordance with an example.

FIG. 7*a* provides an example of a two path TDD repeater 750 that can be configured for either a multiple input multiple output (MIMO) mode of communication or a dual path mode. In this example, the two path TDD repeater 750 is configured to provide dual path communication on Path 1 and Path 2. The repeater paths can be split to receive signals from 2 gNBs that are network time aligned, but can have different UL/DL configurations. The gNBs can belong to the same or different network operator. Path 1 and Path 2 are typically time synchronous, but may not be DL/UL coincident. This can occur when the slot timing is synchronous on the cellular network, but the DL slot on one path may occur during a DL or UL slot on the other path. The SDM/modem 714 can receive a signal from either Path 1 or Path 2 and synchronize the UL/DL TDD switching timing for both paths. The switching can be performed using a controller 716 in communication with the SDM/modem 714, the SPDT switches, and the SDFs 710, 712.

In the example of FIG. 7*a*, a first gNB B1 can transmit and receive SBHD signals F1 and F2. F1 and F2 are TDD bands in a TDD frequency band. A second gNB B2 can transmit and receive TDD signals F3 and F4. F3 and F4 are TDD bands in a TDD frequency band. The TDD frequency band for F3 and F4 may be the same or a different TDD frequency band from the TDD band bands F1 and F2 belong to. The gNBs can transmit and receive bands that have different UL/DL configurations. The SDM/modem 714 can determine the network frame/slot timing and UL/DL configuration for F1, F2 and F3, F4. Alternatively, a first SDM/Modem can be used to determine the network frame/slot timing and UL/DL configuration for F1 and F2, and a second SDM/Modem can be used to determine the network frame/slot timing and UL/DL configuration for F3 and F4. The SDM/modem(s) 714 can couple to a single path or both paths of Path 1 and Path 2. The SDM/modem(s) 714 can communicate the signal timing and UL/DL configuration to a controller 716 that can communicate with the SPDT switches and the SDFs 710, 712. The SDF 710 in Path 1 is configured to filter and amplify UL and DL signals for band F1 and band F2. The SDF 712 in Path 2 is configured to filter and amplify UL and DL signals for band F3 and band F4.

In the example of FIG. 7*a*, Path 1 and Path 2 can both have parallel filtering channels F1/F2 and F3/F4 respectively. The SDFs 710, 712 can each be configured to filter two separate channels, F1/F2 and F3/F4, respectively. The frequency band F1 can equal F3 or F4 and F2 can equal F4 or F3. Alternatively, F1, F2, F3, and F4 can all be different bands. F1, F2, F3 and F4 can have the same or different bandwidths.

In one example, a TDD band F1 and/or F2 UL signal can be received at server antenna 1 703, directed to the two path TDD repeater 750 via a server antenna 1 port 702 in the repeater 750 and switched at SPDT1 and SPDT2 to be directed along Path 1. The TDD F1 and/or F2 UL signal can travel along Path 1, where the signal may be filtered, amplified, and attenuated prior to communication to SDF 710. The SDF 710 can digitally filter and amplify the F1 and/or F2 UL signal. Any TDD F1 or F2 DL signals in the TDD signal that are on a different frequency band can be blocked by the SDF 710. For example, DL signal(s) that are received at the server antenna 1 703 at the same time as the UL signal(s) will be blocked by the SDF as long as the DL signal(s) are on a different frequency band from the UL signal(s). The digitally filtered TDD F1 and/or F2 UL signal output from SDF 710 can then be amplified with a power amplifier, filtered, and switched through SPDT3 and SPDT 4 and directed to donor antenna 1 port 704 for transmission from the donor antenna 1 705 to gNB B1.

A TDD band F1 and/or F2 DL signal can be received at donor antenna 1 705 from the gNB B1, directed to the two path TDD repeater 750 via a donor antenna 1 port 704 and switched at SPDT4 and SPDT2 to be directed along Path 1. The TDD F1 and/or F2 DL signal can travel along path 1, where the signal may be filtered, amplified, and attenuated prior to communication to SDF 710. The SDF 710 can digitally filter and amplify the F1 and/or F2 DL signal. Any TDD F1 or F2 UL signals in the TDD signal that are on a different frequency band can be blocked by the SDF 710. The digitally filtered TDD F1 and/or F2 DL signal output from SDF 710 can then be amplified with a power amplifier, filtered, and switched through SPDT3 and SPDT 1 and directed to server antenna 1 port 702 for transmission from the server antenna 1 703 to a UE, such as the UE illustrated in FIG. 9.

A TDD band F3 and/or F4 UL signal can be received at server antenna 2 707, directed to the two path TDD repeater 750 via a server antenna 2 port 711 in the repeater 750 and switched at SPDT8 and SPDT6 to be directed along Path 2. The TDD F3 and/or F4 UL signal can travel along path 2, where the signal may be filtered, amplified, and attenuated prior to communication to SDF 712. The SDF 712 can digitally filter and amplify the F3 and/or F4 UL signal. Any TDD F3 or F4 DL signals in the TDD signal that are on a different frequency band can be blocked by the SDF 712. The digitally filtered TDD F3 and/or F4 UL signal output from SDF 712 can then be amplified with a power amplifier, filtered, and switched through SPDT7 and SPDT 7 and directed to donor antenna 2 port 724 for transmission from the donor antenna 2 709 to gNB B2.

A TDD band F1 and/or F2 DL signal can be received at donor antenna 1 705 from the gNB B1, directed to the two path TDD repeater 750 via a donor antenna 1 port 704 in the repeater 750 and switched at SPDT4 and SPDT2 to be directed along Path 1. The TDD F1 or F2 DL signal can travel along path 1, where the signal may be filtered, amplified, and attenuated prior to communication to SDF 710. The SDF 710 can digitally filtered and amplify the F1 and/or F2 DL signal. Any TDD F1 or F2 UL signals in the TDD signal that are on a different frequency band can be blocked by the SDF 710. The digitally filtered TDD F1 and/or F2 DL signal output from SDF 710 can then be amplified with a power amplifier, filtered, and switched through SPDT3 and SPDT 1 and directed to server antenna 1 port 702 for transmission from the server antenna 1 703 to a UE, such as the UE illustrated in FIG. 10.

Figure 7B:
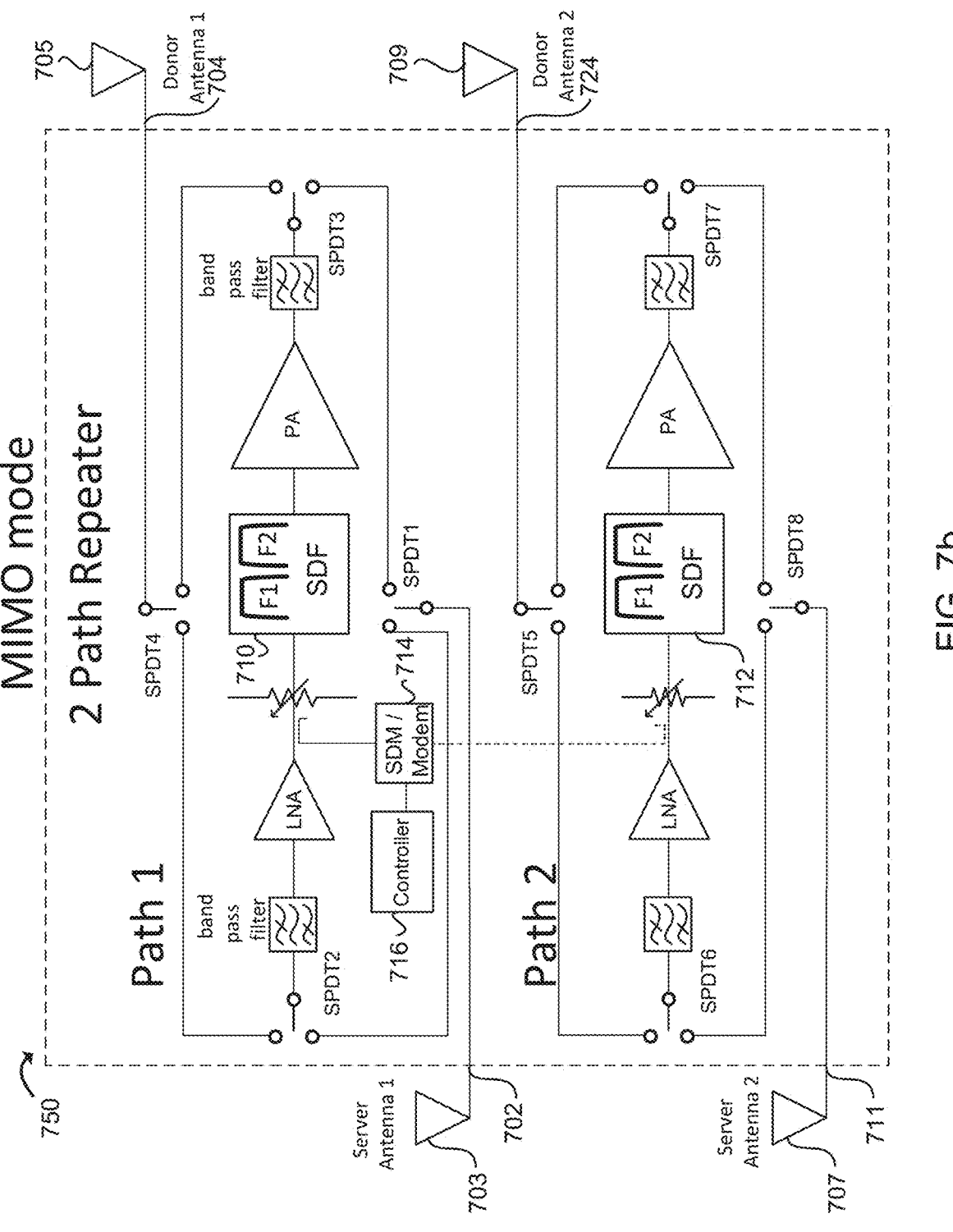
FIG. 7b illustrates a two path MIMO/multi-path mode switchable TDD repeater configured to operate in a MIMO mode in accordance with an example.

FIG. 7*b* provides an example embodiment of a two path TDD repeater 750 that can be configured for either a MIMO mode of communication or a multi-path mode of communication. In the example illustrated in FIG. 7*b*, the two path TDD repeater 750 is configured to provide MIMO communication on Path 1 and Path 2. The repeater Path 1 and Path 2 can be time synchronous and DL/UL coincident. TDD channels F1 and F2 are used for both UL and DL. In 2×2 MIMO, both Path 1 and Path 2 can have the same parallel filtering channels F1 and F2. F1 and F2 can have the same or differing bandwidths. The SDM/modem 714 can receive a signal from either Path 1 or Path 2 and synchronize the UL/DL TDD switching timing for both paths. The switching can be performed using a controller 716 in communication with the SDM/modem 714, the SPDT switches, and the SDFs 710, 712.

In the example of FIG. 7*b*, gNB B1 can transmit and receive signals F1 and F2 with MIMO communication. F1 and F2 are TDD bands in a TDD frequency band. The gNB can transmit and receive bands F1 and F2 that have the same UL/DL configuration and frame/slot timing for MIMO communication. The SDM/modem 714 can determine the network frame/slot timing and UL/DL configuration for F1 and F2. The SDF 710 in Path 1 is configured to filter and amplify UL and DL signals for band F1 and band F2. The SDF 712 in Path 2 is configured to substantially simultaneously filter and amplify UL and DL signals for the same band F1 and F2. The timing of the UL signals arriving at the antenna ports 702 and 711 can depend on the location of the UE relative to the two path TDD repeater 750 and the server antenna 1 703 and server antenna 2 707. Reflections of the UL signal in bands F1 and F2 can also affect the timing of the received signals. Similarly, the timing of the received DL signals at antenna ports 704 and 724 can be affected by a path length of the F1 and F2 signals transmission from the gNB(s) and any reflections that may occur in the transmission.

In one example, a TDD band F1 and/or F2 UL signal can be received at server antenna 1 703, directed to the two path TDD repeater 750 via a server antenna 1 port 702 in the repeater 750 and switched at SPDT1 and SPDT2 to be directed along Path 1. The TDD F1 and/or F2 UL signal can travel along path 1, where the signal may be filtered, amplified, and attenuated prior to communication to SDF 710. The SDF 710 can digitally filter and amplify the F1 and/or F2 UL signal. Any TDD F1 or F2 DL symbols in the TDD signal can be blocked by the SDF 710. The digitally filtered TDD F1 and/or F2 UL signal output from SDF 710 can then be amplified with a power amplifier, filtered, and switched through SPDT3 and SPDT 4 and directed to donor antenna 1 port 704 for transmission from the donor antenna 1 705 to gNB B1.

Substantially simultaneously, the same TDD band F1 and/or F2 UL signal received at server antenna 1 703 can be received at server antenna 2 707, directed to the two path TDD repeater 750 via a server antenna 2 port 711 in the repeater 750 and switched at SPDT8 and SPDT6 to be directed along Path 2. The TDD F1 and/or F2 UL signal can travel along path 2, where the signal may be filtered, amplified, and attenuated prior to communication to SDF 712. The SDF 712 can digitally filter and amplify the F1 and/or F2 UL signal. Any TDD F1 or F2 DL symbols in the TDD signal can be blocked by the SDF 712. The digitally filtered TDD F1 and/or F2 UL signal output from SDF 712 can then be amplified with a power amplifier, filtered, and switched through SPDT7 and SPDT 5 and directed to donor antenna 2 port 724 for transmission from the donor antenna 2 709 to gNB B1. The two UL receptions at server antenna 1 703 and server antenna 2 707, followed by the two UL transmissions at donor antenna 1 705 and donor antenna 2 709 enables MIMO UL communication between the UE and the gNB B1 using the two path TDD repeater 750.

A TDD band F1 and/or F2 DL signal can be received at donor antenna 1 705 from the gNB B1, directed to the two path TDD repeater 750 via a donor antenna 1 port 704 in the repeater 750 and switched at SPDT4 and SPDT2 to be directed along Path 1. The TDD F1 and/or F2 DL signal can travel along path 1, where the signal may be filtered, amplified, and attenuated prior to communication to SDF 710. The SDF 710 can digitally filtered and amplify the F1 and/or F2 DL signal. Any TDD F1 or F2 UL symbols in the TDD signal can be blocked by the SDF 710. The digitally filtered TDD F1 and/or F2 DL signal output from SDF 710 can then be amplified with a power amplifier, filtered, and switched through SPDT3 and SPDT1 and directed to server antenna 1 port 702 for transmission from the server antenna 1 703 to a UE, such as the UE illustrated in FIG. 9.

Substantially simultaneously, the same TDD band F1 and/or F2 DL signal received at donor antenna 1 705 can be received at donor antenna 2 709, directed to the two path TDD repeater 750 via a donor antenna 2 port 724 in the repeater 750 and switched at SPDT5 and SPDT6 to be directed along Path 1. The TDD F1 and/or F2 DL signal can travel along path 1, where the signal may be filtered, amplified, and attenuated prior to communication to SDF 712. The SDF 712 can digitally filter and amplify the F1 and/or F2 DL signal. Any TDD F1 and/or F2 UL symbols in the TDD signal can be blocked by the SDF 712. The digitally filtered TDD F1 and/or F2 DL signal output from SDF 712 can then be amplified with a power amplifier, filtered, and switched through SPDT7 and SPDT8 and directed to server antenna 2 port 711 for transmission from the server antenna 2 707 to a UE, such as the UE illustrated in FIG. 9.

Figure 7C:
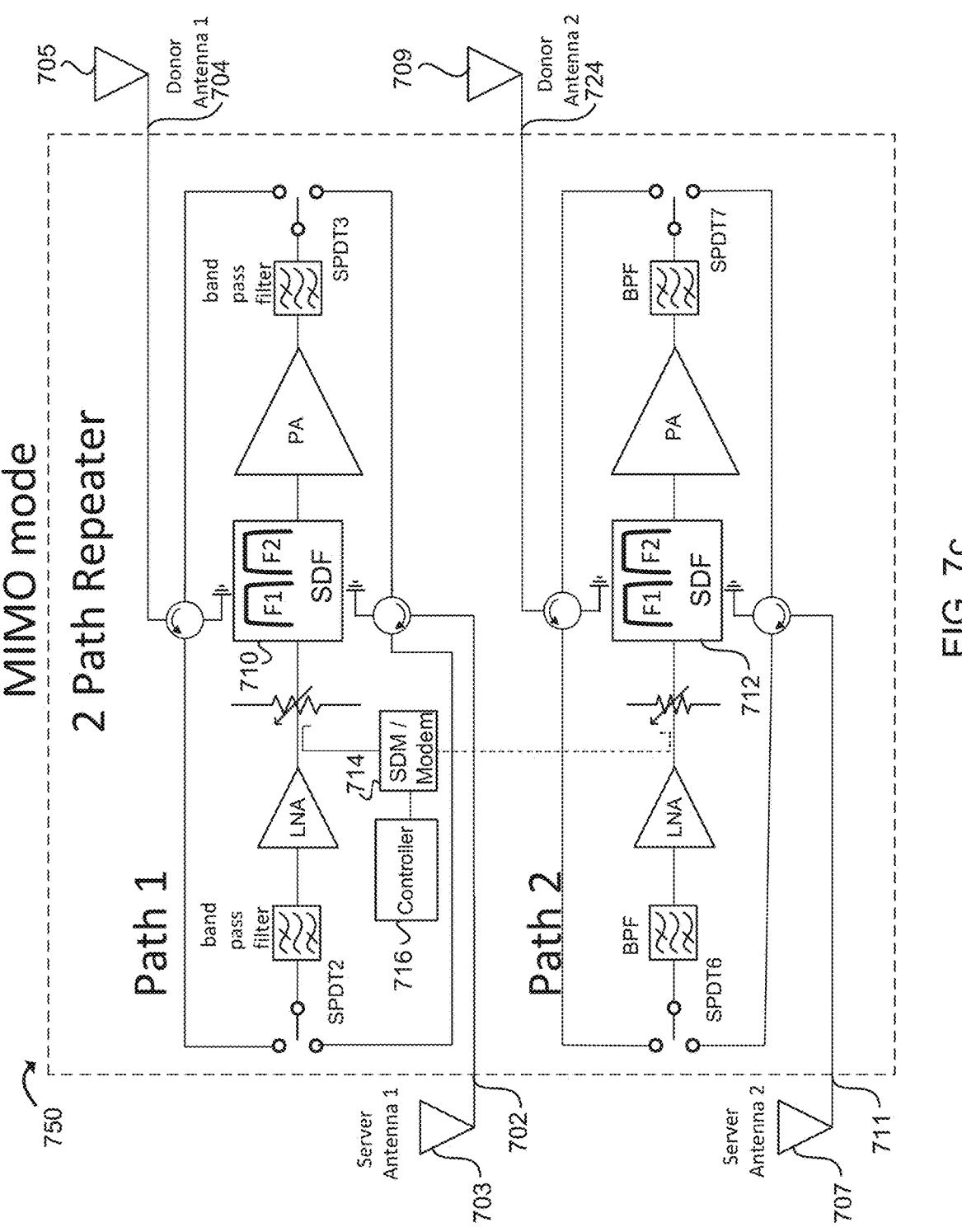
FIG. 7c illustrates a two path MIMO/multi-path mode switchable TDD repeater with circulators in accordance with an example.

FIG. 7*c* provides an example illustration in which a different type of signal directing component has been used for SPDT1, SPDT4, SPDT5, and SPDT8. In this example, a circulator has been used in place of SPDT1, SPDT4, SPDT5, and SPDT8. The circulator allows the signal to pass through without the need for switching, as previously discussed. The two-path repeater 750 will otherwise operate as discussed with respect to FIGS. 7*a* and 7*b*.

In another embodiment, a dual path repeater 750 having a split mode and a multiple input multiple output (MIMO) mode is disclosed, as illustrated in FIGS. 7*a*-7*c*. The dual path repeater comprises a first server antenna port 702 and a first donor antenna port 704. A first amplification and filtering path (Path 1) is coupled between the first server antenna port 702 and the first donor antenna port 704 or the amplification and filtering path (Path 1) is coupled between the first donor antenna port 704 and the first server antenna port 702. Accordingly, in this embodiment, the Path 1 amplification and filtering path can be a single direction (UL or DL) amplification and filtering path. The Path 1 amplification and filtering path comprises a first software defined filter (SDF) 710 configured to filter at least a first uplink (UL) signal of a first UL frequency range within a first UL frequency band and output the first UL signal with a predetermined gain; or at least a first downlink (DL) signal of a first DL frequency range within a first DL frequency band and output the first DL signal with a predetermined gain.

The dual path repeater 750 further comprises a second server antenna port 711 and a second donor antenna port 724. A second amplification and filtering path (Path 2) can be coupled between the second server antenna port 711 and the second donor antenna port 724 or the second amplification and filtering path, Path 2, can be coupled between the second donor antenna port 724 and the second server antenna port 711. Accordingly, the second amplification and filtering path, Path 2, can be a single direction (UL or DL) amplification and filtering path. The second amplification and filtering path, Path 2, comprises a second SDF 712 configured to filter at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain.

The dual path repeater 750 further comprises a controller 716 that is operable to configure one or more of the first SDF 710 and the second SDF 712 to operate the dual path repeater 750 in one of: a split mode with the first SDF 710 and the second SDF 712 configured for the first UL frequency range to be different from the second UL frequency range or the first DL frequency range to be different from the second DL frequency range; and a multiple-input multiple-output (MIMO) mode with the first SDF 710 and the second SDF 712 configured for the first UL frequency range to be the same as the second UL frequency range or the first DL frequency range to be the same as the second DL frequency range.

In one embodiment, the controller 716 is operable to configure the first SDF 710 and the second SDF 712 to filter frequency division duplex (FDD) signals. In the case of filtering FDD signals, the first UL frequency band is a first FDD UL frequency band or the first DL frequency band is a first FDD DL frequency band. Similarly, the second UL frequency band is a second FDD UL frequency band or the second DL frequency band is a second FDD DL frequency band.

In another embodiment, the controller 716 is operable to configure the first SDF 710 and the second SDF 712 to filter time division duplex (TDD) signals. In the case of filtering TDD signals, the first UL frequency band or the first DL frequency band are a same first frequency band that is a first TDD frequency band. Similarly, the second UL frequency band or the second DL frequency band are a same second frequency band that is a second TDD frequency band.

The dual path repeater 750 can further comprise at least one TDD sync detection module (SDM) 714 that can be configured to receive a timing signal and an UL/DL configuration for the TDD signals in one or more of the first TDD frequency band and the second TDD frequency band; and send the timing signal and the UL/DL configuration to the controller 716 for the first SDF 710 to provide timing at the first SDF 710 to filter one or more of the first UL signal or the first DL signal; and send the timing signal and the UL/DL configuration information to the controller 716 for the second SDF 712 to provide timing at the second SDF 712 to filter one or more of the second UL signal or the second DL signal.

Software Defined Filters (SDF)

Software defined filters are digital processors configured to provide digital filtering of a TDD signal. A software-defined filtering module can include a digital signal processor (DSP) and digital baseband filters. A software-defined filtering module can receive an analog signal, convert the analog signal to a digital signal and perform digital processing at baseband on the digital signal. In one embodiment, the SDF can convert the digitally filtered signal from baseband back to an analog signal, such as the RF carrier frequency received at the input of the SDF. Alternatively, the SDF can output the digitally filtered signal without conversion to analog. In one embodiment, a software-defined filtering module can be configured to down convert a radio frequency (RF) analog cellular signal received at the SDF at an RF carrier frequency to baseband, digitize the baseband signal. Digital signal processing or digital filtering (e.g., Finite Impulse Response (FIR) filtering or Infinite Impulse Response (IIR) filtering) can then be applied to the digital signal at baseband. In one embodiment, the digital signal can then be converted to analog and upconverted to the same RF carrier frequency the signal was received at. The RF analog signal that is outputted from the software-defined filtering module can be considered a repeated analog signal. Additional amplification and filtering can be performed on the RF analog signal output from the SDF module. Alternatively, the digital signal can be communicated digitally to another SDF module that can then convert the digital signal to analog and upconvert to the RF carrier frequency. The SDF module can perform digital channelized filtering for repeaters that can be useful to address near-far problems associated with repeaters.

The UL/DL configuration can be used to determine when to make a change in filtering based on the subframe in a 3GPP E-UTRA TDD configuration and the slot in a 3GPP NR TDD configuration. Table 7 compares time domain parameters of 3GPP E-UTRA and 3GPP NR.

TABLE 7

| Parameter | LTE | NR |
|---|---|---|
| Radio frame length | 10 ms | 10 ms |
| Subframe length | 1 ms | 1 ms |
| No. of OFDM symbols in a slot | 14 | 14 |
| No. of slots in a subframe | 2 | Numerology dependent |

In an NR configuration, the number of OFDM symbols per slot are fixed, with 14 symbols per slot for a normal cyclic prefix (CP) and 12 symbols per slot for an extended CP. In an E-UTRA configuration, the number of slots per subframe is fixed at 2 slots per subframe. However, in the NR configuration, the number of slots per subframe varies with the numerology. The number of slots per subframe increases with the subcarrier spacing (SCS). Accordingly, the duration of an OFDM symbol in the NR configuration is reduced with an increasing SCS. Since the number of OFDM symbols per slot are fixed, slot duration is reduced with an increased SCS. Since slot duration is reduced, while subframe duration is fixed, more slots can fit within a subframe. Table 8 shows the number of slots in a subframe/frame in a NR configuration for each numerology for a normal CP.

TABLE 8

| μ | SCS | No. of slots per subframe = $2^\mu$ | No. of slots per radio frame = 10 * $2^\mu$ | slot duration (ms) |
|---|---|---|---|---|
| 0 | 15 kHz | 1 | 10 | 1 |
| 1 | 30 kHz | 2 | 20 | 0.5 |
| 2 | 60 kHz | 4 | 40 | 0.25 |
| 3 | 120 kHz | 8 | 80 | 0.125 |
| 4 | 240 kHz | 16 | 160 | 0.0625 |

In a configuration using TDD, a slot may not be configured to be fully used for downlink or for uplink. Similar to an E-UTRA TDD configuration, a guard period (gp) is used to allow time for transceiver switching from downlink to uplink and to allow for timing advance in the uplink.

As previously discussed, NR TDD uses a flexible slot configuration, with OFDM symbols in a slot classified as 'downlink', 'flexible', or 'uplink'. A flexible symbol can be configured either for uplink or for downlink transmissions. In addition, the flexible symbols within a slot can be used to provide the desired guard period in NR TDD. Accordingly, a flexible symbol can be used to provide a guard period between the UL symbols and the DL symbols. The 3GPP NR configuration has set a switching time from DL to UL (TX to RX) and UL to DL (RX to TX) for FR1 (bands n1-n95) and FR2 (bands n257-n262) as shown in Table 9, and defined in 3GPP TS 138 133 V. 15.3.0 (2018-10) table 7.1.2-2.

TABLE 9

| Transition time | FR1 | FR2 |
|---|---|---|
| Tx-Rx | 25600 | 13792 |
| Rx-Tx | 25600 | 13792 |

The values for FR1 and FR2 represent multiples of $T_c$, the NR basic time unit, as defined in 3GPP TS 38.211. The basic time unit $T_c$ is provided by the expression:

$$T_c = 1/(\Delta f_{max} \cdot N_f)$$

where $\Delta f_{max}$ is the subcarrier spacing (SCS) and N is the Fast Fourier Transform (FFT) size. For μ=2, the SCS is 60 kHz. An example $N_f$ is 4096. This provides a $T_c$ of $1/(60,000*4096)=4.069\times10^{-9}$. Accordingly, the transition time for FR1 is $25600*4.069\times10^{-9}=1.04\times10^{-4}$ seconds, or about 104 microseconds. In this example, the software defined filter (SDF) can be configured to switch between an UL filter and a DL filter in a period that is less than 104 microseconds. The SDF can be configured to be able to switch between a filter for an UL symbol and a filter for a DL symbol for a desired NR band and SCS at a selected FFT size in less than or equal to 1 microsecond (uS). Switching between different filters during UL-to-DL slot transitions or between OFDM symbols within flexible slots can be done with switching times of 1 uS or less. This SDF filter switching speed can be accomplished by switching in/out pre-configured SDF filter blocks. The DL-to-UL switching times can be much longer because of the guard period that allows DL-to-UL switching and UE timing advance.

In one example, an UL filter can be a passband filter configured to pass a desired UL signal, or a stopband filter configured to substantially stop the transmission of an UL signal for the UL time slot for a desired band or sub-band. Similarly, a DL filter can be a passband filter configured to pass a desired DL signal, or a stopband filter configured to substantially stop the transmission of a DL signal for the DL time slot for a desired band or sub-band. The passband and stopband filters can be achieved using digital filtering to provide a passband or stopband filter with desired characteristics based on the signals to be received and transmitted by the repeater 500. The SDF can also enable a specific signal to be amplified or attenuated by a predetermined amount to output the signal from the SDF with a desired amplitude. The attenuation can be provided using the digital filtering. The SDF can be comprised of a single processor, such as an application specific integrated circuit (ASIC) or field programmable gate array (FPGA). The SDF can enable multiple signals to be simultaneously input, filtered, and output. For example, in the example of FIG. 5*a*, the SDFs 510, 512 can be comprised of a single FPGA or ASIC processor. Alternatively, each SDF can be a separate processor. In one example, an Analog Devices AD9371 integrated dual RF transceiver can be used as an SDF. The AD9371 can be used to perform filtering on two separate frequency bands or sub-bands simultaneously. The AD9371 can be used in each of the examples illustrated in FIGS. 5*a*, 5*b*, 5*c*, 6*a*, 6*b*, 7*a*, 7*b*, and 7*c*, and throughout the application. This example is not intended to be limiting. Other types of FPGAs or ASIC processors can also be used for the SDF to perform the digital filtering, attenuation, and amplification, as described herein.

Figure 5F:
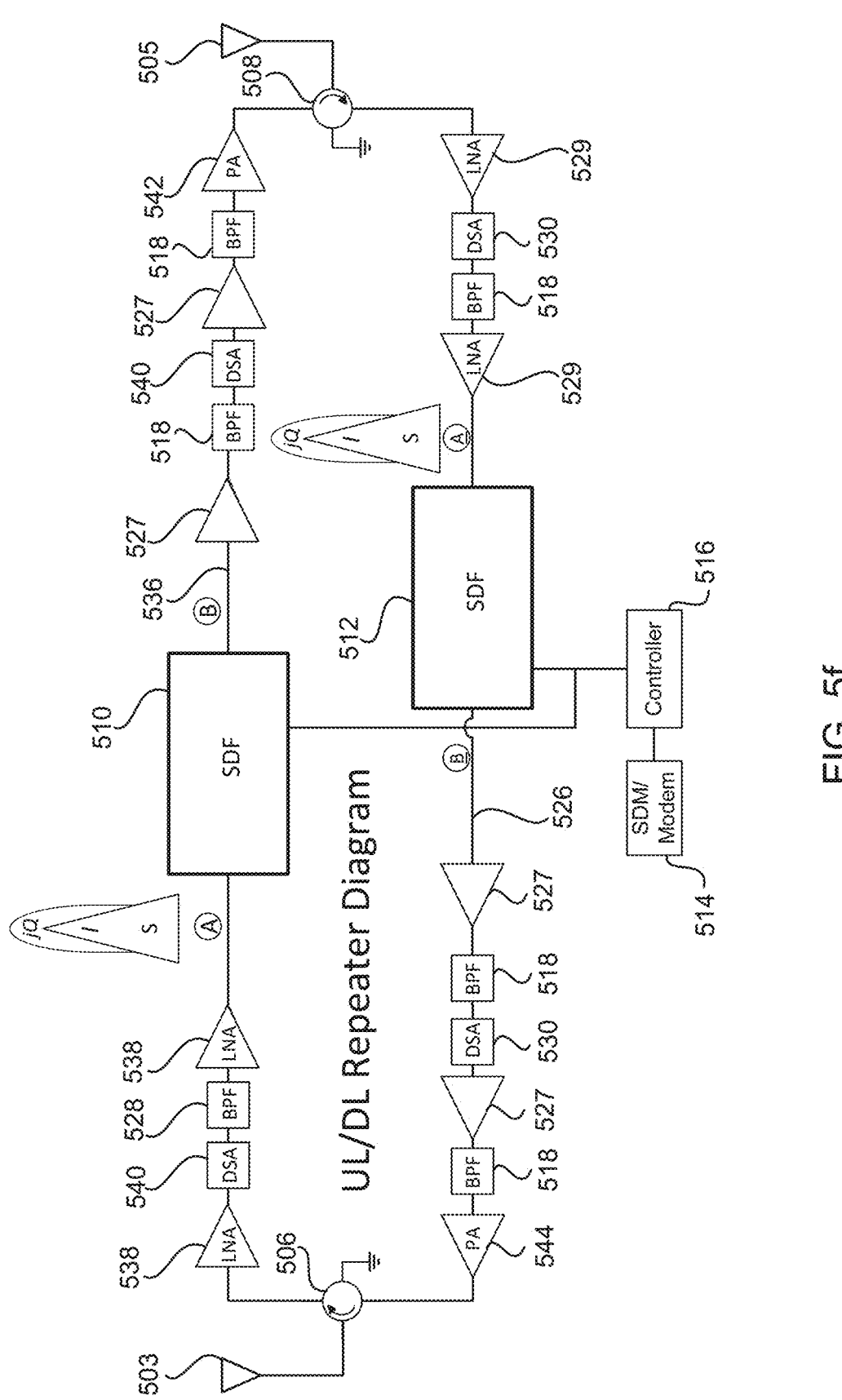
FIG. 5f illustrates another example embodiment of a TDD repeater with circulators in accordance with another example.

FIG. 5*f* provides another example embodiment of a bi-directional TDD repeater 500. In this example, a first-direction signal, such as an uplink signal, can be received at a server antenna 503 and directed by circulator 506 to a first-direction amplification and filtering path 536. The uplink signal can be amplified by an LNA 538, attenuated by a digital signal attenuator 540, filtered with a bandpass filter 528 designed to pass the uplink signal, and sent to the input of the SDF 510. In this example, the input of the SDF is represented as input A. The uplink signal is shown as time varying signal S(t). In this example, the signal is quadrature modulated, with in-phase (I) and quadrature-phase (Q) components that are 90 degrees out of phase. The output of the signal from the SDF 510 is indicated at point B, where the signal is amplified 527, filtered with BPF 518, attenuated with DSA 540, further amplified 527, filtered with BPF 518, and amplified with a power amplifier (PA) 542. The power amplified uplink signal is then directed by circulator 508 to a donor antenna 505 for transmission to a base station (i.e. 230, FIG. 2). A similar amplification and filtering process can occur for a second-direction signal, such as a downlink signal, that can be received at donor antenna 505, directed to the second-direction amplification and filtering path 526 by the circulator 508, amplified and filtered as discussed with the first-direction amplification and filtering path 536, and directed by circulator 506 to the server antenna 503 for transmission to a user equipment (UE) such as a cellular telephone.

Figure 5G:
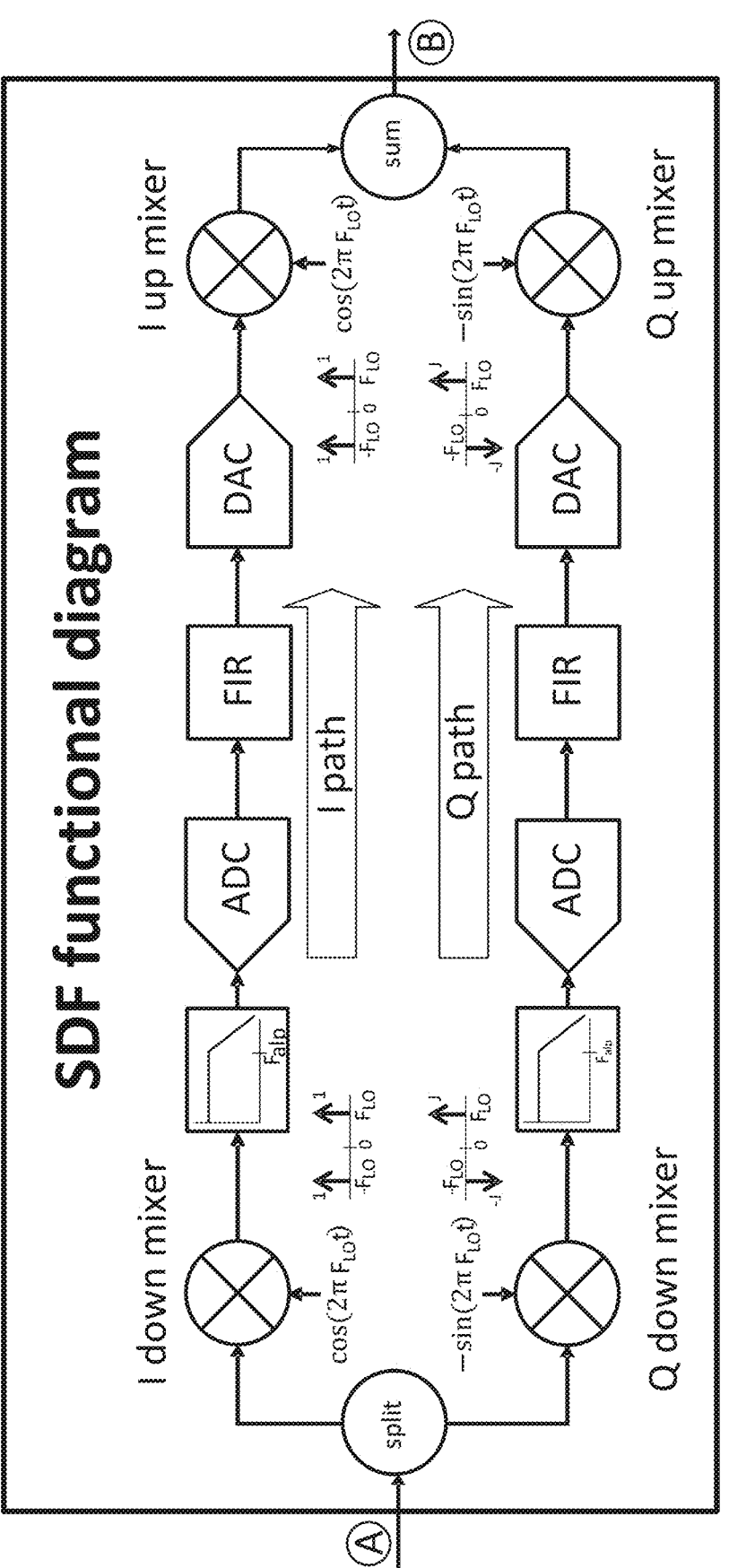
FIG. 5g illustrates a block diagram of a software defined filter (SDF) in accordance with an example.

FIG. 5*g* provides an example of an SDF functional diagram for a software defined filter, such as SDF 510 or 512. In this example, the complex RF modulated signal S(t) is input at point A into the SDF 510, 512 and split into an in-phase RF signal (I) and a quadrature phase RF signal (Q). A complex mixer can be used to downconvert the signal. In this example, the signal is downconverted to baseband (i.e. zero intermediate frequency (IF)). An in-phase local oscillator signal cosine($2\pi F_{LO}t$), where $F_{LO}$ is the frequency of the local oscillator and t is time, is used to downconvert the in-phase RF signal with an in-phase down mixer that outputs an in-phase baseband signal. The in-phase baseband analog signal is then passed through a lowpass filter and digitized with an analog to digital converter (ADC). The digitized in-phase signal is then filtered using, in this example, a finite impulse response (FIR) filter. The digitized, filtered in-phase signal is then output to a digital to analog converter (DAC) and mixed with an in-phase local oscillator signal at an in-phase up mixer to form an in-phase filtered RF signal. In one embodiment, the same LO signal can be used at both the in-phase down mixer and in-phase up mixer.

Similarly, a quadrature-phase local oscillator signal −sin ($2\pi F_{LO}t$), where $F_{LO}$ is the frequency of the local oscillator and t is time, is used at a quadrature-phase mixer to downconvert the quadrature-phase RF signal and output a quadrature phase baseband analog signal. The quadrature-phase baseband analog signal is then passed through a lowpass filter and digitized with an analog to digital converter (ADC). The digitized quadrature phase signal is then filtered using, in this example, a finite impulse response (FIR) filter. The digitized, filtered quadrature-phase signal is then output to a digital to analog converter (DAC) and mixed with a quadrature-phase local oscillator signal at a quadrature phase up mixer to form a quadrature-phase filtered RF signal. In one embodiment, the same LO signal can be used at both the in-phase down mixer and in-phase up mixer.

The in-phase filtered RF signal and the quadrature-phase filtered RF signal output from the in-phase up mixer and the quadrature-phase up mixer can be summed to form a complex RF filtered signal S(t) that is output at point B of the bi-directional always-on TDD repeater 500, as shown in FIG. 5*b*.

Figure 5H:
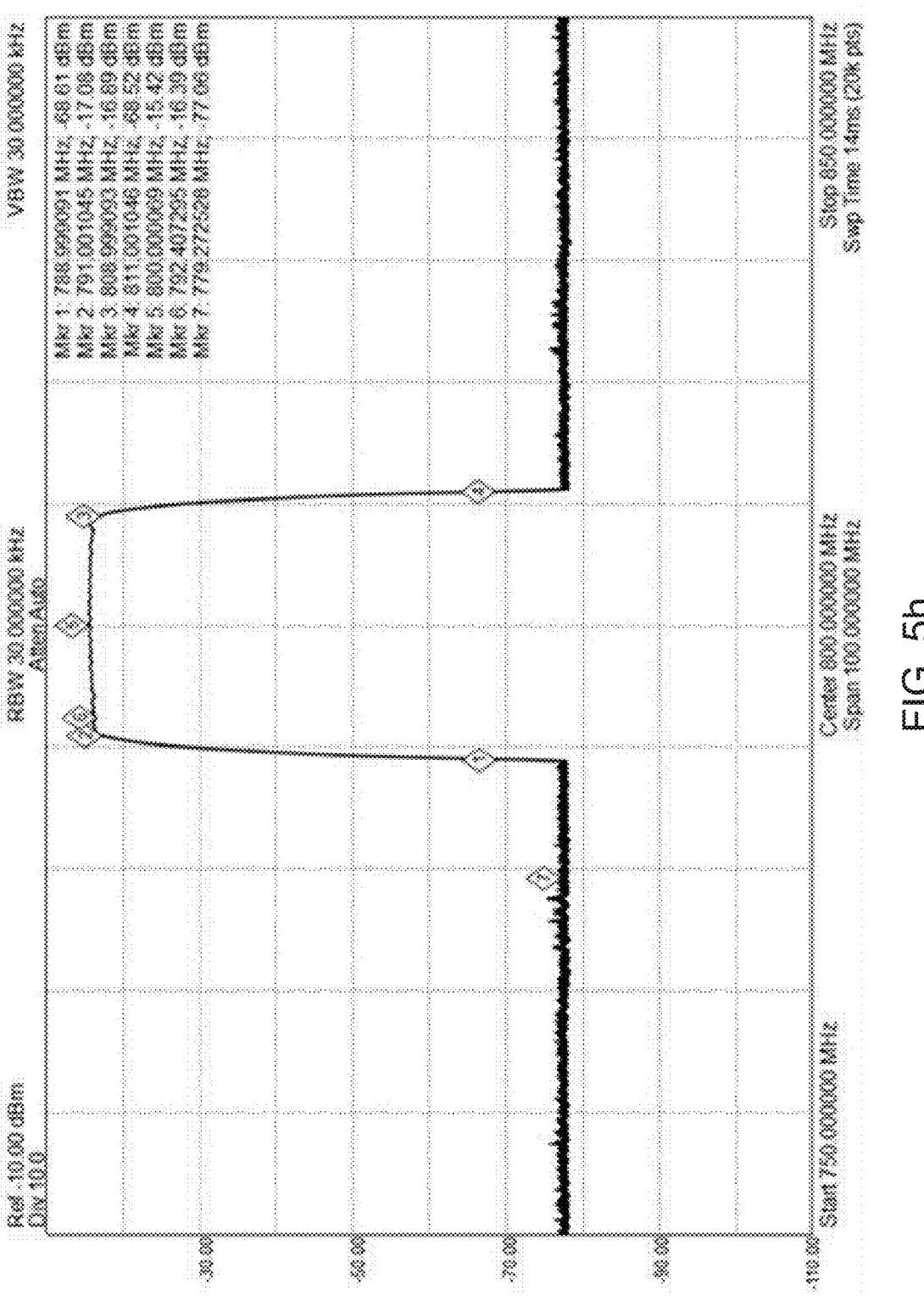
FIG. 5h illustrates an example bandpass filter produced by the SDF of FIG. 5c in accordance with an example.

FIG. 5*h* illustrates an example of a 20 MHz bandwidth passband filter that is implemented using the SDF illustrated in FIG. 5*g*. In this example, the center of the passband is noted at Marker (Mkr) 5, at approximately 800 MHz with a power level of −15.42 decibels relative to milliwatts (dBm). The edges of the bandpass filter are marked with Mkr 2 and 3 at 791 MHz and 809 MHz respectively, are at a power level that is approximately 1.5 to 1.6 dB below the marker at the center frequency. Mkr 1 and 4 are approximately 2 MHz from Mkr 2 and 3, with a power level that is approximately 51.5 dB lower. Accordingly, the filter illustrated in this example provides greater than 50 dB of isolation only 2 MHz from the edge of the filter. Accordingly, the SDF 510, 512 can provide over 50 dB of isolation for signals with band passes that are only 2 MHz apart.

Figure 5I:
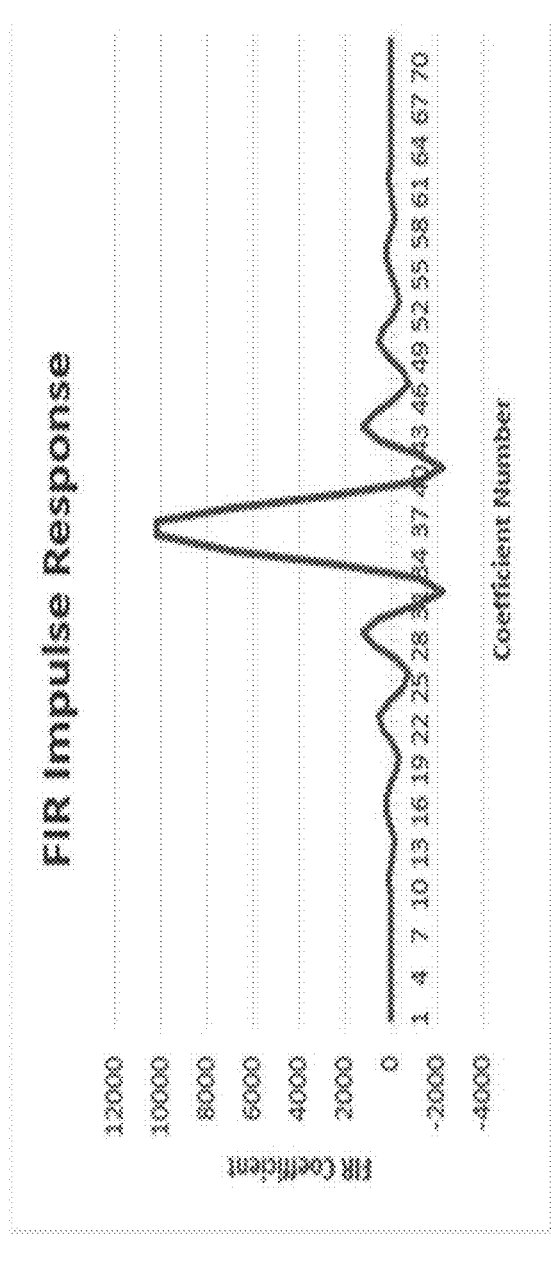
FIG. 5i illustrates an example of finite impulse response (FIR) coefficients used in the SDF to form the bandpass filter of FIG. 5h in accordance with an example.

In one embodiment, finite impulse response (FIR) coefficients that represent the impulse response of the filter can be selected to form a desired filter, such as a bandpass filter. The FIR coefficients define the filter's amplitude and phase/delay response to an input signal. The rate at which the coefficients are multiplied with the input signal dictate the time/frequency response of the filtered results. FIG. 5*i* provides an illustration of FIR coefficients selected to produce the 20 MHz passband filter illustrated in FIG. 5*h*. The coefficients can be communicated to the SDF to form the filter used to filter the signal S(t), which represents the uplink signal or downlink signal filtered by the SDF.

The example of the SDF 510, 512 illustrated in FIG. 5*g* is not intended to be limiting. For example, the SDF can incorporate a different front end. Rather than using an analog approach up to the ADC, the RF signal can be directly digitized and then downconverted and filtered, and then directly converted back to RF. In addition, the digital filtering can be accomplished without the use of a complex mixer and separate I and Q paths. However, the use of the complex mixer illustrated in the example of FIG. 5g enables a filter to be generated with twice the bandwidth by generating half the filter and then duplicating it in a mirror image. Accordingly, the complex SDF illustrated in FIG. 5g can be used to generate the broadband filters used in new radio 5G implementations.

Sync Detection Module

In one example, a single TDD SDM can be configured to determine: UL/DL configuration information for a first TDD signal in a first frequency range and UL/DL configuration information for a second TDD signal in a second frequency range. The first frequency range and second frequency range can be separate 3GPP operating bands that are configured for TDD communication. The single TDD sync detection module can be configured to: receive synchronization information for the first TDD signal and synchronization information for the second TDD signal. The single TDD sync detection module can be configured to: use the synchronization information for the first TDD signal and the UL/DL configuration information for the first TDD signal to switch between the first TDD UL signal and the first TDD DL signal; and use the synchronization information for the second TDD signal and the UL/DL configuration information for the second TDD signal to switch between the second TDD UL signal and the second TDD DL signal.

In one example, the TDD sync detection module can be a receiver configured to receive TDD signals from a BS, such as a gNB. The TDD sync detection module can be configure to synchronize the repeater, such as the repeaters illustrated in FIGS. 5a-7c, and send the UL/DL configuration information for the DL signal to the controller in the repeater.

In another example, the sync detection module can be a modem that is configured to receive the TDD signal including synchronization information for a first frequency range and uplink/downlink (UL/DL) configuration information for the first frequency range. The modem can be further configured to generate an UL/DL indication signal for the first frequency range of TDD signal from the synchronization information and the UL/DL configuration information. The modem can be further configured to send the UL/DL indication signal and synchronization timing to the controller in the repeater.

In another example, the modem can be configured to generate the UL/DL indication signal for a frequency range without using a subscriber identity module (SIM) or a SIM card. The modem may not register, connect, or attached to a particular network, which allows operation without a SIM. Operating a modem without a SIM card can enable the modem to receive the synchronization information and the UL/DL configuration information from multiple cellular carriers without having a contract with multiple cellular carriers or paying fees to each of the cellular carriers. Further, operating a modem without a SIM card can prevent security issues arising from unauthorized SIM card intrusions. Further, the hardware complexity of the modem can be reduced with a reduction in the number of components.

In another example, the repeater of FIGS. 5a to 7c can be in communication with a modem that includes a SIM card. The use of a SIM card can enable the modem to receive higher layer signaling that may be used to identify UL/DL configurations for dynamic changes in the UL/DL TDD configuration.

In one example, the modem can comprise one or more of a scanning receiver, an application specific integrated circuit (ASIC), a field-programmable gate array (FPGA), or the like. The control signal can be received by the modem from a UE or a node (e.g., a BS a small cell node, or a relay node).

In another example, the modem or scanning receiver can be configured to operate as a third generation partnership project (3GPP) layer-1 modem that can be configured to scan the one or more frequency bands and demodulate information in a downlink layer 1 signal without demodulating E-UTRA layer-2 or E-UTRA layer-3 signals that may require the use of a SIM card. The modem can further support E-UTRA layer-2 and E-UTRA layer-3 functionality. The layer-1 modem can scan the one or more frequency bands without receiving handshake information or communication back to the source of the transmission (e.g., base station). The terms modem and layer-1 modem are used interchangeably in this document.

In one example, the layer-1 modem can be configured to operate in an E-UTRA TDD repeater. The layer-1 modem can demodulate a downlink layer-1 signal from a node, such as a base station, and use the information to derive the cell's timing for synchronization purposes and the TDD UL/DL frame configuration to enable the TDD repeater to switch between UL subframes and DL subframes in a DL signal received from the base station, or in an UL signal transmitted from a UE. Layer 1 of the downlink LTE protocol stack, also known as the physical layer, contains all of the information needed to synchronize the repeater with the base station and determine the TDD UL/DL frame configuration.

The term "layer-1 modem" is a modem that can demodulate and decode physical channel signals present on layer1 downlink signals from the base station to derive the TDD UL/DL frame configuration information and timing information. The modem can also modulate information. The scanning receiver can receive the same information as the layer-1 modem, but cannot modulate information. No additional higher-level (i.e. Layer 2 or above) communication from the base station or cellular system or exchange of signals (i.e. UL signals) with the base station is used to determine the TDD UL/DL configuration and timing information. The layer 1 physical channels can include the paging channel, the broadcast channel, the downlink shared channel, the multicast channel, the physical broadcast channel (PBCH), the physical downlink control channel (PDCCH), the physical downlink shared channel (PDSCH), and the physical multicast channel (PMCH).

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (i.e. cell's) TDD UL/DL frame configuration information is carried in the SIB1 message. The layer-1 modem can decode the SIB1 message to determine the TDD UL/DL frame configuration, and communicate this information to the TDD repeater.

The process of attaining timing and frequency synchronization and cell ID of a BS cell is accomplished in a cell search. During a cell search, the layer-1 modem can acquire basic information including cell ID, duplexing mode, timing, and frequency related to the BS and cell it is operating in.

The layer-1 modem can receive the primary synchronization signal (PSS) and the secondary synchronization signal (SSS) from the BS. The PSS and SSS can be used to obtain synchronization information to synchronize the layer-1 modem with the BS. As used herein, a valid sync is generated when the TDD repeater is synchronized to the timing received in the physical layer signal received from the BS that includes the PSS and SSS signals.

The layer-1 modem can receive the MIB in the PBCH. The MIB, PSS, and SSS all lie in the central 72 subcarriers (6 resource blocks RB) of the system bandwidth in the downlink signal and are broadcast as physical channels, allowing the layer-1 modem to initially demodulate just this central region.

Demodulating the PSS during the cell search provides the cell identity N(ID_2). The SSS can then be demodulated with the N(ID_2) to give the cell group identity N(ID_1). Given N(ID_1) and N(ID_2), the cell identity N(ID_Cell) can be determined. The PSS is mapped to different orthogonal frequency division multiplexing (OFDM) symbols depending on which frame type is used. Frame type 1 is frequency division duplex (FDD), and frame type 2 is time division duplex (TDD). Observing the demodulated SSS scrambled sequences allows the layer-1 modem to estimate frame timing used for synchronization.

After the cell search and frequency/timing offset corrections are applied, the PBCH is decoded which drives BCH decoding and then MIB data generation. Note that both PBCH and BCH are both associated with Layer 1 signaling.

The MIB is used for SIB recovery and the following processes: the Physical Control Format Indicator Channel (PCFICH) demodulation, CFI decoding; the Downlink control information (DCI) is recovered to configure the PDSCH demodulator & decode the DL-SCH; the PDCCH decoding, the blind PDCCH search; and the SIB bits recovery from the PDSCH demodulation and DL-SCH decoding. Again, note that the physical channels referenced above that are used to recover the SIB are available on layer 1. Once the SIB is recovered (SIB CRC=0), the SIB1 message can be decoded to extract the cell's TDD configuration.

Before a UE communicating with a BS using TDD can communicate with a cellular network, the UE is configured to perform a cell search to obtain initial system information. The BS can broadcast a layer 1 physical downlink signal to the UE that contains the information channels that enable the UE to acquire and synchronize with slot and frames, acquire cell identity, and decode the master information block (MIB) and the system information block 1 (SIB1).

A base station's (or cell's) TDD UL/DL frame configuration information is carried in the SIB1 message. The layer-1 modem can decode the SIB1 message to determine the TDD UL/DL frame configuration, and communicate this information to the TDD repeater. These processes will be described in more detail in the proceeding paragraphs.

Figure 8A:
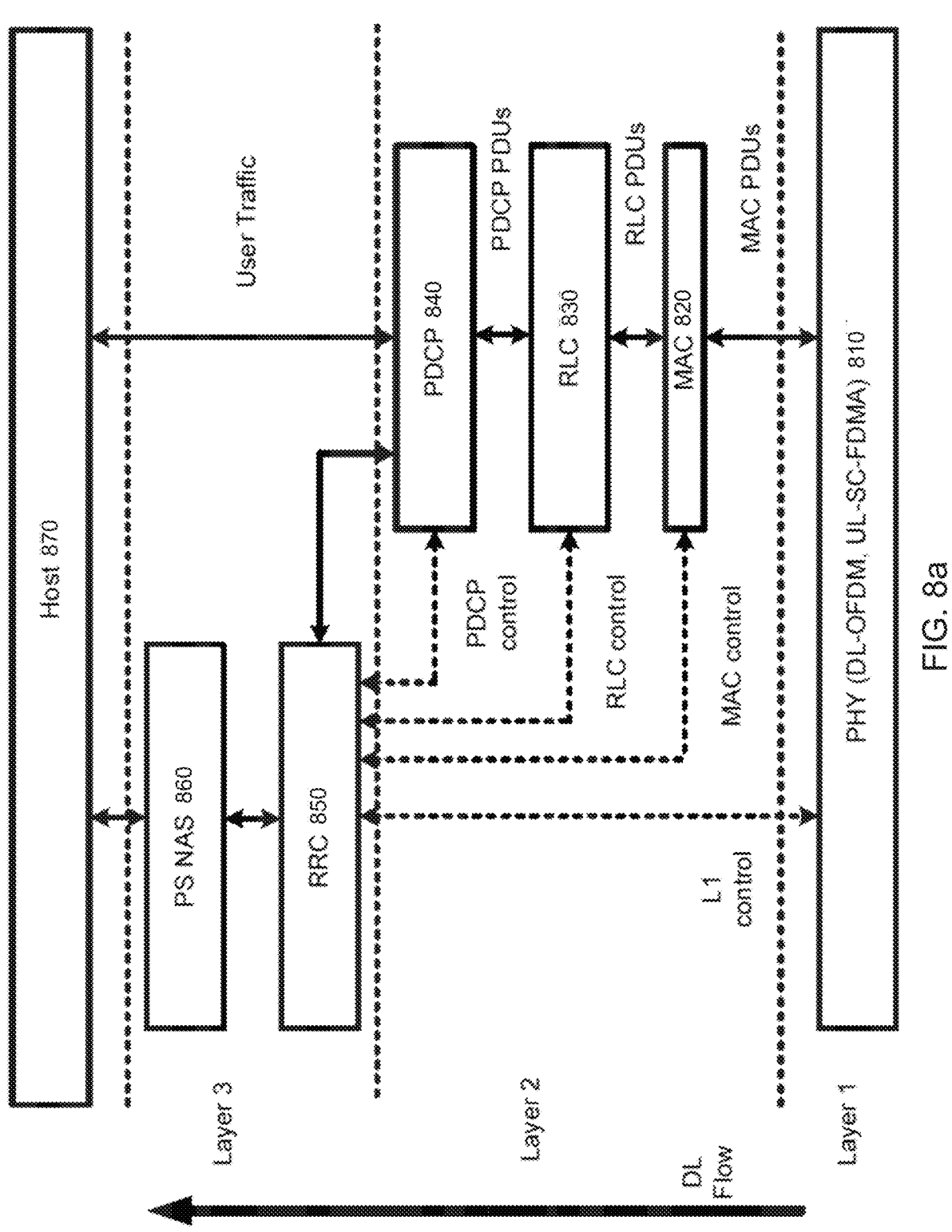
FIG. 8a illustrates an E-UTRA downlink radio protocol stack in accordance with an example.
Figure 8B:
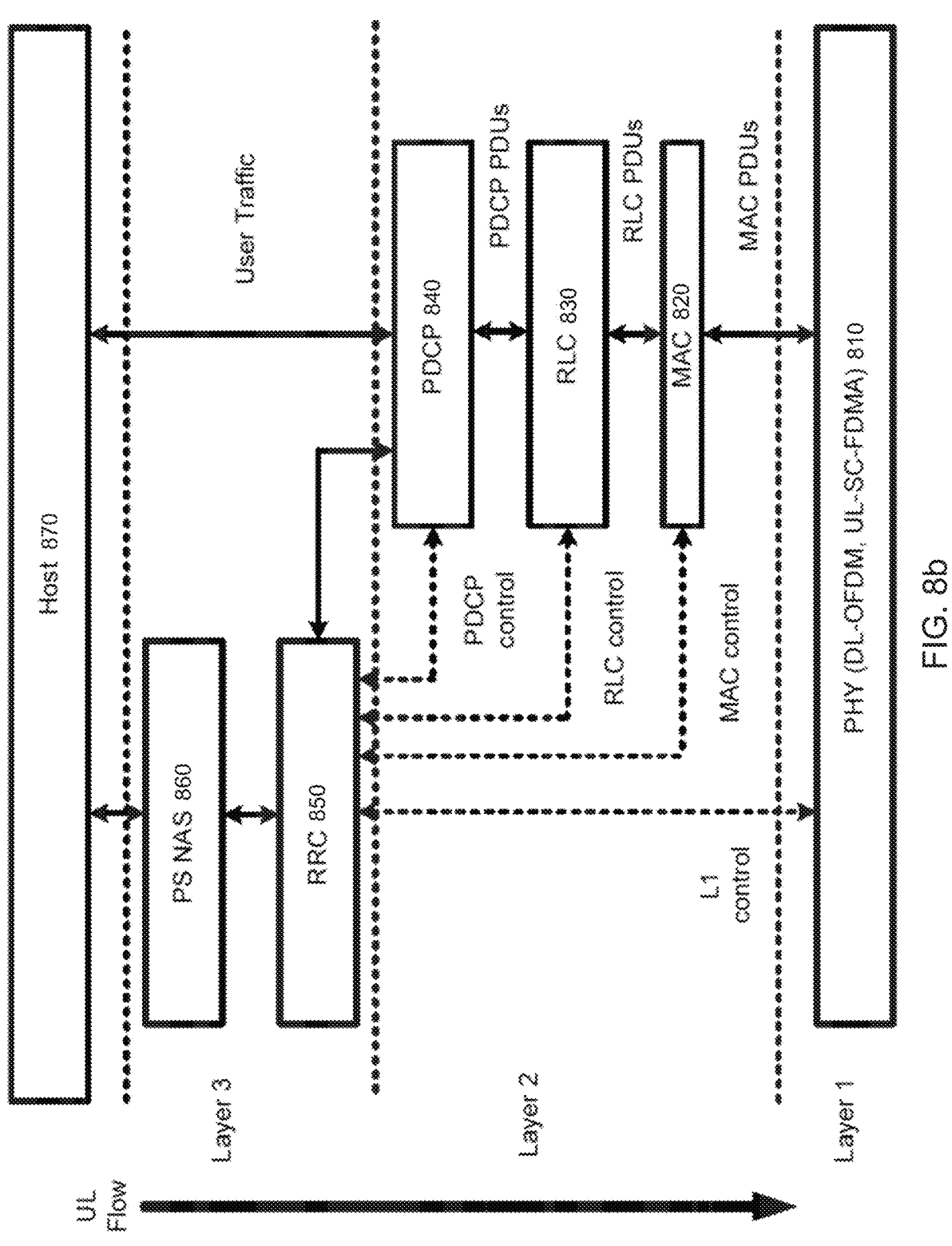
FIG. 8b illustrates an E-UTRA uplink radio protocol stack in accordance with an example.

In another example, as illustrated in FIGS. 8a and 8b, a downlink direction can progress from layer 1 to layer 3 and an uplink direction can progress from layer 3 to layer 1. In a DL direction, information can flow from the physical (PHY) layer 810 to the medium-access control (MAC) layer 820 to the radio link control (RLC) layer 830, to the packet data convergence protocol (PDCP) layer 840, and to the host 870. Information can also flow from the physical layer 810 to the radio resource control (RRC) layer 850 to the non-access stratum (NAS) 860, and to the host 870. Control information can also flow from the PHY 810, MAC 820, RLC 830, and PDCP 840 to the RRC 850. In an UL direction, information can flow in the opposite direction.

Layer 1 of the LTE stack can support: (i) DL and UL parameters (e.g. resource blocks, subcarriers per resource block, and subcarrier bandwidth), (ii) physical parameters (e.g., cyclic prefix (CP) length), (iii) 3GPP operation bands (e.g. FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the MAC layer, the RLC layer, and the PDCP layer. Layer 3 of the LTE stack can include the RRC layer and the NAS layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In one example, the modem (i.e. layer-1 modem) can be configured to receive the System Information Block 1 (SIB1) and/or Master Information Block (MIB) broadcast from the base station. The base station typically broadcasts the SIB and MIB information periodically. The layer-1 modem can also be configured to receive the Primary Synchronization Signal (PSS) and the Secondary Synchronization Signal (SSS).

The layer-1 modem can use the PSS to perform time synchronization of the TDD repeater with the base station that broadcast the PSS. The PSS can be used to enable the TDD repeater to perform radio frame, sub-frame, slot and symbol synchronization in the time domain, and enable the TDD repeater to determine a center of the channel bandwidth in the frequency domain. The PSS is broadcast by a 3GPP LTE base station twice in each radio frame. For TDD, the PSS is broadcast using the central 62 subcarriers belonging to the third symbol of time slot 2 (sub-frame 1) and the third symbol of time slot 12 (sub-frame 6) in each radio frame.

The layer-1 modem can receive the SSS, which can be used to perform frequency synchronization of the TDD repeater with the base station that broadcast the SSS. After the primary sync signal acquisition, the modem can be configured to detect the secondary synchronization signal. Secondary synchronization signals are one of 168 codes which are 62-bit sequences. The SSS is broadcast twice within every radio frame. The two transmissions of the SSS are different so the layer-1 modem can detect which is the first and which is the second. For TDD, the SSS is broadcast using the central 62 subcarriers belonging to the last symbol of time slot 1 (subframe 0) and the last symbol of time slot 11 (subframe 5) in each radio frame.

The SSS can be used by the layer-1 modem and TDD repeater to achieve radio frame synchronization and deduce a pointer towards 1 of 168 Physical layer Cell Identity (PCI) groups to determine the PCI of the transmitting base station. In one example, the PCI can be used to: determine a cell size for the base station based on the cell ID. The cell size can be used to determine a distance between the TDD repeater and the base station. In one embodiment, the timing of the TDD repeater can be synchronized with a timing of the base station when the Cell ID is within a valid Cell ID Group or Cell ID Sector.

In one example, the TDD repeater can be configured to receive and transmit broadband channels, such as 3GPP LTE TDD Channel 41. The Channel 41 has a band from 2496 MHz to 2690 MHz, with a bandwidth of 194 MHz. The band is further divided into channels. Certain channels are designated for TDD cellular communication. Other channels are designated for use in non-cellular communications, such as Multichannel Multipoint Distribution Service (MMDS) for the wireless communication of cable television. In one example embodiment, the TDD repeater can be configured to determine selected channels that are received at the TDD repeater to amplify. For instance, the TDD repeater may only amplify channels designated for cellular communications based on the cellular communications repeater standards. A TDD UL/DL configuration for each selected channel can be determined based on information received from the layer-1 modem. The TDD repeater can then perform amplification and/or filtering on the selected channels. In one embodiment, amplification and filtering may only be performed on channels having a same TDD UL/DL configuration and/or the selected channels that are synchronized.

In one example, the layer-1 modem can be configured to receive timing information (i.e. the PSS and SSS) and communicate the timing information to the TDD repeater to determine a valid synchronization of the TDD repeater relative to a base station transmitting downlink signals to the TDD repeater. The TDD repeater can use the timing information to switch from UL transmission at the TDD repeater to DL transmission at the TDD repeater. In one example, the switch from DL to UL transmission can occur at a beginning of a user equipment (UE) timing advance period or during the UE timing advance period.

In one example, there are two types of synchronization to be concerned with at the TDD repeater: cell signal synchronization and booster UL/DL switch timing synchronization. Cell signal synchronization is achieved and validated when the PSS and SSS signals from the eNodeB are detected and time-frequency correlated by layer-1 modem in the repeater.

Once the eNodeB cell signal is synchronized to the layer-1 modem, the access mode can be validated (FDD or TDD) at the repeater. If TDD is validated, the UL/DL subframe configuration can be established. From that UL/DL subframe configuration, the special subframe timing is established. The special subframe timing can be used as the source of the repeater's UL/DL switch timing synchronization.

In one example, the TDD repeater can be configured to determine selected channels that are received at the TDD repeater to amplify. For example, the repeater may be configured to receive and amplify selected TDD channels in the 3GPP LTE or NR list of channels. For each selected channel, the TDD repeater can determine a TDD UL/DL configuration, using the layer-1 modem. The TDD repeater can then perform amplification on the selected channels that have a same TDD UL/DL configuration, or perform amplification on the selected channels that are synchronized.

In one example, a weak downlink signal can be received on channels with a low threshold received signal strength indicator (RSSI). The TDD repeater can be configured so that it does not synchronize with the weak downlink signals because transmitting these signals from the TDD repeater would not interfere with the cellular network. Accordingly, the TDD repeater can be operated on the selected channels that have a DL RSSI less than a threshold.

In another example, the TDD can be further configured to measure a DL received signal strength indicator (RSSI) for each of the selected channels. The TDD repeater may only synchronize with selected channels that have a DL RSSI less than a selected threshold. For example, an RSSI with a threshold that is less than −60 dBm.

In another example, TDD repeater can be further configured to periodically receive, via the layer-1 modem, the PSS and the SSS for each of the selected channels. The TDD repeater can be configured to verify that it is synchronized in time with the selected channels based on the periodically received PSS and SSS, as previously discussed. For example, the TDD repeater can be configured to synchronize with information in the PSS ever time the PSS is received. Alternatively, the TDD repeater may be synchronized over a longer period, such as ever second, or every few seconds. In one example, when a consistent synchronization occurs over a set number of cycles, the periodic check can be extended over a longer period, such as once per minute.

In 5G new radio (NR), the MIB and SIB1 are known as Minimum System Information. The SIB1 alone can be referred as Remaining Minimum System Information or RMSI.

In one example, the layer-1 modem can be configured to receive a master information block (MIB). The MIB is typically broadcast on a physical broadcast channel (PBCH) by the base station in a 4G or 5G architecture. The MIB includes the necessary parameters used by the layer-1 modem to decode the System Information Block Type 1 (SIB1). The MIB is broadcast with a periodicity of about 80 ms (i.e. every 8 frames). Within the periodicity, repetitive transmission of a same MIB can occur. In 5G, the MIB is typically transmitted on OFDM symbols 1, 2 and 3. The MIB is broadcast using subcarrier numbers 0 to 239 on symbols 1 & 3, and subcarrier numbers 0 to 47 and 192 to 239 on subcarrier 2.

In 5G, the MIB typically includes the system frame number, the subcarrier spacing for the SIB1, the subcarrier signal block (SSB) subcarrier offset that indicates the frequency domain offset between the SSB and the overall resource block grid in the number of subcarriers.

An SSB-subcarrier Offset field can indicate a frequency domain offset between the SSB and the overall resource block grid in number of subcarriers. This field may indicate that this cell does not provide SIB1 and that there is hence no common CORESET. In this case, the field pdcch-ConfigSIB1 may indicate the frequency positions where the UE may (not) find a SS/PBCH with a control resource set and search space for SIB1.

The MIB can also include Cell Bar information that indicates whether the cell allows a UE associated with a signal received by the TDD repeater, to camp on the cell. An intra-frequency reselection is provided to identify if intra-frequency cell reselection is allowed or not allowed.

The MIB can also include a Control Resource Set (CORESET) that includes a common search space and selected physical downlink control channel (PDCCH) parameters. If the SSB-subcarrier offset field indicates that the SIB 1 is not present, then a field PDCCH-ConfigSIB1 can indicate the frequency positions where the layer-1 modem can find the subcarrier signal/physical broadcast channel block with SIB1.

The SIB1 block is cell-specific information that is only valid for a selected serving cell. The SIB1 is received at the layer-1 modem on a physical downlink shared channel (PDSCH) that can be located based on the information received in the MIB.

The SIB1 block includes a number of fields. The fields include, but are not limited to, cell selection information, cell access related information, Internet Protocol (IP) Multimedia Subsystem (IMS) emergency support information, eCall over IMS support information, timers and constraints for a selected user equipment, cell barring information to identify when a specific UE is barred from communicating with the cell, and Cell ID information to identify a cell within a public land mobile network (PLMN).

Figure 8C:
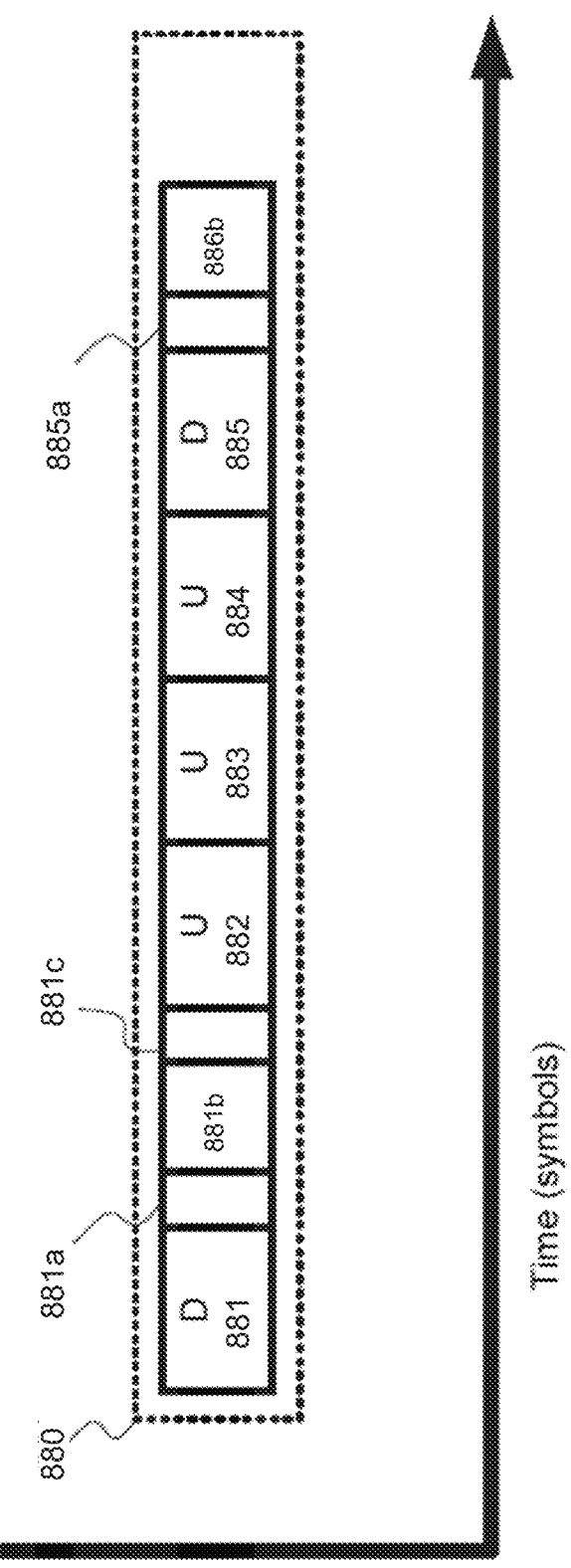
FIG. 8c illustrates an E-UTRA UL/DL TDD frame structure in accordance with an example.

The layer-1 modem can be configured to receive the TDD configuration for a selected signal. The TDD configuration and timing information can be used to determine a timing for the TDD repeater to switch from UL to DL. FIG. 8_c_ illustrates an example TDD configuration 880 for an LTE TDD frame structure 0.

The frame structure includes time periods (sub-frames) for: downlink (D) 882, special (S) 881 comprised of 881_a_ (Downlink Pilot Training Symbol (DwPTS)), 881_b_ (Guard Period (GP)), and 881_c_ (Uplink Pilot Training Symbol (DwPTS)), uplink (U) 882, U 883, U 884, D 885, 885_a_, and 886_b_.

In one example, the TDD repeater including the layer-1 modem, can be configured to receive, and communicate to the TDD repeater, a TDD UL/DL configuration or timing information to determine, at the TDD repeater, the timing of one or more of a guard period, a downlink period, an uplink period, a downlink pilot training symbol period, or an uplink pilot training symbol period for a TDD signal received at the TDD repeater.

In one example, the TDD repeater is configured to enable the DL transmission from the TDD repeater during the guard period, the downlink period, the downlink pilot training symbol period, and a user equipment (UE) timing advance period.

In another example embodiment, functionality 900 for configuring a dual path repeater having a split mode and a multiple input multiple output (MIMO) mode is disclosed, as shown in the flow chart of FIGS. 9_a_ and 9_b_. The functionality can be implemented as a method or the functionality can be executed as instructions on a machine, where the instructions are included on at least one computer readable medium or one non-transitory machine readable storage medium.

The functionality 900 for configuring a dual path repeater having a split mode and a multiple input multiple output (MIMO) mode is disclosed, as illustrated in FIGS. 9_a_ and 9_b_. The method 900 comprises configuring 910 a first software defined filter (SDF) to filter: at least a first uplink (UL) signal of a first UL frequency range within a first UL frequency band and output the first UL signal with a predetermined gain to a first directional filtering path coupled between a first server antenna port and a first donor antenna port, 920; or at least a first downlink (DL) signal of a first DL frequency range within a first DL frequency band and output the first DL signal with a predetermined gain to the first directional filtering path coupled between the first server antenna port and the first donor antenna port, 930.

The functionality 900 further comprises configuring 940 a second SDF to filter: at least a second uplink (UL) signal of a second UL frequency range within a second UL band and output the second UL signal with a predetermined gain to a second directional filtering path coupled between a second server antenna port and a second donor antenna port, 950; or at least a second downlink (DL) signal of a second DL frequency range within a second DL band and output the second DL signal with a predetermined gain to the second directional filtering path coupled between the second server antenna port and the second donor antenna port, 960.

The functionality 900 further comprises configuring 970 the first SDF and the second SDF to operate the dual path repeater in one of: a split mode 980 with the first SDF and the second SDF configured for the first UL frequency range to be different from the second UL frequency range or the first DL frequency range to be different from the second DL frequency range; and a multiple-input multiple-output (MIMO) mode 990 with the first SDF and the second SDF configured for the first UL frequency range to be the same as the second UL frequency range or the first DL frequency range to be the same as the second DL frequency range.

In one example, the first SDF can be configured to filter the first UL signal or first DL signal and the second SDF can be configured to filter the second UL signal or the second DL signal. Each SDF can be configured to receive the UL or DL signal by providing the device clock rate, the clock voltage-controlled oscillator (VCO) frequency, and the clock phase lock loop (PLL) divider values. For UL and DL and observational receive paths in each SDF, the following parameters can be defined: the analog to digital converter (ADC) and digital to analog converter (DAC) ADC/DAC divider value, the decimator/interpolator values for all half band and finite impulse response (FIR) filters, the in-phase/quadrature-phase (IQ) data rate, the radio frequency bandwidth for the channel or band to be received, the analog filter 3 decibel (dB) corner frequency, the finite impulse response (FIR) filter gain, the number of coefficients in the FIR filter, and the array of FIR coefficient values to create the bandpass filter for the UL or DL signals. In one embodiment, the first and second SDFs can be operated to provide a fixed gain, similar to the way a fixed analog amplifier operates. The gains provided by the first and second SDF for the first UL or DL signals and second UL or DL signals will likely be approximately the same, or only slightly different. In one embodiment, an automatic gain control (AGC) can be used to limit the signal power of the first and second UL or DL signals at the input of each SDF, referred to as the input drive power. Example signal gains for each SDF are 10-20 dB, with a maximum input drive power of –20 decibels relative to milliwatts (dBm) to –10 dBm. is a typical range. The output signal can then be further amplified using a power amplifier (PA), such as the PA illustrated in the UL signal paths or DL signal paths in FIG. 5_e_, 5_f_, or 7_c_.

Operating each SDF in a TDD or FDD mode should have little impact on SDF gain or power drive. The bandwidths for the FIR filter can be set based on the bandwidth of the 3GPP signal. For 3GPP LTE (E-UTRA), the bandwidths include 1.4, 3, 5, 10, 15 or 20 Megahertz (MHz). For 5G NR, the bandwidths include 5, 10, 15, 20, 25, 30, 40, 50, 60, 70, 80, 90 and 100 MHz in FR1; and 100, 200, 400, and 800 MHz bandwidths in FR2.

The operating of each SDF to operate in a split mode or MIMO mode involves setting each SDF for the channel or band of the received UL or DL signal input into each SDF. When the channels or bands of the UL or DL signals are different, the repeater can operate in split mode. When a signal with the same center frequency (i.e. channel or band) is input into the first SDF and the second SDF, the repeater can operate in MIMO mode, as previously discussed. The first and second SDF can remain setup for a selected FDD UL or DL channel or band until the type of UL or DL signal changes. The first and second SDF can be setup for a TDD UL or DL signal based on the UL/DL configuration and signal timing received by the SDM/modem (i.e. 514, FIG. 5_e_ or 714, FIG. 7_c_), as previously discussed.

Figure 10:
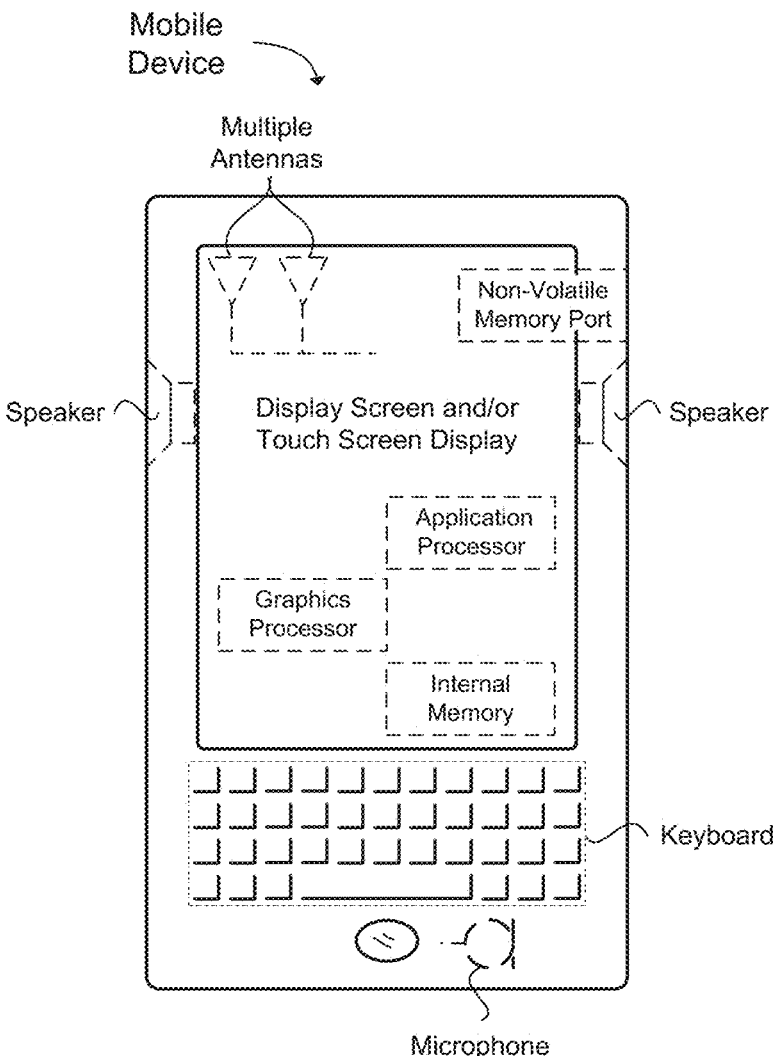
FIG. 10 illustrates a user equipment (UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a new radio node B (gNB) a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, 3GPP 5G, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes a dual path repeater having a split mode and a multiple input multiple output (MIMO) mode, comprising: a first server antenna port; a first donor antenna port a first bidirectional amplification and filtering path coupled between the first server antenna port and the first donor antenna port or between the first donor antenna port and the first server antenna port, the first bidirectional amplification and filtering path comprising: a first software defined filter (SDF) configured to filter: at least a first uplink (UL) signal of a first UL frequency range within a first UL frequency band and output the first UL signal with a predetermined gain; or at least a first downlink (DL) signal of a first DL frequency range within a first DL frequency band and output the first DL signal with a predetermined gain; a second server antenna port; a second donor antenna port; a second bidirectional amplification and filtering path coupled between the second server antenna port and the second donor antenna port or between the second donor antenna port and the second server antenna port, the second bidirectional amplification and filtering path comprising: a second SDF configured to filter: at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain; and a controller operable to configure one or more of the first SDF and the second SDF to operate the dual path repeater in one of: a split mode with the first SDF and the second SDF configured for the first UL frequency range to be different from the second UL frequency range and the first DL frequency range to be different from the second DL frequency range; and a multiple-input multiple-output (MIMO) mode with the first SDF and the second SDF configured for the first UL frequency range to be the same as the second UL frequency range and the first DL frequency range to be the same as the second DL frequency range.

Example 2 includes the dual-path repeater of Example 1, wherein the controller is operable to configure the first SDF and the second SDF to filter frequency division duplex (FDD) signals within one or more of the first UL frequency band, the first DL frequency band, the second UL frequency band, or the second DL frequency band, wherein: the first UL frequency band is a first FDD UL frequency band and the first DL frequency band is a first FDD DL frequency band; and the second UL frequency band is a second FDD UL frequency band and the second DL frequency band is a second FDD DL frequency band.

Example 3 includes the dual-path repeater of Example 1, wherein the controller is operable to configure the first SDF and the second SDF to filter time division duplex (TDD) signals, wherein: the first UL frequency band and the first DL frequency band are a same first frequency band that is a first TDD frequency band; and the second UL frequency band and the second DL frequency band are a same second frequency band that is a second TDD frequency band.

Example 4 includes the dual path repeater of Example 3, further comprising at least one TDD sync detection module (SDM) configured to: receive a timing signal and an UL/DL configuration for the TDD signals in one or more of the first TDD frequency band and the second TDD frequency band; send the timing signal and the UL/DL configuration to the controller for the first SDF to provide timing at the first SDF to filter one or more of the first UL signal and the first DL signal; and send the timing signal and the UL/DL configuration information to the controller for the second SDF to provide timing at the second SDF to filter one or more of the second UL signal and the second DL signal.

Example 5 includes the dual path repeater of Example 4, wherein the SDM is coupled to one or more of the first bidirectional amplification and filtering path or the second bidirectional amplification and filtering path.

Example 6 includes the dual path repeater of Example 3, further comprising at least one modem configured to receive a timing signal and an UL/DL configuration and send it to the controller for the one or more of the first UL signal and the first DL signal and the second UL signal and the second DL signal.

Example 7 includes the dual path repeater of Example 3, wherein the first frequency band and the second frequency band are within a single third generation partnership project (3GPP) TDD band.

Example 8 includes the dual path repeater of Example 3, wherein the first frequency band and the second frequency band are within separate third generation partnership project (3GPP) TDD bands.

Example 9 includes the dual-path repeater of Example 3, wherein the controller is further configured to be coupled to provide a timing signal and an UL/DL configuration for one or more of the first UL signal, the first DL signal, the second UL signal, and the second DL signal.

Example 10 includes the dual path repeater of Example 1, wherein the first bidirectional amplification and filtering path further comprises: a first first-direction amplification and filtering path configured to carry the at least the first UL signal of the first UL frequency range within the first UL frequency band; a first second-direction amplification and filtering path configured to carry the at least the first DL signal of the first DL frequency range within the first DL frequency band; a first signal directing component configured to communicatively couple the first server antenna port to the first first-direction amplification and filtering path and the first-second-direction amplification and filtering path; and a second signal directing component configured to communicatively couple the first donor antenna port to the first first-direction amplification and filtering path and the first-second-direction amplification and filtering path.

Example 11 includes the dual path repeater of Example 10, wherein the first signal directing component and the second signal directing component are one or more of a circulator or a switch or a duplexer.

Example 12 includes the dual path repeater of Example 10, wherein the first bidirectional amplification and filtering path further comprises: a first time division duplex (TDD) bandpass filter coupled between the first server antenna port and the first signal directing component, wherein the first TDD bandpass filter is configured to filter a first TDD signal in a first UL frequency band and a first DL frequency band that are a same first frequency band that is a TDD frequency band; and a second TDD bandpass filter coupled between the first donor antenna port and the second signal directing component, wherein the second TDD bandpass filter is configured to filter the first TDD signal in the first UL frequency band and the first DL frequency band that are the same first frequency band that is a TDD frequency band.

Example 13 includes the dual path TDD repeater of Example 12, wherein the first TDD bandpass filter is comprised of a first switchable bank of bandpass filters coupled to the controller and the second TDD bandpass filter is comprised of a second switchable bank of bandpass filters coupled to the controller to enable the controller to select different TDD bandpass filters to enable different TDD bands to be directed through the first bidirectional amplification and filtering path.

Example 14 includes the dual path repeater of Example 10, wherein the first bidirectional amplification and filtering path further comprises: a first frequency division duplex (FDD) bandpass filter coupled between the first server antenna port and the first signal directing component, wherein the first FDD bandpass filter is configured to filter a first FDD UL signal in a first FDD UL frequency band and a first FDD DL signal in a first FDD DL frequency band; and a second FDD bandpass filter coupled between the first donor antenna port and the second signal directing component, wherein the second FDD bandpass filter is configured to filter the first FDD UL signal in the FDD first UL frequency band and the first FDD DL signal in the first FDD DL frequency band.

Example 15 includes the dual path repeater of Example 14, wherein the first FDD bandpass filter is comprised of a first switchable bank of bandpass filters coupled to the controller and the second FDD bandpass filter is comprised of a second switchable bank of bandpass filters coupled to the controller to enable the controller to select different FDD bandpass filters so that different FDD bands can be directed through the first bidirectional amplification and filtering path.

Example 16 includes the dual path repeater of Example 1, wherein the second bidirectional amplification and filtering path further comprises: a second first-direction amplification and filtering path configured to carry the at least the second UL signal of the second UL frequency range within the second UL frequency band; a second second-direction amplification and filtering path configured to carry the at least the second DL signal of the second DL frequency range within the second DL frequency band; a third signal directing component configured to communicatively couple the second server antenna port to the second first-direction amplification and filtering path and the second second-direction amplification and filtering path; and a fourth signal directing component configured to communicatively couple the second donor antenna port to the second first-direction amplification and filtering path and the second second-direction amplification and filtering path.

Example 17 includes the dual path repeater of Example 16, wherein the third signal directing component and the fourth signal directing component are one or more of a circulator or a switch or a duplexer.

Example 18 includes the dual path repeater of Example 16, wherein the second bidirectional amplification and filtering path further comprises: a third time division duplex (TDD) bandpass filter coupled between the second server antenna port and the third signal directing component, wherein the third TDD bandpass filter is configured to filter a second TDD signal in a second UL frequency band and a second DL frequency band that are a same second frequency band that is a TDD frequency band; and a fourth TDD bandpass filter coupled between the second donor antenna port and the fourth signal directing component, wherein the fourth TDD bandpass filter is configured to filter the second TDD signal in the second UL frequency band and the second DL frequency band that are the same frequency band that is a TDD frequency band.

Example 19 includes the dual path repeater of Example 18, wherein the third TDD bandpass filter is comprised of a first switchable bank of bandpass filters coupled to the controller and the fourth TDD bandpass filter is comprised of a second switchable bank of bandpass filters coupled to the controller to enable the controller to select different TDD bandpass filters to enable different TDD bands to be directed through the second bidirectional amplification and filtering path.

Example 20 includes the dual path repeater of Example 16, wherein the second bidirectional amplification and filtering path further comprises: a third frequency division duplex (FDD) bandpass filter coupled between the second server antenna port and the third signal directing component, wherein the third FDD bandpass filter is configured to filter a second FDD UL signal in a second FDD UL frequency band and a second FDD DL signal in a second FDD DL frequency band; and a fourth FDD bandpass filter coupled between the second donor antenna port and the fourth signal directing component, wherein the fourth FDD bandpass filter is configured to filter the second FDD UL signal in the second FDD UL frequency band and the second FDD DL signal in the second FDD DL frequency band.

Example 21 includes the dual path repeater of Example 20, wherein the third FDD bandpass filter is comprised of a first switchable bank of bandpass filters coupled to the controller and the fourth FDD bandpass filter is comprised of a second switchable bank of bandpass filters coupled to the controller to enable the controller to select different FDD bandpass filters so that different FDD bands can be directed through the second bidirectional amplification and filtering path.

Example 22 includes a dual path repeater having a split mode and a multiple input multiple output (MIMO) mode, comprising: a first server antenna port; a first donor antenna port; a first amplification and filtering path coupled between the first server antenna port and the first donor antenna port or between the first donor antenna port and the first server antenna port, the first amplification and filtering path comprising: a first software defined filter (SDF) configured to filter: at least a first uplink (UL) signal of a first UL frequency range within a first UL frequency band and output the first UL signal with a predetermined gain; or at least a first downlink (DL) signal of a first DL frequency range within a first DL frequency band and output the first DL signal with a predetermined gain; a second server antenna port; a second donor antenna port; a second amplification and filtering path coupled between the second server antenna port and the second donor antenna port or between the second donor antenna port and the second server antenna port, the second amplification and filtering path comprising: a second SDF configured to filter: at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain; and a controller operable to configure one or more of the first SDF and the second SDF to operate the dual path repeater in one of: a split mode with the first SDF and the second SDF configured for the first UL frequency range to be different from the second UL frequency range and the first DL frequency range to be different from the second DL frequency range; and a multiple-input multiple-output (MIMO) mode with the first SDF and the second SDF configured for the first UL frequency range to be the same as the second UL frequency range and the first DL frequency range to be the same as the second DL frequency range.

Example 23 includes the dual path repeater of Example 22, wherein: the first amplification and filtering path is a first bidirectional amplification and filtering path coupled between the first server antenna port and the first donor antenna port or between the first donor antenna port and the first server antenna port; and the second amplification and filtering path is a second bidirectional amplification and filtering path coupled between the second server antenna port and the second donor antenna port or between the second donor antenna port and the second server antenna port.

Example 24 includes the dual-path repeater of Example 22, wherein the controller is operable to configure the first SDF and the second SDF to filter frequency division duplex (FDD) signals, wherein: the first UL frequency band is a first FDD UL frequency band or the first DL frequency band is a first FDD DL frequency band; and the second UL frequency band is a second FDD UL frequency band or the second DL frequency band is a second FDD DL frequency band.

Example 25 includes the dual-path repeater of Example 22, wherein the controller is operable to configure the first SDF and the second SDF to filter time division duplex (TDD) signals, wherein: the first UL frequency band or the first DL frequency band are a same first frequency band that is a first TDD frequency band; and the second UL frequency band or the second DL frequency band are a same second frequency band that is a second TDD frequency band.

Example 26 includes the dual path repeater of Example 25, further comprising at least one TDD sync detection module (SDM) configured to: receive a timing signal and an UL/DL configuration for the TDD signals in one or more of the first TDD frequency band and the second TDD frequency band; send the timing signal and the UL/DL configuration to the controller for the first SDF to provide timing at the first SDF to filter one or more of the first UL signal and the first DL signal; and send the timing signal and the UL/DL configuration information to the controller for the second SDF to provide timing at the second SDF to filter one or more of the second UL signal and the second DL signal.

Example 27 includes at least one non-transitory machine readable storage medium comprising instructions embodied thereon for configuring a dual path repeater having a split mode and a multiple input multiple output (MIMO) mode, the instructions, when executed by one or more processors, cause the dual path repeater to perform the following: configuring a first software defined filter (SDF) to filter: at least a first uplink (UL) signal of a first UL frequency range within a first UL frequency band and output the first UL signal with a predetermined gain to a first directional filtering path coupled between a first server antenna port and a first donor antenna port; or at least a first downlink (DL) signal of a first DL frequency range within a first DL frequency band and output the first DL signal with a predetermined gain to the first directional filtering path coupled between the first server antenna port and the first donor antenna port; configuring a second SDF to filter: at least a second uplink (UL) signal of a second UL frequency range within a second UL band and output the second UL signal with a predetermined gain to a second directional filtering path coupled between a second server antenna port and a second donor antenna port; or at least a second downlink (DL) signal of a second DL frequency range within a second DL band and output the second DL signal with a predetermined gain to the second directional filtering path coupled between the second server antenna port and the second donor antenna port; and configuring the first SDF and the second SDF to operate the dual path repeater in one of: a split mode with the first SDF and the second SDF configured for the first UL frequency range to be different from the second UL frequency range or the first DL frequency range to be different from the second DL frequency range; and a multiple-input multiple-output (MIMO) mode with the first SDF and the second SDF configured for the first UL frequency range to be the same as the second UL frequency range or the first DL frequency range to be the same as the second DL frequency range.

Example 28 includes the at least one non-transitory machine readable storage medium of Example 27, further comprising instructions which when executed by the one or more processors cause the dual path repeater to perform the following: configuring the first SDF to filter: at least the first UL signal of the first UL frequency range within the first UL frequency band and output the first UL signal with the predetermined gain to a first bidirectional filtering path coupled between the first server antenna port and the first donor antenna port; and at least the first downlink (DL) signal of the first DL frequency range within the first DL frequency band and output the first DL signal with the predetermined gain to the first directional filtering path coupled between the first server antenna port and the first donor antenna port; configuring the second SDF to filter: at least the second UL signal of the second UL frequency range within the second UL band and output the second UL signal with the predetermined gain to a second bidirectional filtering path coupled between the second server antenna port and the second donor antenna port; and at least the second DL signal of the second DL frequency range within the second DL band and output the second DL signal with the predetermined gain to the second directional filtering path coupled between the second server antenna port and the second donor antenna port.

Example 29 includes the at least one non-transitory machine readable storage medium of Example 27, further comprising instructions which when executed by the one or more processors cause the dual path repeater to perform the following: configuring the first SDF and the second SDF to filter frequency division duplex (FDD) signals, wherein: the first UL frequency band is a first FDD UL frequency band and the first DL frequency band is a first FDD DL frequency band; and the second UL frequency band is a second FDD UL frequency band and the second DL frequency band is a second FDD DL frequency band.

Example 30 includes the at least one non-transitory machine readable storage medium of Example 27, further comprising instructions which when executed by the one or more processors cause the dual path repeater to perform the following: configuring the first SDF and the second SDF to filter time division duplex (TDD) signals, wherein: the first UL frequency band and the first DL frequency band are a same first frequency band that is a first TDD frequency band; and the second UL frequency band and the second DL frequency band are a same second frequency band that is a second TDD frequency band.

Example 31 includes the at least one non-transitory machine readable storage medium of Example 30, further comprising instructions which when executed by the one or more processors cause the dual path repeater to perform the following: receiving a timing signal and an UL/DL configuration for the TDD signals in one or more of the first TDD frequency band and the second TDD frequency band from at least one TDD sync detection module (SDM); sending the timing signal and the UL/DL configuration to the first SDF to provide timing at the first SDF to filter one or more of the first UL signal or the first DL signal; and sending the timing signal and the UL/DL configuration information to the second SDF to provide timing at the second SDF to filter one or more of the second UL signal or the second DL signal.

Example 32 includes a method for configuring a dual path repeater having a split mode and a multiple input multiple output (MIMO) mode, comprising: configuring a first software defined filter (SDF) to filter: at least a first uplink (UL) signal of a first UL frequency range within a first UL frequency band and output the first UL signal with a predetermined gain to a first directional filtering path coupled between a first server antenna port and a first donor antenna port; or at least a first downlink (DL) signal of a first DL frequency range within a first DL frequency band and output the first DL signal with a predetermined gain to the first directional filtering path coupled between the first server antenna port and the first donor antenna port; configuring a second SDF to filter: at least a second uplink (UL) signal of a second UL frequency range within a second UL band and output the second UL signal with a predetermined gain to a second directional filtering path coupled between a second server antenna port and a second donor antenna port; or at least a second downlink (DL) signal of a second DL frequency range within a second DL band and output the second DL signal with a predetermined gain to the second directional filtering path coupled between the second server antenna port and the second donor antenna port; and configuring the first SDF and the second SDF to operate the dual path repeater in one of: a split mode with the first SDF and the second SDF configured for the first UL frequency range to be different from the second UL frequency range or the first DL frequency range to be different from the second DL frequency range; and a multiple-input multiple-output (MIMO) mode with the first SDF and the second SDF configured for the first UL frequency range to be the same as the second UL frequency range or the first DL frequency range to be the same as the second DL frequency range.

Example 33 includes the method of Example 32, further comprising: configuring the first SDF to filter: at least the first UL signal of the first UL frequency range within the first UL frequency band and output the first UL signal with the predetermined gain to a first bidirectional filtering path coupled between the first server antenna port and the first donor antenna port; and at least the first downlink (DL) signal of the first DL frequency range within the first DL frequency band and output the first DL signal with the predetermined gain to the first directional filtering path coupled between the first server antenna port and the first donor antenna port; configuring the second SDF to filter: at least the second UL signal of the second UL frequency range within the second UL band and output the second UL signal with the predetermined gain to a second bidirectional filtering path coupled between the second server antenna port and the second donor antenna port; and at least the second DL signal of the second DL frequency range within the second DL band and output the second DL signal with the predetermined gain to the second directional filtering path coupled between the second server antenna port and the second donor antenna port.

Example 34 includes the method of Example 32, further comprising: configuring the first SDF and the second SDF to filter frequency division duplex (FDD) signals, wherein: the first UL frequency band is a first FDD UL frequency band and the first DL frequency band is a first FDD DL frequency band; and the second UL frequency band is a second FDD UL frequency band and the second DL frequency band is a second FDD DL frequency band.

Example 35 includes the method of Example 32, further comprising: configuring the first SDF and the second SDF to filter time division duplex (TDD) signals, wherein: the first UL frequency band and the first DL frequency band are a same first frequency band that is a first TDD frequency band; and the second UL frequency band and the second DL frequency band are a same second frequency band that is a second TDD frequency band.

Example 36 includes the method of Example 35, further comprising: receiving a timing signal and an UL/DL configuration for the TDD signals in one or more of the first TDD frequency band and the second TDD frequency band from at least one TDD sync detection module (SDM); sending the timing signal and the UL/DL configuration to the first SDF to provide timing at the first SDF to filter one or more of the first UL signal or the first DL signal; and sending the timing signal and the UL/DL configuration information to the second SDF to provide timing at the second SDF to filter one or more of the second UL signal or the second DL signal.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A dual path repeater having a split mode and a multiple input multiple output (MIMO) mode, comprising:
  a first server antenna port;
  a first donor antenna port
  a first bidirectional amplification and filtering path coupled between the first server antenna port and the first donor antenna port or between the first donor antenna port and the first server antenna port, the first bidirectional amplification and filtering path comprising:

a first software defined filter (SDF) configured to filter:

at least a first uplink (UL) signal of a first UL frequency range within a first UL frequency band and output the first UL signal with a predetermined gain; or at least a first downlink (DL) signal of a first DL frequency range within a first DL frequency band and output the first DL signal with a predetermined gain;

a second server antenna port;

a second donor antenna port;

a second bidirectional amplification and filtering path coupled between the second server antenna port and the second donor antenna port or between the second donor antenna port and the second server antenna port, the second bidirectional amplification and filtering path comprising:

a second SDF configured to filter:

at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain; and a controller operable to configure one or more of the first SDF and the second SDF to operate the dual path repeater in one of:

a split mode with the first SDF and the second SDF configured for the first UL frequency range to be different from the second UL frequency range and the first DL frequency range to be different from the second DL frequency range; and a multiple-input multiple-output (MIMO) mode with the first SDF and the second SDF configured for the first UL frequency range to be the same as the second UL frequency range and the first DL frequency range to be a same as the second DL frequency range.

2. The dual path repeater of claim 1, wherein the controller is operable to configure the first SDF and the second SDF to filter frequency division duplex (FDD) signals within one or more of the first UL frequency band, the first DL frequency band, the second UL frequency band, or the second DL frequency band, wherein:

the first UL frequency band is a first FDD UL frequency band and the first DL frequency band is a first FDD DL frequency band; and the second UL frequency band is a second FDD UL frequency band and the second DL frequency band is a second FDD DL frequency band.

3. The dual path repeater of claim 1, wherein the controller is operable to configure the first SDF and the second SDF to filter time division duplex (TDD) signals, wherein:

the first UL frequency band and the first DL frequency band are a same first frequency band that is a first TDD frequency band; and the second UL frequency band and the second DL frequency band are a same second frequency band that is a second TDD frequency band.

4. The dual path repeater of claim 3, further comprising at least one TDD sync detection module (SDM) configured to:

receive a timing signal and an UL/DL configuration for the TDD signals in one or more of the first TDD frequency band and the second TDD frequency band;

send the timing signal and the UL/DL configuration to the controller for the first SDF to provide timing at the first SDF to filter one or more of the first UL signal and the first DL signal; and send the timing signal and the UL/DL configuration to the controller for the second SDF to provide timing at the second SDF to filter one or more of the second UL signal and the second DL signal.

5. The dual path repeater of claim 4, wherein the SDM is coupled to one or more of the first bidirectional amplification and filtering path or the second bidirectional amplification and filtering path.

6. The dual path repeater of claim 3, further comprising at least one modem configured to receive a timing signal and an UL/DL configuration and send it to the controller for the one or more of the first UL signal and the first DL signal and the second UL signal and the second DL signal.

7. The dual path repeater of claim 3, wherein the first frequency band and the second frequency band are within a single third generation partnership project (3GPP) TDD band.

8. The dual path repeater of claim 3, wherein the first frequency band and the second frequency band are within separate third generation partnership project (3GPP) TDD bands.

9. The dual-path repeater of claim 3, wherein the controller is further configured to be coupled to provide a timing signal and an UL/DL configuration for one or more of the first UL signal, the first DL signal, the second UL signal, and the second DL signal.

10. The dual path repeater of claim 1, wherein the first bidirectional amplification and filtering path further comprises:

a first first-direction amplification and filtering path configured to carry the at least the first UL signal of the first UL frequency range within the first UL frequency band;

a first second-direction amplification and filtering path configured to carry the at least the first DL signal of the first DL frequency range within the first DL frequency band;

a first signal directing component configured to communicatively couple the first server antenna port to the first first-direction amplification and filtering path and the first second-direction amplification and filtering path; and a second signal directing component configured to communicatively couple the first donor antenna port to the first first-direction amplification and filtering path and the first-second-direction amplification and filtering path.

11. The dual path repeater of claim 10, wherein the first signal directing component and the second signal directing component are one or more of a circulator or a switch or a duplexer.

12. The dual path repeater of claim 10, wherein the first bidirectional amplification and filtering path further comprises:

a first time division duplex (TDD) bandpass filter coupled between the first server antenna port and the first signal directing component, wherein the first TDD bandpass filter is configured to filter a first TDD signal in a first UL frequency band and a first DL frequency band that are a same first frequency band that is a TDD frequency band; and a second TDD bandpass filter coupled between the first donor antenna port and the second signal directing component, wherein the second TDD bandpass filter is configured to filter the first TDD signal in the first UL frequency band and the first DL frequency band that are the same first frequency band that is a TDD frequency band.

13. The dual path repeater of claim 12, wherein the first TDD bandpass filter is comprised of a first switchable bank of bandpass filters coupled to the controller and the second TDD bandpass filter is comprised of a second switchable bank of bandpass filters coupled to the controller to enable the controller to select different TDD bandpass filters to enable different TDD bands to be directed through the first bidirectional amplification and filtering path.

14. The dual path repeater of claim 10, wherein the first bidirectional amplification and filtering path further comprises:
   a first frequency division duplex (FDD) bandpass filter coupled between the first server antenna port and the first signal directing component, wherein the first FDD bandpass filter is configured to filter a first FDD UL signal in a first FDD UL frequency band and a first FDD DL signal in a first FDD DL frequency band; and
   a second FDD bandpass filter coupled between the first donor antenna port and the second signal directing component, wherein the second FDD bandpass filter is configured to filter the first FDD UL signal in the FDD first UL frequency band and the first FDD DL signal in the first FDD DL frequency band.

15. The dual path repeater of claim 14, wherein the first FDD bandpass filter is comprised of a first switchable bank of bandpass filters coupled to the controller and the second FDD bandpass filter is comprised of a second switchable bank of bandpass filters coupled to the controller to enable the controller to select different FDD bandpass filters so that different FDD bands can be directed through the first bidirectional amplification and filtering path.

16. The dual path repeater of claim 1, wherein the second bidirectional amplification and filtering path further comprises:
   a second first-direction amplification and filtering path configured to carry the at least the second UL signal of the second UL frequency range within the second UL frequency band;
   a second second-direction amplification and filtering path configured to carry the at least the second DL signal of the second DL frequency range within the second DL frequency band;
   a third signal directing component configured to communicatively couple the second server antenna port to the second first-direction amplification and filtering path and the second second-direction amplification and filtering path; and
   a fourth signal directing component configured to communicatively couple the second donor antenna port to the second first-direction amplification and filtering path and the second second-direction amplification and filtering path.

17. The dual path repeater of claim 16, wherein the third signal directing component and the fourth signal directing component are one or more of a circulator or a switch or a duplexer.

18. The dual path repeater of claim 16, wherein the second bidirectional amplification and filtering path further comprises:
   a third time division duplex (TDD) bandpass filter coupled between the second server antenna port and the third signal directing component, wherein the third TDD bandpass filter is configured to filter a second TDD signal in a second UL frequency band and a second DL frequency band that are a same second frequency band that is a TDD frequency band; and
   a fourth TDD bandpass filter coupled between the second donor antenna port and the fourth signal directing component, wherein the fourth TDD bandpass filter is configured to filter the second TDD signal in the second UL frequency band and the second DL frequency band that are the same frequency band that is a TDD frequency band.

19. The dual path repeater of claim 18, wherein the third TDD bandpass filter is comprised of a first switchable bank of bandpass filters coupled to the controller and the fourth TDD bandpass filter is comprised of a second switchable bank of bandpass filters coupled to the controller to enable the controller to select different TDD bandpass filters to enable different TDD bands to be directed through the second bidirectional amplification and filtering path.

20. The dual path repeater of claim 16, wherein the second bidirectional amplification and filtering path further comprises:
   a third frequency division duplex (FDD) bandpass filter coupled between the second server antenna port and the third signal directing component, wherein the third FDD bandpass filter is configured to filter a second FDD UL signal in a second FDD UL frequency band and a second FDD DL signal in a second FDD DL frequency band; and
   a fourth FDD bandpass filter coupled between the second donor antenna port and the fourth signal directing component, wherein the fourth FDD bandpass filter is configured to filter the second FDD UL signal in the second FDD UL frequency band and the second FDD DL signal in the second FDD DL frequency band.

21. The dual path repeater of claim 20, wherein the third FDD bandpass filter is comprised of a first switchable bank of bandpass filters coupled to the controller and the fourth FDD bandpass filter is comprised of a second switchable bank of bandpass filters coupled to the controller to enable the controller to select different FDD bandpass filters so that different FDD bands can be directed through the second bidirectional amplification and filtering path.

22. A dual path repeater having a split mode and a multiple input multiple output (MIMO) mode, comprising:
   a first server antenna port;
   a first donor antenna port;
   a first amplification and filtering path coupled between the first server antenna port and the first donor antenna port or between the first donor antenna port and the first server antenna port, the first amplification and filtering path comprising:
   a first software defined filter (SDF) configured to filter:
      at least a first uplink (UL) signal of a first UL frequency range within a first UL frequency band and output the first UL signal with a predetermined gain; or
      at least a first downlink (DL) signal of a first DL frequency range within a first DL frequency band and output the first DL signal with a predetermined gain;
   a second server antenna port;
   a second donor antenna port;
   a second amplification and filtering path coupled between the second server antenna port and the second donor antenna port or between the second donor antenna port and the second server antenna port, the second amplification and filtering path comprising:

a second SDF configured to filter:

at least a second uplink (UL) signal of a second UL frequency range within a second UL band and output the second UL signal with a predetermined gain; or at least a second downlink (DL) signal of a second DL frequency range within a second DL band and output the second DL signal with a predetermined gain; and a controller operable to configure one or more of the first SDF and the second SDF to operate the dual path repeater in one of:

a split mode with the first SDF and the second SDF configured for the first UL frequency range to be different from the second UL frequency range and the first DL frequency range to be different from the second DL frequency range; and a multiple-input multiple-output (MIMO) mode with the first SDF and the second SDF configured for the first UL frequency range to be the same as the second UL frequency range and the first DL frequency range to be a same as the second DL frequency range.

23. The dual path repeater of claim 22, wherein:

the first amplification and filtering path is a first bidirectional amplification and filtering path coupled between the first server antenna port and the first donor antenna port or between the first donor antenna port and the first server antenna port; and the second amplification and filtering path is a second bidirectional amplification and filtering path coupled between the second server antenna port and the second donor antenna port or between the second donor antenna port and the second server antenna port.

24. The dual path repeater of claim 22, wherein the controller is operable to configure the first SDF and the second SDF to filter frequency division duplex (FDD) signals, wherein:

the first UL frequency band is a first FDD UL frequency band or the first DL frequency band is a first FDD DL frequency band; and the second UL frequency band is a second FDD UL frequency band or the second DL frequency band is a second FDD DL frequency band.

25. The dual path repeater of claim 22, wherein the controller is operable to configure the first SDF and the second SDF to filter time division duplex (TDD) signals, wherein:

the first UL frequency band or the first DL frequency band are a same first frequency band that is a first TDD frequency band; and the second UL frequency band or the second DL frequency band are a same second frequency band that is a second TDD frequency band.

26. The dual path repeater of claim 25, further comprising at least one TDD sync detection module (SDM) configured to:

receive a timing signal and an UL/DL configuration for the TDD signals in one or more of the first TDD frequency band and the second TDD frequency band;

send the timing signal and the UL/DL configuration to the controller for the first SDF to provide timing at the first SDF to filter one or more of the first UL signal and the first DL signal; and send the timing signal and the UL/DL configuration to the controller for the second SDF to provide timing at the second SDF to filter one or more of the second UL signal and the second DL signal.

27. At least one non-transitory machine readable storage medium comprising instructions embodied thereon for configuring a dual path repeater having a split mode and a multiple input multiple output (MIMO) mode, the instructions, when executed by one or more processors, cause the dual path repeater to perform the following:

configuring a first software defined filter (SDF) to filter:

at least a first uplink (UL) signal of a first UL frequency range within a first UL frequency band and output the first UL signal with a predetermined gain to a first directional filtering path coupled between a first server antenna port and a first donor antenna port; or at least a first downlink (DL) signal of a first DL frequency range within a first DL frequency band and output the first DL signal with a predetermined gain to the first directional filtering path coupled between the first server antenna port and the first donor antenna port;

configuring a second SDF to filter:

at least a second uplink (UL) signal of a second UL frequency range within a second UL band and output the second UL signal with a predetermined gain to a second directional filtering path coupled between a second server antenna port and a second donor antenna port; or at least a second downlink (DL) signal of a second DL frequency range within a second DL band and output the second DL signal with a predetermined gain to the second directional filtering path coupled between the second server antenna port and the second donor antenna port; and configuring the first SDF and the second SDF to operate the dual path repeater in one of:

a split mode with the first SDF and the second SDF configured for the first UL frequency range to be different from the second UL frequency range or the first DL frequency range to be different from the second DL frequency range; and a multiple-input multiple-output (MIMO) mode with the first SDF and the second SDF configured for the first UL frequency range to be a same as the second UL frequency range or the first DL frequency range to be a same as the second DL frequency range.

28. The at least one non-transitory machine readable storage medium of claim 27, further comprising instructions which when executed by the one or more processors cause the dual path repeater to perform the following:

configuring the first SDF to filter:

at least the first UL signal of the first UL frequency range within the first UL frequency band and output the first UL signal with the predetermined gain to a first bidirectional filtering path coupled between the first server antenna port and the first donor antenna port; and at least the first downlink (DL) signal of the first DL frequency range within the first DL frequency band and output the first DL signal with the predetermined gain to the first directional filtering path coupled between the first server antenna port and the first donor antenna port;

configuring the second SDF to filter:

at least the second UL signal of the second UL frequency range within the second UL band and output the second UL signal with the predetermined gain to a second bidirectional filtering path coupled between the second server antenna port and the second donor antenna port; and at least the second DL signal of the second DL frequency range within the second DL band and output the second DL signal with the predetermined gain to the second directional filtering path coupled between the second server antenna port and the second donor antenna port.

29. The at least one non-transitory machine readable storage medium of claim 27, further comprising instructions which when executed by the one or more processors cause the dual path repeater to perform the following:

configuring the first SDF and the second SDF to filter frequency division duplex (FDD) signals, wherein:

the first UL frequency band is a first FDD UL frequency band and the first DL frequency band is a first FDD DL frequency band; and the second UL frequency band is a second FDD UL frequency band and the second DL frequency band is a second FDD DL frequency band.

30. The at least one non-transitory machine readable storage medium of claim 27, further comprising instructions which when executed by the one or more processors cause the dual path repeater to perform the following:

configuring the first SDF and the second SDF to filter time division duplex (TDD) signals, wherein:

the first UL frequency band and the first DL frequency band are a same first frequency band that is a first TDD frequency band; and the second UL frequency band and the second DL frequency band are a same second frequency band that is a second TDD frequency band.

31. The at least one non-transitory machine readable storage medium of claim 30, further comprising instructions which when executed by the one or more processors cause the dual path repeater to perform the following:

receiving a timing signal and an UL/DL configuration for the TDD signals in one or more of the first TDD frequency band and the second TDD frequency band from at least one TDD sync detection module (SDM);

sending the timing signal and the UL/DL configuration to the first SDF to provide timing at the first SDF to filter one or more of the first UL signal or the first DL signal; and sending the timing signal and the UL/DL configuration to the second SDF to provide timing at the second SDF to filter one or more of the second UL signal or the second DL signal.

32. A method for configuring a dual path repeater having a split mode and a multiple input multiple output (MIMO) mode, comprising:

configuring a first software defined filter (SDF) to filter:

at least a first uplink (UL) signal of a first UL frequency range within a first UL frequency band and output the first UL signal with a predetermined gain to a first directional filtering path coupled between a first server antenna port and a first donor antenna port; or at least a first downlink (DL) signal of a first DL frequency range within a first DL frequency band and output the first DL signal with a predetermined gain to the first directional filtering path coupled between the first server antenna port and the first donor antenna port;

configuring a second SDF to filter:

at least a second uplink (UL) signal of a second UL frequency range within a second UL band and output the second UL signal with a predetermined gain to a second directional filtering path coupled between a second server antenna port and a second donor antenna port; or at least a second downlink (DL) signal of a second DL frequency range within a second DL band and output the second DL signal with a predetermined gain to the second directional filtering path coupled between the second server antenna port and the second donor antenna port; and configuring the first SDF and the second SDF to operate the dual path repeater in one of:

a split mode with the first SDF and the second SDF configured for the first UL frequency range to be different from the second UL frequency range or the first DL frequency range to be different from the second DL frequency range; and a multiple-input multiple-output (MIMO) mode with the first SDF and the second SDF configured for the first UL frequency range to be a same as the second UL frequency range or the first DL frequency range to be a same as the second DL frequency range.

33. The method of claim 32, further comprising:

configuring the first SDF to filter:

at least the first UL signal of the first UL frequency range within the first UL frequency band and output the first UL signal with the predetermined gain to a first bidirectional filtering path coupled between the first server antenna port and the first donor antenna port; and at least the first downlink (DL) signal of the first DL frequency range within the first DL frequency band and output the first DL signal with the predetermined gain to the first directional filtering path coupled between the first server antenna port and the first donor antenna port;

configuring the second SDF to filter:

at least the second UL signal of the second UL frequency range within the second UL band and output the second UL signal with the predetermined gain to a second bidirectional filtering path coupled between the second server antenna port and the second donor antenna port; and at least the second DL signal of the second DL frequency range within the second DL band and output the second DL signal with the predetermined gain to the second directional filtering path coupled between the second server antenna port and the second donor antenna port.

34. The method of claim 32, further comprising:

configuring the first SDF and the second SDF to filter frequency division duplex (FDD) signals, wherein:

the first UL frequency band is a first FDD UL frequency band and the first DL frequency band is a first FDD DL frequency band; and the second UL frequency band is a second FDD UL frequency band and the second DL frequency band is a second FDD DL frequency band.

35. The method of claim 32, further comprising:

configuring the first SDF and the second SDF to filter time division duplex (TDD) signals, wherein:

the first UL frequency band and the first DL frequency band are a same first frequency band that is a first TDD frequency band; and the second UL frequency band and the second DL frequency band are a same second frequency band that is a second TDD frequency band.

36. The method of claim 35, further comprising:

receiving a timing signal and an UL/DL configuration for the TDD signals in one or more of the first TDD frequency band and the second TDD frequency band from at least one TDD sync detection module (SDM);

sending the timing signal and the UL/DL configuration to the first SDF to provide timing at the first SDF to filter one or more of the first UL signal or the first DL signal; and sending the timing signal and the UL/DL configuration to the second SDF to provide timing at the second SDF to filter one or more of the second UL signal or the second DL signal.

* * * * *